US012314377B2

(12) United States Patent
Taylor et al.

(10) Patent No.: US 12,314,377 B2
(45) Date of Patent: May 27, 2025

(54) ZERO KNOWLEDGE PERSONAL ASSISTANT

(71) Applicant: Thinkspan, LLC, Highland Park, IL (US)

(72) Inventors: Brian Samuel Taylor, Highland Park, IL (US); Matthew Maxwell Murphy, Chicago, IL (US); James Michael Faris, Chicago, IL (US)

(73) Assignee: Thinkspan, LLC, Highland Park, IL (US)

( * ) Notice: Subject to any disclaimer, the term of this patent is extended or adjusted under 35 U.S.C. 154(b) by 311 days.

(21) Appl. No.: 18/159,642

(22) Filed: Jan. 25, 2023

(65) Prior Publication Data

US 2023/0252127 A1    Aug. 10, 2023

Related U.S. Application Data

(60) Provisional application No. 63/302,892, filed on Jan. 25, 2022.

(51) Int. Cl.
  *G06F 21/00* (2013.01)
  *G06F 21/46* (2013.01)
(52) U.S. Cl.
  CPC .................. *G06F 21/46* (2013.01)
(58) Field of Classification Search
  CPC ....................................... G06F 21/46
  See application file for complete search history.

(56) References Cited

U.S. PATENT DOCUMENTS

| | | |
|---|---|---|
| 2006/0052945 A1 | 3/2006 | Rabinowitz et al. |
| 2017/0188976 A1 | 7/2017 | Kalra et al. |
| 2022/0170915 A1* | 6/2022 | Van Den Boom ..... G16H 10/40 |

FOREIGN PATENT DOCUMENTS

| | | |
|---|---|---|
| WO | WO 2021/071971 A1 | 4/2021 |
| WO | WO 2021/077035 A1 | 4/2021 |

OTHER PUBLICATIONS

PCT International Search Report and Written Opinion, PCT Application No. PCT/US23/61309, Apr. 25, 2023, 12 pages.

* cited by examiner

*Primary Examiner* — Jeffrey C Pwu
*Assistant Examiner* — Thong P Truong
(74) *Attorney, Agent, or Firm* — Fenwick & West LLP

(57) ABSTRACT

A zero-knowledge personal assistant is enabled by a universal data scaffold. Because the information is mapped to a universal data scaffold in a structured format, a data management platform can easily organize, display, and draw associations between the information. The universal data scaffold and structured user data resides on a user's device, preventing data from being obtained by third parties. To analyze data and produce recommendations for the virtual assistant, a set of rules associated with the universal data scaffold can be applied to the user data. Information can be encrypted and shared between users without being decrypted by a third-party.

18 Claims, 41 Drawing Sheets

ZERO KNOWLEDGE PERSONAL ASSISTANT

CROSS-REFERENCE TO RELATED APPLICATIONS

This application claims the benefit of U.S. provisional patent application Ser. No. 62/302,892 filed Jan. 25, 2022, which is incorporated herein by reference in its entirety.

BACKGROUND

A file hosting service (e.g., Dropbox®, Google Drive®, or Microsoft OneDrive®) is an Internet-hosted service that is specifically designed to host user files. For example, a file hosting service may allow users to upload files that could then be accessed using a different computer, tablet, mobile phone, or other network-connected device. Users often have the option of sharing files publicly or keeping files protected (e.g., by requiring authentication prior to allowing access).

Some file hosting services also permit users to collaborate on digital files, such as word processor documents, spreadsheets, and Portable Document Format (PDF) documents. But file hosting services are subject to some constraints because they store digital files having unstructured data. For example, a file hosting service will only permit a user to view those digital files for which it has a viewer corresponding to the file type (e.g., PDF documents require a viewer such as Adobe Reader®). However, because many standard compliant formats are presented by viewers as visual renderings, the file hosting service is typically unaware of what the underlying data actually means.

BRIEF DESCRIPTION OF THE DRAWINGS

FIG. 35 is a flow diagram illustrating a method of implementing a zero-knowledge personal assistant.

DETAILED DESCRIPTION

Figure 1:
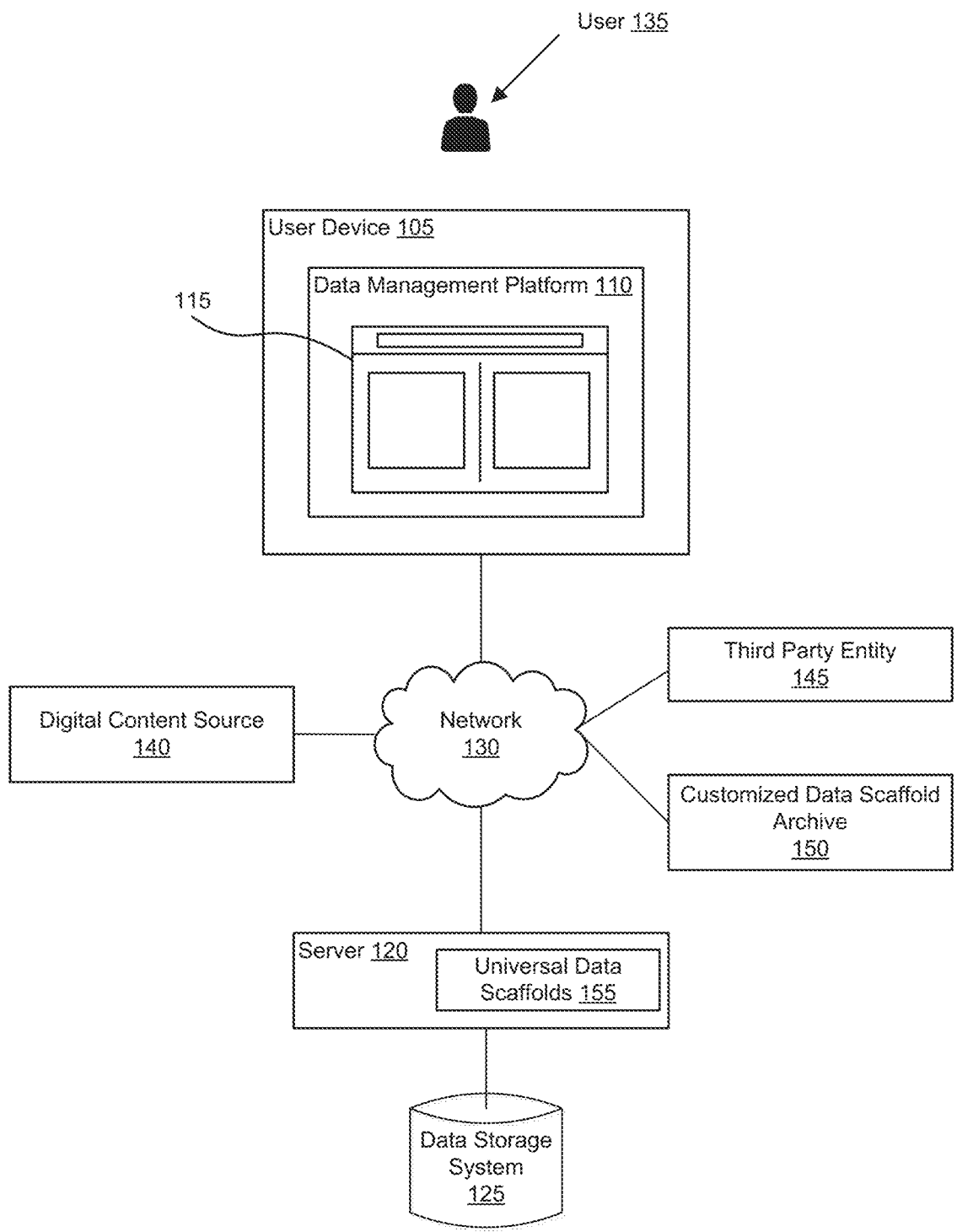
FIG. 1 is a block diagram illustrating an environment in which the disclosed embodiments can be implemented.

With a multitude of passwords in today's technologically enhanced world, where each password is a string of nonsensical alphanumeric characters, the user can easily forget a particular password. However, while users frequently forget a nonsensical password, users easily remember places, favorite songs, or other emotionally relevant items. The system disclosed here enables a user to access passwords in a recall-memory enhancing manner by tying password access to memorable items such as places, songs, images or other emotionally relevant items. The memorable items can be stored using a data management platform associated with a zero-knowledge database.

The data management platform provides a secure storage environment for digital content, such as digital files. The data management platform can represent the stored digital contents as a semantic graph. In the semantic graph, nodes represent digital contents and an edge between two nodes represents the relationship between the corresponding two digital contents. The semantic graph is constructed using structured data associated with the digital contents. The structured data allows the data management platform to collect, process, and present the digital contents in a graphical user interface in a more meaningful way. The data management platform also provides various other functionalities such as sharing of digital contents between users of the data management platform, presenting notifications regarding one or more aspects of a digital content, intelligent/context-based fetching or retrieval of relevant digital contents, zero-knowledge encryption of the digital contents, and generating zero-knowledge offers.

The data management platform facilitates storing of the digital content as structured data, which is defined using a universal data scaffold of the data management platform. A digital content is stored as one of multiple content types in the data management platform, and each content type is defined using a universal data scaffold. In some embodiments, a universal data scaffold includes a set of attributes that defines a content type. For example, for a content type such as a car, the universal data scaffold can include a set of attributes such as a make, a model, a year, a vehicle identification number ("VIN") of the car. When a user uploads a first digital content, such as picture of a car, or a bill of sale of the car, or creates a data record for a car, the data management platform determines the content type of the digital content as "car", obtains the universal data scaffold of "car," and obtains attribute values from the digital content, such as "Ford," "Fusion," and "2014," for the set of attributes defined in the "car" universal data scaffold. The data management platform can determine the type of the digital content based on appointing the workflow from which the document was uploaded. For example, if the document was uploaded in response to a question about a vehicle, the data management platform can determine that the type of digital content is a car.

The data management platform can have various such universal data scaffolds for multiple content types. One of the attributes in the universal data scaffold can also include a relationship attribute, which identifies a second digital content (of the same content type or another content type) related to the first digital content. For example, one of the attributes in "car" universal data scaffold can be a relationship attribute, such as "owner" or "owned by" which relates the car digital content to a "person" content type digital content. Structured data permits the relationship to be readily established between various digital contents. The universal data scaffolds can enable the data management platform to intelligently connect digital contents of different types having a common theme. For example, digital content such as documents related to a vehicle (e.g., maintenance records, driver licenses, and insurance policies) may be associated with one another and/or the individual who owns the vehicle. The connections formed between different structured data are what give the structured data its meaning.

The data management platform can also retrieve data from public databases such as the phone book, the Yellow Pages, a public criminal database, etc. Upon retrieving the data, the data management platform can format retrieved data into a universal data scaffold data structure. As a result, both the private data and the public data of the individual can be available to the data management platform to provide better recommendations or offers to the user.

The universal data scaffold can also be associated with other metadata, such as rules. A user can set various rules for the digital contents, such as a sharing rule that defines sharing of a digital content with another user. For example, in a universal data scaffold for a "child" content type, a parent user can set a sharing rule to share with a nanny user only a portion of digital contents related to the child, such as immunization records associated with the child.

The data management platform can be implemented in various configurations. For example, in a first configuration, the data management platform can be implemented at a server computing device ("server"), which a user can access from a user device using an application, such as a web browser on the user device. In the second configuration, a portion of the data management platform can also be implemented at the user device, for example, as an "app" that can be downloaded to and executed at the user device. The user can access the app on the user device to upload and/or retrieve digital contents to and/or from the server. Regardless of which configuration the data management platform is implemented in, the server stores all universal data scaffolds. When a user downloads and installs the app, a copy of all the universal data scaffolds that are available at the server are also installed at the user device. When a universal data scaffold is updated at the server, e.g., attributes are added, removed, and/or modified, the updated universal data scaffold is transmitted to the data management platform on the user devices, e.g., as part of an app update.

The data management platform can store the digital contents as a graph database in which digital contents are represented as nodes of the graph. A relationship between two digital contents is represented by an edge connecting the nodes corresponding to the two digital contents. A node can be a data structure that contains the digital content, attribute values of the digital content, and an edge that connects the node to another node. Note that the digital contents can be stored in formats other than graph database. For example, the digital contents can be stored in a relational database. They can be stored in any format that allows the data management platform to obtain, derive determine, or interpret the structured data associated with and relationships between the digital contents based on the universal data scaffolds. The data management platform can present the digital contents in a graphical user interface (GUI) using which the user can view, modify, and/or create digital contents. The GUI makes use of the universal data scaffold associated with a digital content to show various attributes associated with the digital content and/or any related digital contents. For example, the GUI can show a picture of the car, and attributes such as Make, Model and Year of the car, which are derived from the universal data scaffold of the car. The GUI can also show related digital content, such as a license plate of the car, which is derived from the universal data scaffold of the car, e.g., from the license plate attribute in the universal data scaffold of the car.

The data management platform also supports zero-knowledge encryption of the digital contents, in which the data management platform encrypts the digital contents prior to storing them at the data storage system ensuring security and privacy of the digital contents. For example, the app can encrypt a node corresponding to the digital content and then transmit the encrypted node to the server to back up the digital content at the data storage system. When the node is encrypted, the data management platform generates an encrypted bundle, which is typically a blob, having an encrypted form of the digital content, including the attribute values of the digital content, and the universal data scaffold of the digital content. The encrypted bundle is then transmitted to the server for storage at the data storage system. The encryption is typically done at the user device, e.g., using an encryption key that only the user device has access to. Since the server would not have access to the encrypted key used the by the user device in encrypting the digital content, the encrypted bundle cannot be decrypted at the server, therefore making the digital content secure at the server. In some embodiments, the data management platform does not encrypt the digital contents in which case the digital contents are transmitted to and stored at the server without being encrypted. In some embodiments, the data management platform can provide an option to the user to disable the encryption in which case the digital contents are transmitted to and stored at the server without being encrypted. However, the digital contents stored at the server may be less secure in such scenarios compared to scenarios where they are stored as encrypted data.

The data management platform also facilitates zero-knowledge offers in which offers of goods and/or services are stored at user devices, e.g., as part of the universal data scaffolds, but are displayed to those users who satisfy a specified criterion, and the eligible user, if interested, may then accept, reject, or ignore the offer. Neither the data management platform nor a vendor who has provided the offer may know to which users a specified offer was displayed until a user accepts the specified offer. In some embodiments, even after the user accepts the specified offer, the data management platform may anonymize the acceptance, e.g. by removing some or all user identification information, before forwarding the acceptance to the vendor. In some embodiments, a zero-knowledge offer is an offer that may only be known to the user to whom the offer was displayed until acceptance. In fact, offers may simply be stored with the underlying universal data scaffolding of the digital content with which the offer is to be presented. For example, digital content having information pertaining to a nanny (or some other employee) may include an offer for a payroll service, an offer for a background check, etc. In some embodiments, the zero-knowledge offers are included as part of the universal data scaffolds, and would be stored on the user device when the user installs the data management platform on the user device. Because these offers can be programmed into the data management platform during development, the entity responsible for providing the good/service, such as a vendor, or the data management platform may not be aware that an offer was made to a user until a notification of acceptance is received from that user.

The universal data scaffolding enables all users to use the same storage architecture and rules to create various content types. Consequently, an entity responsible for supporting the storage of various content types need not worry about users generating digital contents of different content types that are incompatible with one another. Instead, the universal data scaffold can represent shared, common content types that share a commonality across the users of data management platform in how information is mapped. Thus, each user may populate a personalized database of digital contents using universal data scaffolding that appear similar to every user. This consistency can allow the content types to be universally shared, as well as support the private delivery of analytics/intelligence.

The server can provide an answer to a query generated by a user device without the answer and the query from a server providing the answer. The universal data scaffold can define data structures containing information such as information about restaurants, mechanics, medical conditions, etc. The server creates bundles including two or more data structures containing disparate information, and a unique identifier for each bundle. The server creates a table of contents indicating the unique identifier of a bundle and the information contained in the bundle and sends the table of contents to the user device. The server provides the answer to the query from the user device by receiving the unique identifier (ID) of the bundle and providing the bundle having the unique ID to the user device. While the bundle contains the answer to the query, the server does not know the query or the answer because the bundle contains disparate information.

FIG. 1 is a block diagram illustrating an environment in which the disclosed embodiments can be implemented. The environment 100 includes a data management platform 110 that facilitates storage of digital content, such as digital files, at a server 120. As described above, the data management platform 110 can be implemented in multiple configurations, and the environment 100 illustrates a configuration in which the data management platform 110 is implemented at a user device 105. The data management platform 110 allows the user 135 to perform data management operations such as upload, download, generate, modify, and/or view digital content. In some embodiments, the data management platform 110 can be an app that can be downloaded to the user device 105 from an app store, which can be hosted at a server of a third-party entity 145, and executed at the user device 105 to provide access to the server 120. The server 120 can be accessible via the network 130, such as Internet, local area network (LAN), or wide area network (WAN). The data management platform 110 provides a graphical user interface (GUI) 115 for the user 135 to perform the data management operations. In some embodiments, the data management platform 110 can be a web browser application on the user device 105. The data management platform 110 can store the digital content at the user device 105, e.g., on-device storage component. The data management platform 110 synchronizes with the server 120 to back up any new digital content uploaded or existing digital content modified by the user 135 to the server 120 for storage at a data storage system 125.

The digital content can include any multimedia content such as an image file (e.g., Joint Photographic Experts Group (JPEG) files, Tagged Image File Format (TIFF) files, and Portable Document Format (PDF) files), an audio file (e.g., Waveform Audio (WAV) files and MP3 files), a video file (e.g., QuickTime File Format (QTFF) files, Audio Video Interleaved (AVI) files, and MP4 files), a document, a data record created in the server 120, etc. The user device 105 can be any network-accessible computing device associated with a user 135, such as a mobile phone, a tablet computer, a desktop computer, a laptop computer, a wearable electronic device (e.g., a watch or fitness band), a virtual/augmented reality device, a smart television, or some other internet of things (IoT) device.

The user 135 can upload a first digital content, such as an image of a car, to the data management platform 110 using the GUI 115. The data management platform 110 determines whether the uploaded digital content is in a structured data format as defined by at least one of the multiple universal data scaffolds 155 of the server 120, e.g., a first universal data scaffold. In some embodiments, the data management platform 110 has a copy of all the universal data scaffolds 155 at the user device 105, e.g., which are bundled in the app that is downloaded to and installed at the user device 105. However, if one or more of the universal data scaffolds 155 or other ad hoc data scaffolds that are at the server 120 but not available at the user device 105, the data management platform 110 can retrieve them from the server 120. If the first digital content is not in the structured data format defined by the first universal data scaffold, the data management platform 110 transforms the first digital content to the structured data format based on the first universal data scaffold, e.g., as described at least in association with FIG. 5 below, and stores the first digital content in the user device 105. The user 135 can upload digital content to the data management platform 110 from the user device 105 and/or from one or more digital content sources 140, such as an external storage device connected to the user device 105, or online data storage services. The data management platform 110 enables the user 135 to view the digital contents in the GUI 115 example of which is described at least with reference to FIG. 7B below. The user 135 can navigate through the GUI 115 to view, edit and/or create digital content.

The data management platform 110 synchronizes the user device 105 with the server 120 to back up the digital content stored at the user device 105 to the server 120, e.g., based on a trigger condition. A trigger condition that initiates the backup of the digital content to the server 120 can include one or more of a scheduled time interval, a receipt of a command from the user 135, opening of the data management platform 110 on the user device 105, closing of the data management platform 110 on the user device 105, number of digital content that has not been backed up exceeds a specified threshold, a memory of the user device 105 consumed by the data management platform 110 exceeds a specified threshold, etc. The server 120 can store the backed up digital content at the data storage system 125.

The data management platform 110 can encrypt the digital content prior to backing them up to the server 120. For example, the data management platform 110 can encrypt a node corresponding to the first digital content and then transmit the encrypted node to the server 120 to back up the first digital content at the data storage system 125. When the node is encrypted, the data management platform 110 generates an encrypted bundle having an encrypted version of (a) the first digital content, including attribute values of the first digital content, and (b) the first universal data scaffold of the first digital content. However, in some embodiments, the universal data scaffolds in the encrypted bundles may not be encrypted as they are not private to a specific user and common across the users of the data management platform 110. The encrypted bundle is then transmitted to the server 120 for storage at the data storage system 125.

The server 120 co-ordinates or facilitates various data management operations performed by the user 135. For example, the server 120 responds to storage requests from the user 135 by storing the encrypted digital content received from the user device 105 at the data storage system 125. The server 120 can also respond to data access requests from the user 135 by retrieving the digital content from the data storage system 125 and forwarding them to the user device 105. The server 120 manages digital contents of multiple users in which each user has a separate user account or user profile at the server 120. The server 120 may store digital contents of multiple users in the data storage system 125.

The server 120 also facilitates zero-knowledge offers in which offers of goods and/or services are stored at user devices but are displayed to those users who satisfy a specified criterion, and the eligible user, if interested, may then accept, reject, or ignore the offer. Neither the server 120 nor a vendor, e.g., one of the third-party entities 145, who provided the offer to the server 120 to be distributed to the users may know to which users a specified offer was displayed until a user accepts the specified offer.

The data management platform 110 is also compatible with data storage archives that are designed based on customized data scaffolds. A customized data scaffold archive 150 manages digital content that are structured based on customized data scaffolds, that is, a data scaffold that is different from the universal data scaffold defined in the data management platform 110. For example, a car dealer may want to have a different data scaffold for a car than the universal data scaffold defined for a car by the data management platform. That is, the customized data scaffold can have a first set of attributes defining a car, whereas the universal data scaffold may have a second set of attributes. The data management platform 110 includes an application programming interfaces (APIs) that enable importing and/or exporting digital content from/to the customized data scaffold archive 150 while still maintaining the structured data associated with the digital content. The APIs can determine differences between the two data scaffolds (e.g., universal data scaffold for a car and the customized data scaffold for the car), obtain attribute values for any attributes that need to have a value but don't, and store the digital content with the corresponding structured data accordingly. In some embodiments, the customized data scaffold archive 150 can be created by the same entity as the data management platform 110 and then offered to another entity, e.g., a buyer such as an organization, for sale.

Figure 2:
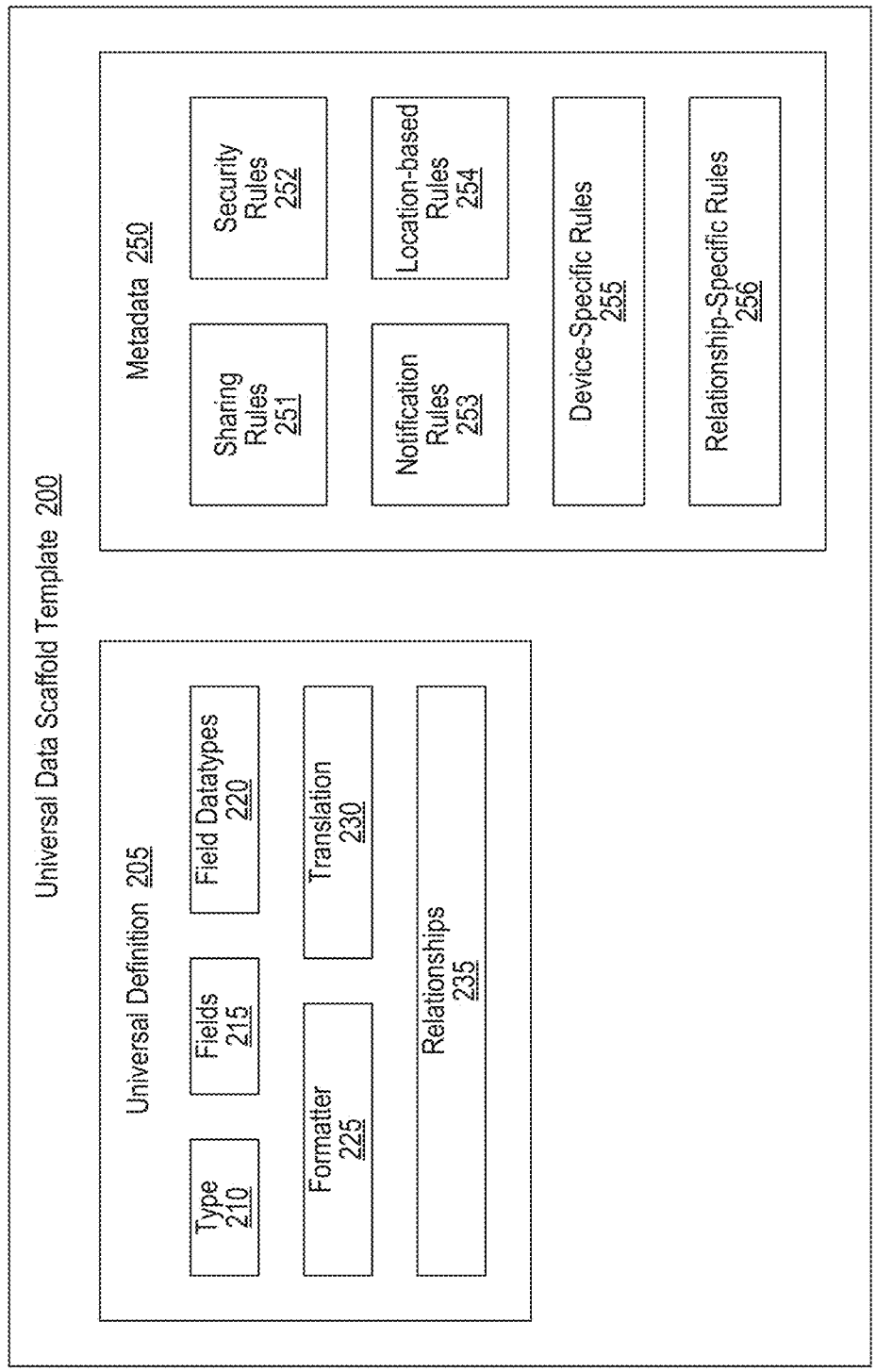
FIG. 2 is a block diagram of a universal data scaffold template implemented by the data management platform of FIG. 1, consistent with various embodiments.

FIG. 2 is a block diagram of a universal data scaffold template 200 implemented by the data management platform of FIG. 1, consistent with various embodiments. Structured data allows the data management platform 110 to collect, process, and present information in a more meaningful way. For example, if the user 135 uploads a digital content indicating that they own a vehicle, the data management platform 110 may begin analyzing other digital content to identify a driver license of a primary driver, a license plate, insurance documentation, etc., related to the vehicle. Such an analysis and/or intelligence of the data management platform 110 is made possible using a universal data scaffold, which defines a structured data format for digital belongings to be stored by the data management platform.

A universal data scaffold is defined based on universal data scaffold template 200, which includes universal definition 205 and metadata 250. The universal definition 205 provides a template of variables for defining a set of attributes of a content type. For example, the universal definition 205 includes a type variable 210 that is used to define a content type; a field variable 215 to define one or more attributes of the content type; a field data type variable 220 to define a data type of the attributes; a formatter variable 225 to define a format in which the content type is to be displayed; a translation variable 230 to define translation for one or more attributes; and a relationship variable 235 to define relationship with other digital contents.

The metadata 250 provides various settings and/or rules using which the user can customize the behavior of digital content in the data management platform 110. The sharing rule 251 can be used by the user to set rules for sharing a digital content with other entities, e.g., another user or another user device of the same user. For example, a first user, such as a parent of a child, can define a sharing rule 251 to share a subset of digital contents associated with the child, e.g., immunization records, with another user, such as a nanny.

The security rule 252 can be used to set rules regarding access permissions for a digital content for various entities. For example, the parent can define a security rule 252 to provide the nanny read-only access to the immunization records.

The notification rules 253 can be used to set rules regarding generating notifications. For example, the parent can define a notification rule 253 to generate a notification on a user device associated with the parent, when the child is up for a particular vaccination, which can be determined based on the immunization records stored in the server 120. The notification rule 253 also enables the user to set a frequency of the notification, a timing of the notification of an event prior to the occurrence of the event, etc.

The location-based rule 254 allows the user to define any location-specific rules. For example, the parent can define a location-based specific rule 254 to display a specified digital content, e.g., the immunization record or a doctor's note from a previous visit, when the parent is at or near a pediatrician's clinic, which can be determined based on location-based services in the user device carried by the parent.

The device-specific rule 255 can be used to set rules specific to a particular user device. For example, the parent user can set a device-specific rule 255 rule for showing a specified digital content by default when the data management platform 110 is opened at the user devices, such as to show a first digital content in a first user device and a second digital content in a second user device.

The relationship-specific rules 256 can be used by the user to set rules based on a specified relationship between the digital contents, or between users of the data management platform 110. For example, a first user, e.g., father of a child, can set a relationship-specific rule 256 to share all digital content associated with the child of the first user with a second user, e.g., a mother of the child.

Note that the universal data scaffold template 200 is not limited to the above universal definition 205 and the metadata 250. The universal definition 205 can have more or less definitions, and the metadata can have more or less rules, and other settings associated with the digital content. For example, metadata 250 can include tags and/or references that describe the universal definition 205 with which the metadata is associated. The universal definition 205 can also include links to other related universal definitions 205, such as links shown in FIG. 7A between person 705 and driver's license 726, car 710, etc.

Figure 3:
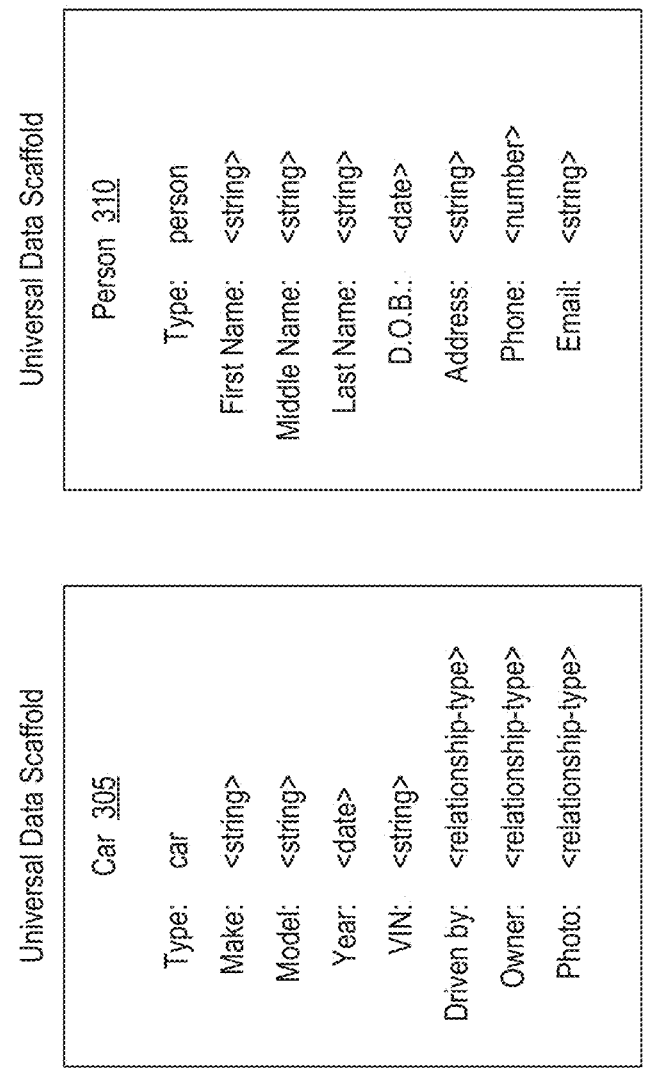
FIG. 3 is a block diagram illustrating examples of universal data scaffold for multiple content types, consistent with various embodiments.

FIG. 3 is a block diagram illustrating examples of universal data scaffold for multiple content types, consistent with various embodiments. The data management platform 110 supports storing digital content of various content types and each content type is defined using a universal data scaffold. A car universal data scaffold 305, which is defined using the universal data scaffold template 200, includes a set attributes that defines a digital content of the type "car." For example, the set of attributes that defines the content type "car" include "make," which is of data type string, "model," which is of data type string, "year," which is of data type date, and "VIN" which is of data type string. When a user stores a digital content of content type of "car" in the data management platform 110, the data management platform 110 obtains attribute values for the above attributes defined in the car universal data scaffold 305, e.g., either by prompting the user to manually provide the above attribute values or by automatically analyzing the digital content, which is described at least with reference to FIG. 5. For example, when the user 135 uploads a first digital content, such as picture of a car, or a bill of sale of the car, the data management platform 110 can analyze the digital content to identify the content type as "car", and obtain attribute values from the first digital content for the attributes make, model, and year as "Ford," "Fusion," and "2014," respectively.

The car universal data scaffold 305 further includes relationship attributes such as "driven_by," "owner" and "photo" which define a relationship with other digital content, such as a person who drives the car, a person who owns the car, and a photo of the car, respectively. That is, the relationship attribute can identify a digital content related to the first digital content. Further, the related digital content can be of the same content type as the first digital content or of different content type. For example, the first digital content, such as a Ford Fusion car of the above example, can have a second digital content of type "person," which can be a data record of the user "John," as an attribute value of the relationship attributes "driven_by" and the "owner," and a third digital content of type "photo" can be an attribute value of the attribute "photo." In some embodiments, it is because of such relationships between different digital contents or content types, the data management platform 110 can mine the data storage system 125 for determining related digital content and link/or connect the related digital content. In some embodiments, the data management platform 110 will also prompt the user 135 when the user 135 uploads a digital content of the first content type to identify a related digital content, which can be of the same or different content type, in which such a determination is made based on the relationship attributes defined in the universal data scaffold for the first content type.

Note that some attributes of the car universal data scaffold 305, such as make, model, year and VIN, are native to the content type to which the universal data scaffold corresponds, e.g., direct values of the digital content, while other attributes, such as "driven_by," "owner," and "photo" are of derived type, e.g., values are derived from other content type. Further, note that not all attributes of a universal data scaffold may have attribute values. For example, the user 135 may not input, or the data management platform 110 may not determine, a value of a particular attribute, e.g., a VIN, of the car universal data scaffold 305. In some embodiments, the universal data scaffold may define at least some attributes as mandatory, which requires the user to input the value if the data management platform 110 is not able to determine one.

The car universal data scaffold 305 is defined based on the universal data scaffold template 200. For example, the type "car" corresponds to the type variable 210, the attributes make, model, year and VIN corresponds to the field 215 variable and the data types of the attributes correspond to the field data type variable 220, and the relationship attributes "driven_by," "owner," and "photo" correspond to the relationship variable 235. The universal data scaffold template 200 also allows the user 135 to define ad hoc relationships between digital contents. Note that a universal data scaffold may not define all variables of the universal data scaffold template 200. The car universal data scaffold 305 can also include metadata (not illustrated), such as the metadata 250, which includes various settings and/or rules that the user can set or customize. In some embodiments, the rules in the metadata can have default values, which the user 135 can choose to customize.

FIG. 3 also illustrates a person universal data scaffold 310, which is used to define a content type "person." That is, the person universal data scaffold 310 defines structured data associated with a person, and can include attributes such as a first name, middle name, last name, date of birth, address, email, and phone. The user 135 can use the person universal data scaffold 310 to store information associated with a person. A digital content of type "person" can be created in various ways, e.g., by uploading a picture of a person, identification document of a person, or just by creating a data record of the person in the GUI 115. For example, a digital content of type "person" for a user, John, can have attribute values such as "John," "M.," "Grisham," "Dec. 31, 1899" for the attributes a first name, middle name, last name, and date of birth, respectively, defined in the person universal data scaffold 310. In the example of car universal data scaffold 305, John can be represented as the driver and owner of the ford fusion car by linking the first digital content, which represents the Ford Fusion car, with the second digital content, such as a data record of John, by inputting the attribute values of the relationship attributes "driven_by" and the "owner," as "person.p1," wherein "person" is content type of the second digital content and "p1" is an object identifier of the second digital content. Note that the above syntax is just for illustration and various other forms of representation may be used for specifying a digital content as an attribute value.

The universal data scaffolding enables the data management platform 110 to make intelligent determinations because the universal data scaffolding is common across the users of the data management platform 110. For example, the data management platform 110 may be able to determine when the driver license, license plate, lease term, or insurance coverage will expire, and then take appropriate action, such as generating a notification at the user device 105 reminding the user 135 to renew the driver's license.

Figure 4:
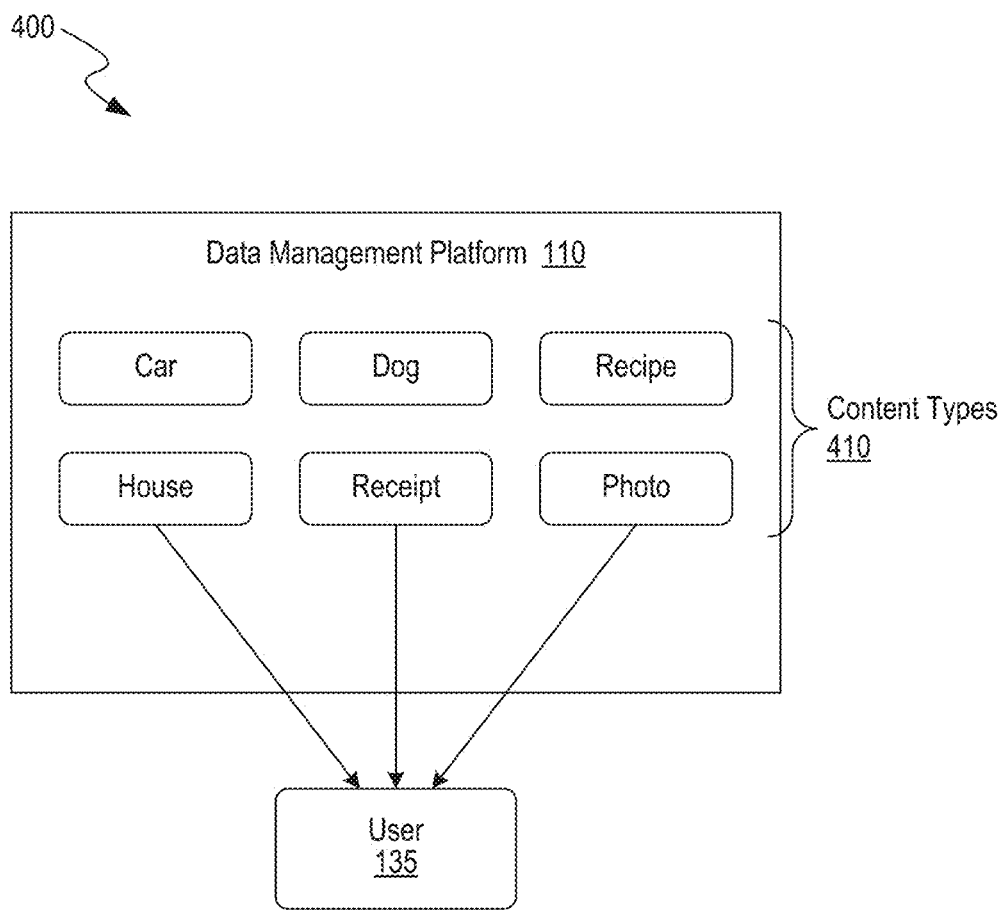
FIG. 4 is a block diagram illustrating an example of various content types supported by the data management platform, consistent with various embodiments.

The data management platform 110 defines various such universal data scaffolds for different content types. FIG. 4 is a block diagram illustrating an example 400 of various content types supported by the data management platform 110, consistent with various embodiments. The user 135 can upload digital content of many content types, e.g., content types 410, to the data management platform 110. In the example 400, the content types 410 supported by the data management platform 110 include a car, a dog, a recipe, a house, a receipt, and a photo. Each of the content types 410 is defined using a separate universal data scaffold. For example, the content type "car" is defined using the car universal data scaffold 305 of FIG. 3. Similarly, the content type "dog" can be defined using a dog universal scaffold, which can include attributes such as a breed, name, date of birth, photo, medicine, tag, Vet, walker, and genetic test. By building a storage archive of digital content of various content types 410, and structuring the digital content using the universal data scaffolds, the data management platform 110 can make intelligent determinations about various aspects of the digital content, such as keeping track of various dates and generating notification reminders and/or making recommendations to the user 135. For example, if the user 135 has stored digital content of type "dog," such as pictures and/or information about a dog of the user 135, the data management platform 110 can make a recommendation to the user 135 to get a genetic test done for the dog in an event the data management platform 110 determines that there are no attribute values associated with the attribute "genetic test" of the dog universal data scaffold.

Figure 5:
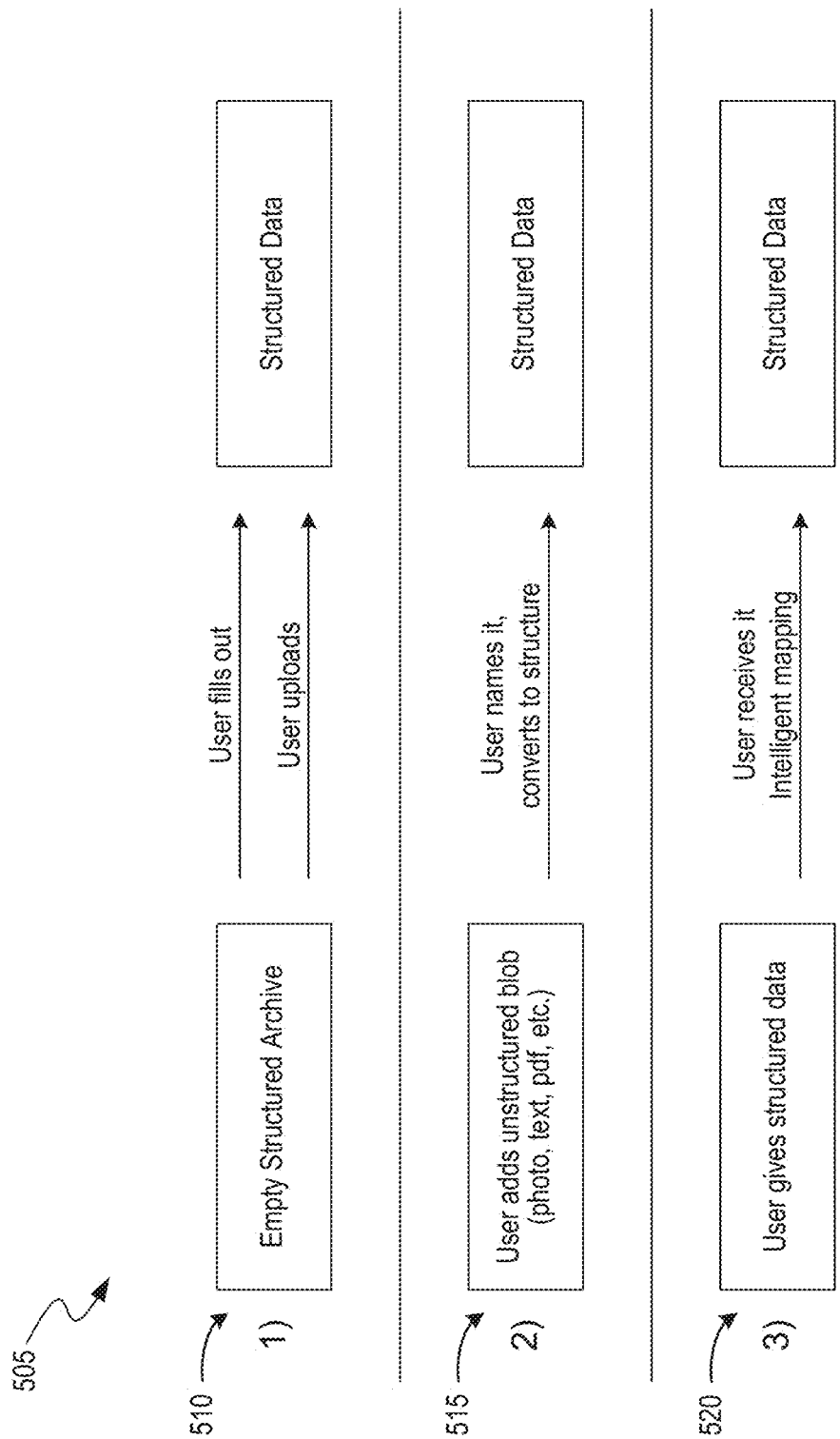
FIG. 5 is a block diagram of examples of structuring digital content uploaded to the data management platform based on the universal data scaffolds, consistent with various embodiments.

FIG. 5 is a block diagram of examples of structuring digital content uploaded to the data management platform 110 based on the universal data scaffolds, consistent with various embodiments. In the examples 510-520, the data management platform 110 receives the digital content, analyzes the digital content to determine if any transformation to structured data is necessary, transforms, if necessary, the unstructured data to structured data based on a universal data scaffold associated with the content type of the digital content, and then stores the digital content in association with the universal data scaffold.

In the first example 510, the data management platform 110 identifies a content type of the digital content based on one or more input fields using which the user 135 inputs data associated with the digital content, and then stores the digital content in association with a universal data scaffold of the identified content type. The GUI 115 can provide different sets of input fields for receiving data of different content types. That is, certain input fields may be directly associated with certain universal data scaffold. Accordingly, by the virtue of the user 135 entering information in those fields, the data management platform 110 may inherently understand the content type and the structure of the data being entered. For example, the GUI 115 can include a first set of input fields configured to receive data for content type "car." The data management platform 110 determines that any data input using the first set of input fields is structured data associated with the content type "car," and therefore, stores that structure data in association with the car universal data scaffold.

Figure 6:
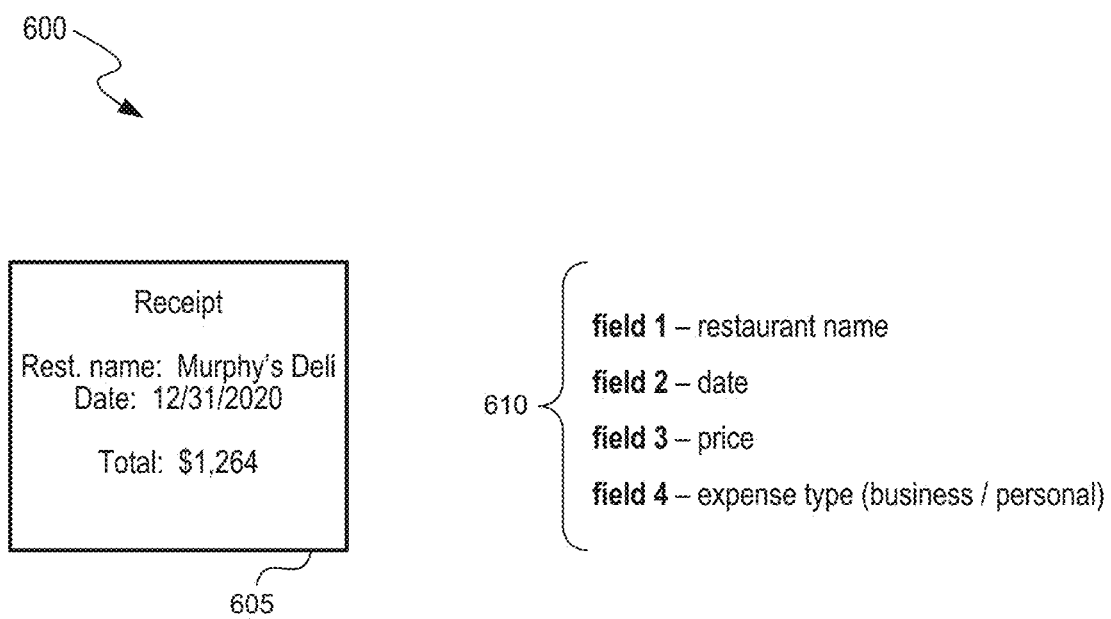
FIG. 6 is a block diagram of an example of analyzing unstructured data associated with digital content to transform the unstructured data to a structured data of a specified content type, consistent with various embodiments.

In the second example 515, the data management platform 110 determines the content type of the uploaded digital content automatically, prompting the user 135 to identify the content type, or a combination. FIG. 6 is a block diagram of an example 600 of analyzing unstructured data associated with digital content to transform the unstructured data to a structured data of content type "receipt," consistent with various embodiments. The user 135 can upload an image file 605, which is a scan of a restaurant bill. The data management platform 110 can analyze the image file 605 using various techniques, e.g., optical character recognition (OCR), and identify the word "Receipt," "bill" or the like in the image file 605, and determine the image file 605 to be of content type "receipt." The data management platform 110 can also determine the content type based on at least one of user input, machine learning techniques, or deductive inference rules. After determining the content type, the data management platform 110 can then retrieve the receipt universal data scaffold, which is a universal data scaffold defined for content type "receipt," and determine a set of attributes 610 of the receipt from the receipt universal data scaffold, such as a restaurant name, date, price, and expense type. The data management platform 110 can continue to analyze the image file 605 to obtain or extract attribute values for the set of attributes 610. For example, the data management platform 110 can obtain the values for the attributes restaurant name, date, and price as "Murphy's Deli," "Jun. 2, 2017" and "$1264," respectively. However, the data management platform 110 may not obtain the value for the attribute expense type. The data management platform 110 may prompt the user 135 to identify the expense type and receive the value from the user 135. Thus, the data management platform 110 has transformed the unstructured data associated with the image file 605 to structured data of a content type "receipt" based on the receipt universal data scaffold.

In the example 600, the data management platform 110 determined some attribute values automatically and some by seeking input from the user 135. In some embodiments, the data management platform 110 may automatically determine the necessary information in determining the structured data and not seek any input from the user 135. For example, if the expense type is not a mandatory field, the data management platform 110 can end the analysis process after determining the attribute values for the other attributes (e.g., restaurant name, date, and price) and store the structured data. In some embodiments, the data management platform 110 can be even more interactive with the user 135 in determining the necessary information for generating the structured data. For example, if the data management platform 110 is not able to automatically determine the content type, the data management platform 110 may present a question such as "What is this content? Please choose content type" and present a list of content types for the user 135 to choose from. In some embodiments, the data management platform 110 may have automatically determined the content type as "receipt" but the accuracy of the determination may be below a predefined threshold, and therefore, the data management platform 110 can present a question such as "Is this a receipt? Please confirm or choose another content type." The data management platform 110 can continue to ask the user 135 to confirm after each attribute value is determined or all at once.

Continuing with FIG. 6, in yet another example, the data management platform 110 can be configured, e.g., using one of the rules in metadata associated with receipt universal data scaffold, to request if the user 135 wants to add a mileage receipt if the expense type of the restaurant bill is "business." The degree of automation, or in other words, interaction between the user 135 and the data management platform 110, in transforming the unstructured data to structured data can be configured by the user 135, e.g., in one of the setting options provided by the data management platform 110. For example, the degree of automation can be configured in three different levels as "low," "medium," and "high" in which low indicates a lowest of three levels of automation—the number of questions presented to the user may be above a first threshold, "high" indicates a highest level of automation—the number of questions presented to the user 135 may be below a second threshold (second threshold being lower that first threshold), and "medium" indicates a level of automation between "low" and "high"— the number of questions presented to the user 135 may be between the first and second thresholds.

Referring back to FIG. 5, in the third example 520, the user 135 inputs the digital content of a specified content type in a structured format, and the data management platform 110 intelligently identifies the content type and stores the digital content in association with the universal data scaffold defined for the corresponding content type. For example, the user 135 can specify that the user is uploading an image file of a W2 document, or the data management platform 110 analyzes the W2 document, e.g., using OCR, to determine the image file is of type "W2," and the data management maps the image file to the W2 universal data scaffold. The data management platform 110 continues to analyze the W2 document, e.g., using OCR, to obtain the attribute values of the attributes defined in the W2 universal data scaffold, and stores the structured data, e.g., the image file and attribute values, in association with the W2 universal data scaffold. In some embodiments, the user 135 can receive a digital content in structured data format from another user of the data management platform 110 and upload the received digital content to the data management platform 110. In such embodiments, the data management platform 110 can readily identify the structured data based on the universal data scaffold associated with the received digital content, and store it accordingly.

Structured data allows the data management platform 110 to collect, process, and present information in a more meaningful way. For example, if the user 135 uploads a digital content, such as an image of a car or a data record of the car, indicating that they own a vehicle, the data management platform 110 may begin analyzing other digital content to identify a driver license of a primary driver, a license plate, insurance documentation, etc., related to the vehicle. The data management platform may automatically link those digital contents as related to the car, prompt the user 135 to confirm that the documents are indeed related, or even prompt the user 135 to identify the related documents. Such an analysis and/or intelligence of the data management platform 110 is made possible by the use of a universal data scaffold.

Figure 7A:
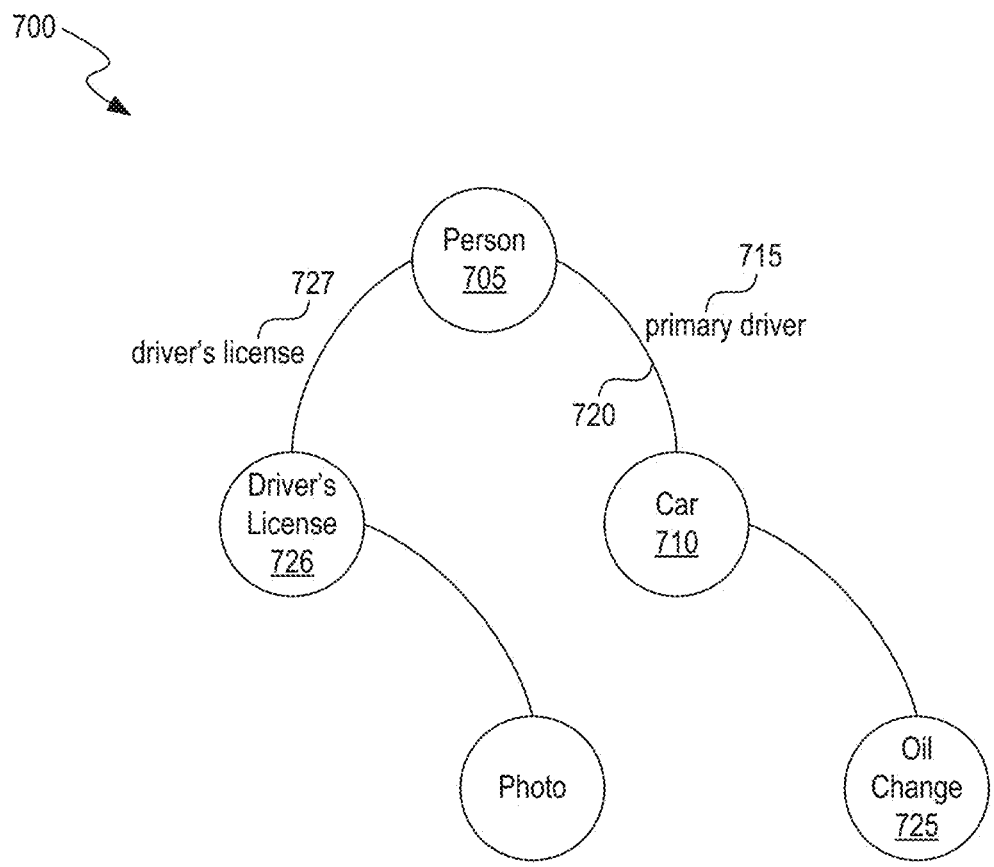
FIG. 7A is an example of a graph of the digital contents associated with a user, consistent with various embodiments.

FIG. 7A is an example of a graph 700 of the digital contents associated with a user, consistent with various embodiments. As described above, the digital contents are stored in the data storage system 125 as a graph database, for example as graph 700. The graph 700 represents digital contents as nodes, and relationships between the digital contents as edges connecting the nodes. For example, the graph 700 represents a first digital content, such as a data record or photo of a person, as a first node 705, a second digital content, such as a data record or photo of a car, as a second node 710, and a third digital content, such as an oil change receipt, as a third node 725. Further, an edge 720 connecting the first node 705 and the second node 710 indicates a relationship 715 of "primary driver" between the digital content corresponding to the nodes in which the person corresponding to the first node 705 is a primary driver of the car corresponding to the second node 710.

Figure 7B:
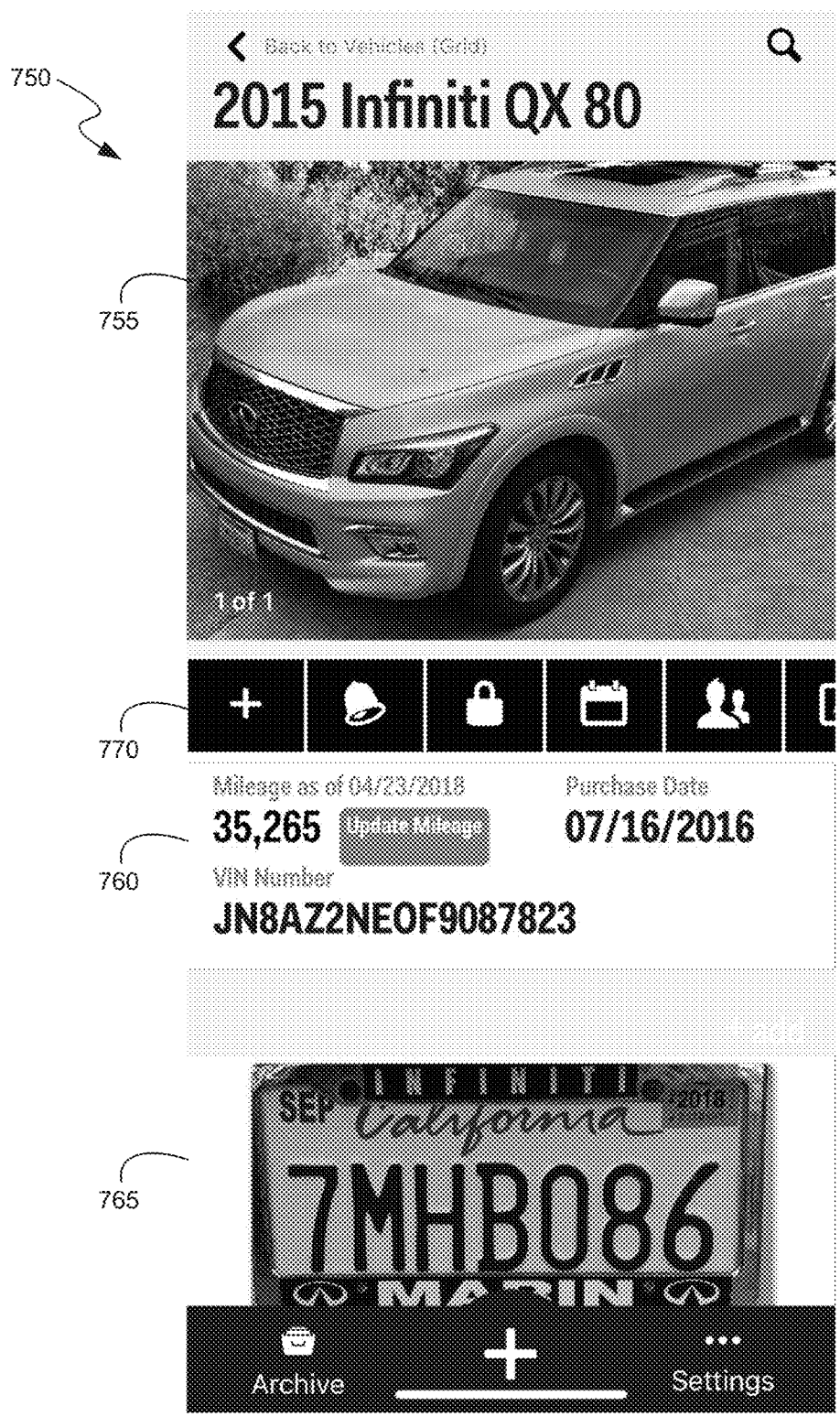
FIG. 7B is an example of a graphical representation of the digital contents in a graphical user interface, consistent with various embodiments.

FIG. 7B is an example of a graphical representation 750 of the digital contents in a GUI, consistent with various embodiments. In some embodiments, the graphical representation 750 can be generated in the GUI 115. The graphical representation 750 includes a digital content such as a picture 755 of a car, and multiple attributes 760 of the car, such as mileage, purchase date and VIN of the car. The picture 755, and attributes 760 and their values can be obtained from the graph 700, e.g., second node 710. The graphical representation 750 also displays a license plate picture 765 of the car, which can be obtained from the second node 710 if the license plate is defined as an attribute of the car, or from another node (not illustrated) of the graph 700 if the license plate is defined as a related digital content.

The graphical representation 750 also includes a tool bar 770 that provides several GUI elements using which the user 135 can perform several data management operations, such as add or remove a picture, change attribute values associated with the digital content displayed in the graphical representation 750, or identify related digital content. In some embodiments, at least some of the operations allowed by the tool bar 770 are context sensitive to the type of digital content displayed in the graphical representation 750, which is determined based on the universal data scaffold the digital content is associated with. For example, if the content type is a car such as the car 755 in the graphical representation 750, then based on the car universal data scaffold 305, the tool bar 770 can allow the user 135 to perform operations pertinent to the content type "car" such as viewing additional pictures of the car 755; viewing/editing a primary driver or owner associated with the car 755; viewing/editing attribute values associated with the car 755; viewing/editing maintenance records associated with the car 755; viewing/editing important dates associated with the car 755, such as an expiration date of the registration of the car; etc. In another example, if the content type of the digital content displayed in the graphical representation 750 is a "person", then based on the person universal data scaffold 310, the tool bar 770 can allow the user 135 to perform operations including viewing additional pictures of the person; viewing/editing attributes associated with the person such as a first name, middle name, last name, a photo of the person; viewing/editing contact details; viewing/editing family or friends information associated with the person; viewing/editing important dates associated with the person, such as birthday, wedding anniversary, etc. Note that the graphical representation 750 can include GUI elements other than the tool bar 770, which can provide the same operations as the tool bar 770 or different operations.

Figure 7C:
FIG. 7C is another example of a graphical representation of the digital contents in a GUI, consistent with various embodiments.

FIG. 7C is another example of a graphical representation 775 of the digital contents in a GUI, consistent with various embodiments. The graphical representation 775 includes a digital content such as a picture 776 of a car, and multiple attributes 777 of the car, all of which can be obtained from a graph of the digital contents, such as second node 710 of the graph 700. The graphical representation 775 also displays a license plate picture 779 of the car, which can be obtained from the second node 710. The graphical representation 775 also displays information regarding a primary driver of the car 776, which can be obtained from the first node 705 based on the relationship 715. The graphical representation 775 also displays information regarding a primary driver 778 of the car 776, which can be obtained from the first node 705 based on the relationship 715, and a picture of the driver's license of the primary driver 778, which can be obtained from the third node 726 based on the relationship 727.

Figure 7D:
FIG. 7D is another example of a graphical representation of the digital contents in a GUI, consistent with various embodiments.

FIG. 7D is another example of a graphical representation 780 of the digital contents in a GUI, consistent with various embodiments. The graphical representation 780 includes the picture 776 of the car, the license plate picture 779 of the car and a first section 781 that displays information regarding insurance policy of the car 776, which can be obtained from a specified node (not illustrated) related to the second node 710 based on the relationship such as "insurance policy." The graphical representation 780 also displays the insurance policy documents 782, which can be obtained from the specified node. In some embodiments, the user 135 may navigate to the graphical representation 780 by scrolling the graphical representation 775.

Figure 7E:
FIG. 7E is another example of a graphical representation of the digital contents in a GUI, consistent with various embodiments.

FIG. 7E is another example of a graphical representation 785 of the digital contents in a GUI, consistent with various embodiments. The graphical representation 785 includes the picture 776 of the car and a second section 786 that displays information regarding the insurance policy of the car 776, such as insurance agent and carrier, which can be obtained from a specified node (not illustrated) related to the second node 710 based on the relationship such as "insurer." In some embodiments, the user 135 may navigate to the graphical representation 785 by selecting one of the GUI elements in the graphical representation 780.

In some embodiments, the data management platform 110 downloads or caches a subset of the digital content associated with the user 135 at the user device 105. The user 135 may navigate through the graphical representation 750 to view different digital contents and if a digital content is not stored in the user device 105, then the data management platform 110 obtains the digital content from the server 120. For example, in the graphical representation 750 if the user 135 selects an option from the tool bar 770 to view information regarding the owner or the primary driver of the car, and if the corresponding data, e.g., the first node 705, is not stored at the user device 105, the data management platform 110 can fetch the first node 705 from the server 120, and then retrieve the details of the owner, such as a picture and name of the owner, from the first node 705, and display the details of the owner in the graphical representation 750.

In some embodiments, the data management platform 110 can display some of the digital contents in the graphical representation 750 by default, e.g., when the data management platform 110 is opened by the user 135. The data management platform 110 can select the digital contents to be displayed by default regardless of whether the user 135 requested for them. The selected digital contents are fetched from the server 120 and cached at the user device 105. The selection can be done based on context associated with the user 135, such as, the geographical location the user 135 is at, the date/day/time of the year/month/week, another user the user 135 is with, most frequently viewed digital content, most recently viewed digital content, digital content indicated as favorite, based on chronological order of the digital content added, based on a prediction that the user 135 may access a specified digital content (which can be determined based on a data access pattern of the user 135), any other real-time characteristic associated with the user 135, such as relevance of a current occasion, date, time, day, year, geographical location, etc. For example, if the user 135 is at a particular place, such as "Golden Gate" bridge in San Francisco, California, USA, the graphical representation 750 may display pictures that were captured at or near the Golden Gate bridge. In another example, if the user 135 is at a pediatrician clinic, and if the data management platform 110 determines that the user 135 has stored digital content associated with a child, such as immunization records of the child, results of lab tests, or medical reports, the graphical representation 750 may display the corresponding digital content. In still another example, the data management platform 110 may determine on a specific day that a year ago on the same date, the user 135 was vacationing in Hawaii, and the graphical representation 750 may display pictures associated with the vacation in Hawaii. In still another example, the data management platform 110 may determine that a specific day is a birthday of the user 135, and the graphical representation 750 may display on the birthday of the user 135 pictures associated with prior birthday celebrations of the user 135. In yet another example, if the data management platform 110 determines that the user 135 is with another user of the data management platform 110, a second user, the graphical representation 750 may display digital content associated with both the users, e.g., pictures of occasions that are associated with both the users such as a get-together of both the users. In some embodiments, the user 135 may also customize the display settings in the data management platform 110 that indicates user-defined criteria for selecting digital content to be displayed in the graphical representation 750 by default.

The structured data associated with the digital content, which is generated based on universal data scaffolds of the corresponding content type, enables the data management platform 110 to identify the related digital content, relationships between the digital content and generate the graphical representation 750. By representing the digital content as a semantic graph, such as in the graph 700, the data management platform 110 gives more meaning and/or context to the digital content hosted by the data management platform 110. The user 135 can make more meaningful use of the digital content. For example, while the second node 710, which corresponds to a car has structured information such as a first name, middle name, last name, a photo of the person, the relationships the second node 710 has with other nodes is what gives the structured data its context or meaning, such as (a) the car is driven by the person corresponding to the first node 705 and (b) oil change was performed on the car as indicated by the third node 725. In another example, the user 135 can quickly and easily navigate to the node corresponding to the driver's license, and open the driver's license to review, e.g., check the expiration date on the driver's license.

In some embodiments, the user 135 can share a digital content with another user of the data management platform 110. For example, a specified user can request the data management platform 110 at the specified user's user device to obtain a group of digital contents associated with the user 135. When the data management platform 110 on the user device 105 receives the request, the data management platform 110 at the user device 105 determines based on the metadata, e.g., sharing rules, associated with the universal data scaffolds of the group of digital contents, whether the group of digital contents can be shared with the specified user. In an event the data management platform 110 at the user device 105 determines that the group of the digital contents can be shared with the specified user, the data management platform 110 sends a message having the group of the digital contents to the specified user's user device. In some embodiments, the message can be sent to the specified user's user device via the server 120. The data management platform 110 at the specified user's user device receives the message, and performs the necessary operations to merge the received group of digital contents with the digital contents associated with the specified user, e.g., based on the universal data scaffolds associated with the digital contents being merged, and displays the group of digital contents to the specified user, e.g., in the graphical representation 750.

Figure 8:
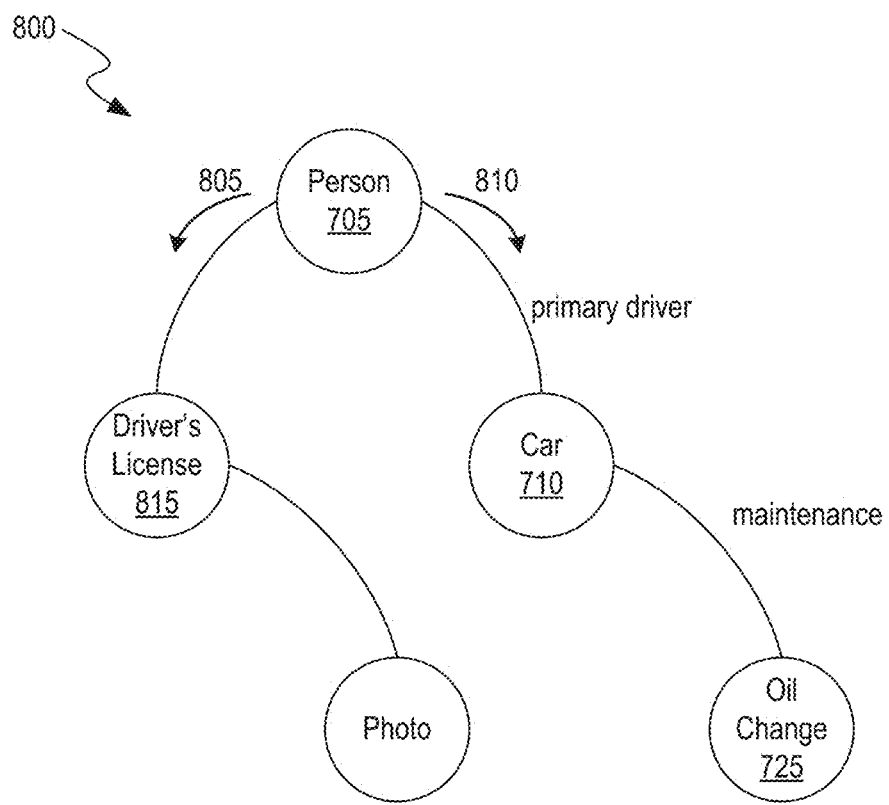
FIG. 8 is a block diagram of an example for generating recommendations based on intelligence derived from a graph of the digital contents, consistent with various embodiments.

FIG. 8 is a block diagram of an example for generating recommendations based on intelligence derived from a graph 800 of the digital contents, consistent with various embodiments. In some embodiments, the graph 800 is similar to the graph 700 of FIG. 7A, and the graph 800 may contains a subset of the entire digital content associated with the user 135. The data management platform 110 can make use of the structured data associated with the digital content and the relationships between the nodes in the graph 800 to derive various types of intelligence, and generate recommendations, offers and/or notifications based on the derived intelligence. For example, the data management platform 110 can analyze the graph 800 to make a recommendation for a scenario such as "Is there a car that has not had maintenance in 3 months?" and if so, generate a recommendation to recommend the user 135 to get the maintenance work done on the car. The data management platform 110 can also generate a notification that reminds or alerts the user 135 that a maintenance is due soon or past due. Furthermore, the data management platform 110 can also present an offer for maintenance work from a particular vendor (e.g., one of the third-party entities 145) to the user 135.

In some embodiments, to derive intelligence for such scenarios, the data management platform 110 can navigate the graph 800 in various paths (e.g., series of edges) and test for the presence/absence of nodes, and filter on attributes of the nodes and edges. For example, to derive the intelligence for the above scenario, the data management platform 110 navigates a first path 810 from first node 705 to third node 725 to determine if the person is associated with a car, and since the person is associated with the car as indicated by the second node 710 the data management platform 110 proceeds to determine if the car is associated with a maintenance record, and since the car is associated with a maintenance record as indicated by the third node 725, the data management platform 110 proceeds to determine from the attributes of the third node 725 a date of the recent most maintenance. If the date of the maintenance is outside of 3 months, the data management platform 110 can proceed with generating a recommendation for the user 135, which can be displayed to the user 135 in the GUI 115.

In another example, the data management platform 110 can similarly navigate a second path 805 from first node 705 to the fourth node 815 to determine if the person's driver license is due to expire in a specified period, e.g., 3 months, and if so, generate an appropriate recommendation.

In some embodiments, each such scenario can be expressed as a query, and the result of the query is what triggers the data management platform 110 to make a recommendation or extend an offer.

Figure 9:
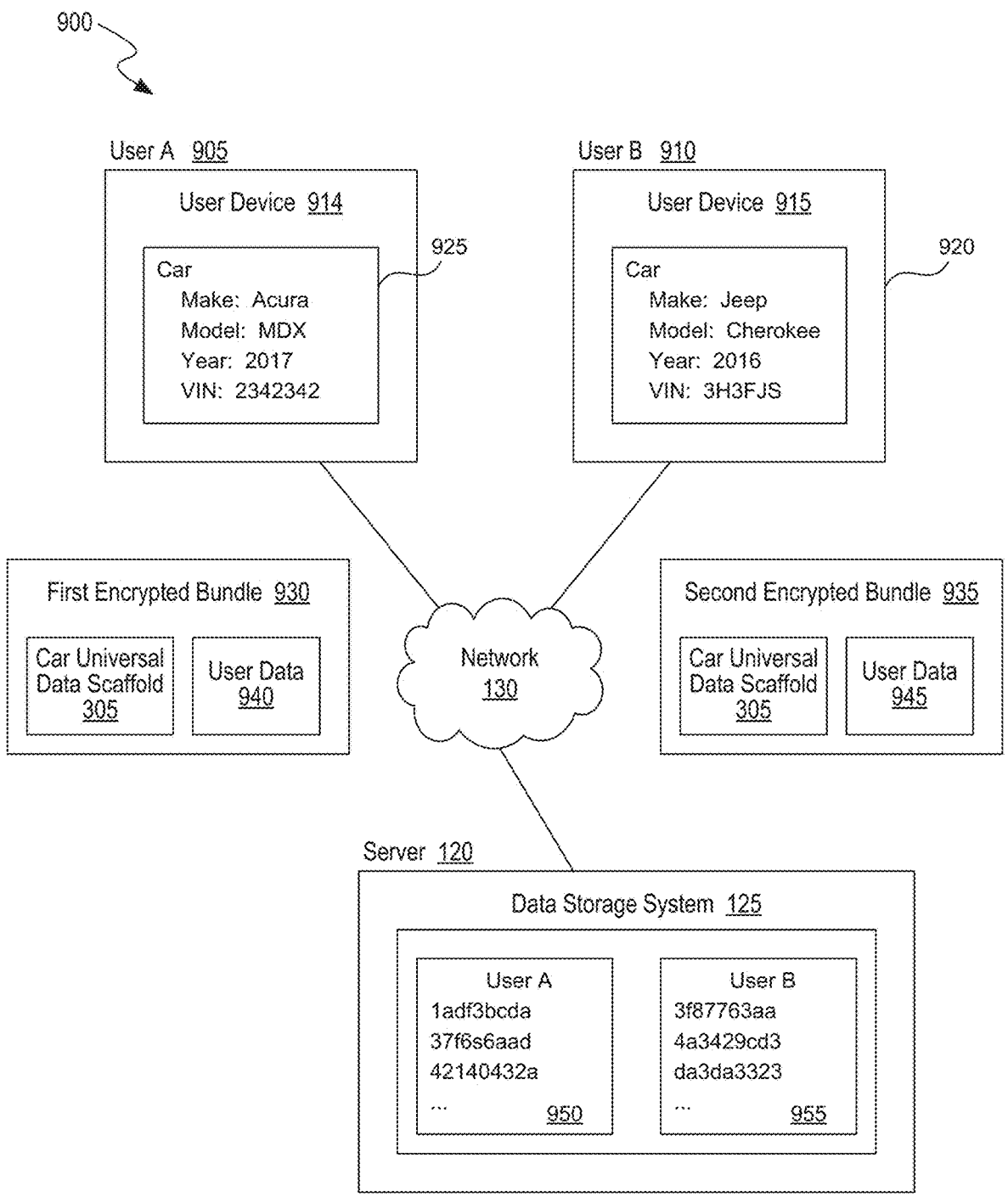
FIG. 9 is a block diagram of zero-knowledge encryption of digital content, consistent with various embodiments.

FIG. 9 is a block diagram of zero-knowledge encryption 900 of digital content, consistent with various embodiments. In some embodiments, the zero-knowledge encryption 900 can be implemented in the environment 100 of FIG. 1. The data management platform 110 encrypts the digital content associated with the user 135 prior to backing them up to the server 120 so that the digital content stored at the server 120 is secure. In some embodiments, the data management platform 110 performs the encryption using zero-knowledge encryption 900, which means that the digital content is stored at the server 120 in an encrypted bundle and the server 120 has no knowledge of the encrypted contents of the encrypted bundle since the server 120 does not have access to an encryption key used for encrypting the digital content at the user device 105.

In the zero-knowledge encryption 900 of FIG. 9, digital contents of two users, such as user A 905 and user B 910 are encrypted. The user A 905 uploads a first digital content 925 from a user device 914, and user B 910 uploads a second digital content 920 from a user device 915. In some embodiments, the users 905 and 910 are similar to user 135 of FIG. 1 and the user devices 914 and 915 are similar to user device 105 of FIG. 1. Further, each of the user devices 914 and 915 can have a copy of the data management platform 110 installed and executing at the corresponding user device. The first digital content 925 and the second digital content 920 are both of content type "car" and therefore, associated with a car universal data scaffold, such as the car universal data scaffold 305 of FIG. 3.

The data management platform 110 stores the digital contents as a graph database in which the digital contents are represented as nodes of the graph. A node can be implemented as a data structure that contains the digital content, attribute values of the digital content, and an edge that connects the node to another node. An edge can be implemented as a data structure that contains the two nodes, which the edge connects, as the attributes of the edge data structure.

In backing up the first digital content 925 to the server 120, the data management platform 110 at the user device 914 encrypts a first node corresponding to the first digital content 925, e.g., using an encryption key, to generate a first encrypted bundle 930. The first encrypted bundle 930, which is typically a blob, includes the car universal data scaffold 305 associated with the first digital content 925, and user data 940 associated with the first digital content 925. The user data 940 includes an encrypted version of the first digital content 925 (e.g., if the first digital content 925 is an image file having a picture of a car, then encrypted version of the image file), including encrypted version of the attribute values of the first digital content 925, e.g., "Acura," "MDX," "2017," and "2342342." The first encrypted bundle 930 is then transmitted to the server 120 for storage at the data storage system 125, e.g., in a storage block 950 allocated to user A 905. The encryption is done at the user device 914, e.g., using an encryption key that only the user device 914 has access to. Since the server 120 would not have access to the encrypted key used the by the user device 914 in encrypting the first digital content 925, the first encrypted bundle 930 cannot be decrypted at the server 120, therefore making the digital content secure at the server 120.

Similarly, the data management platform 110 at the user device 915 encrypts a second node corresponding to the second digital content 920, using an encryption key whose access is restricted to the user device 915, to generate a second encrypted bundle 935. The second encrypted bundle 935 includes the car universal data scaffold 305 associated with the second digital content 920, and user data 945 associated with the second digital content 920, such as an encrypted version of the second digital content 920 and attribute values of the second digital content 920, e.g., "Jeep," "Cherokee," "2016," and "3H3FJS." The second encrypted bundle 935 is transmitted to the server 120 for storage at the data storage system 125, e.g., in a storage block 955 allocated to user B 910.

Note that while the user data can be different for different users for digital contents of the same type, the car universal data scaffold included in the two encrypted bundles are the same as the car universal data scaffold is common across all users of the data management platform 110.

Figure 10:
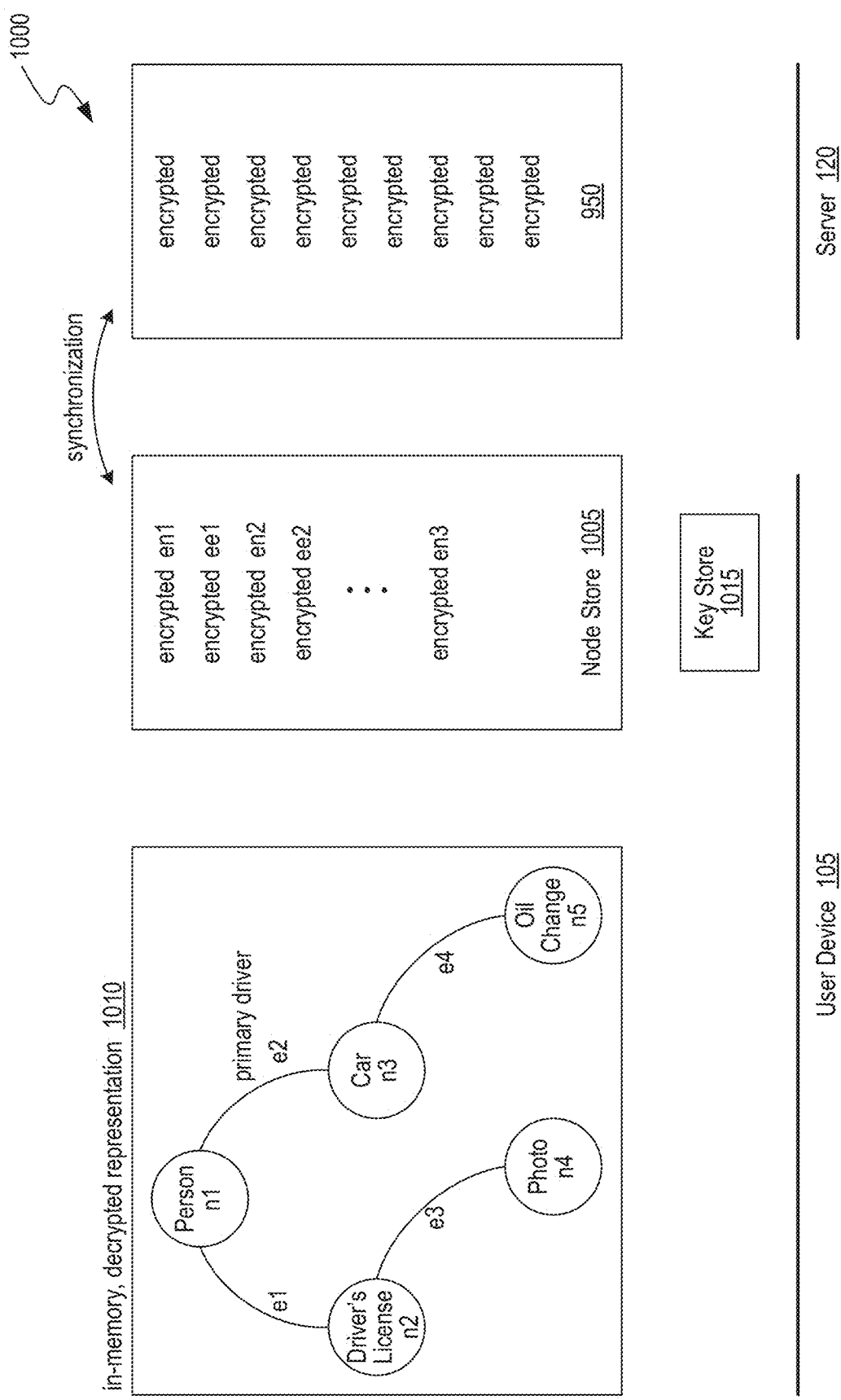
FIG. 10 is a block diagram of an example of storing encrypted bundles in the data management platform and a server, consistent with various embodiments.

FIG. 10 is a block diagram of an example 1000 of storing encrypted bundles in the data management platform 110 and the server 120, consistent with various embodiments. In some embodiments, the example 1000 can be implemented in the environment 100 of FIG. 1, and using the zero-knowledge encryption 900 of FIG. 9. As described above, the data management platform 110 can store the digital content in a graph database as nodes and edges. For example, the five digital contents depicted in the decrypted representation 1010, which can be similar to the graph 700 of FIG. 7A, are stored as five nodes with node identifiers n1-n5 and the four relationships between the nodes are stored as four edges with edge identifiers e1-e4 in a cache memory of the user device 105.

When the user device 105 is synchronized with the server 120, the nodes and edges are encrypted to generate encrypted bundles, and then transmitted to the server 120 for storage as encrypted bundles. In the example 1000, the storage block 950 at the server 120, e.g., more specifically at the data storage system 125 associated with the server 120, stores the encrypted bundles of all the digital content associated with the user 135.

Although the data management platform 110 backs up the encrypted bundles from the user device 105 to the server 120, the data management platform 110 can store encrypted bundles of a subset of the digital content of the user 135 on the user device 105. The example 1000 illustrates a node store 1005 on the user device 105 which stores the encrypted bundles having identifiers en1-en5 corresponding to the nodes n1-n5, respectively, and encrypted bundles having identifiers ee1-ee5 corresponding to the edges e1-e4, respectively (not all encrypted bundles of the nodes n1-n5 and edges e1-e4 are illustrated in the figure). The user device 105 can also have a key store 1015, which stores a mapping of the node identifiers to the encrypted bundle identifiers, and a mapping of the edge identifiers to the encrypted bundle identifiers.

In some embodiments, the data management platform 110 determines the subset of the digital content to be stored at the user device 105, e.g., based on the context associated with the user 135 as described at least with reference to FIG. 7 above, and stores the encrypted bundles of the selected subset.

In some embodiments, the data management platform 110 generates a separate encrypted bundle for each node and edge. By generating separate encrypted bundles for each node and edge, the data management platform 110 facilitates efficient retrieval of the digital content from the server 120, e.g., retrieving one or more digital contents that are requested as opposed to being restricted to retrieving the digital contents as a group regardless of whether or not all digital contents in the group are requested. Such an efficient retrieval minimizes (a) the storage space consumed at the user device 105, (b) the network bandwidth consumed in the retrieval, and (c) the time consumed in retrieving the required digital content.

Figure 11:
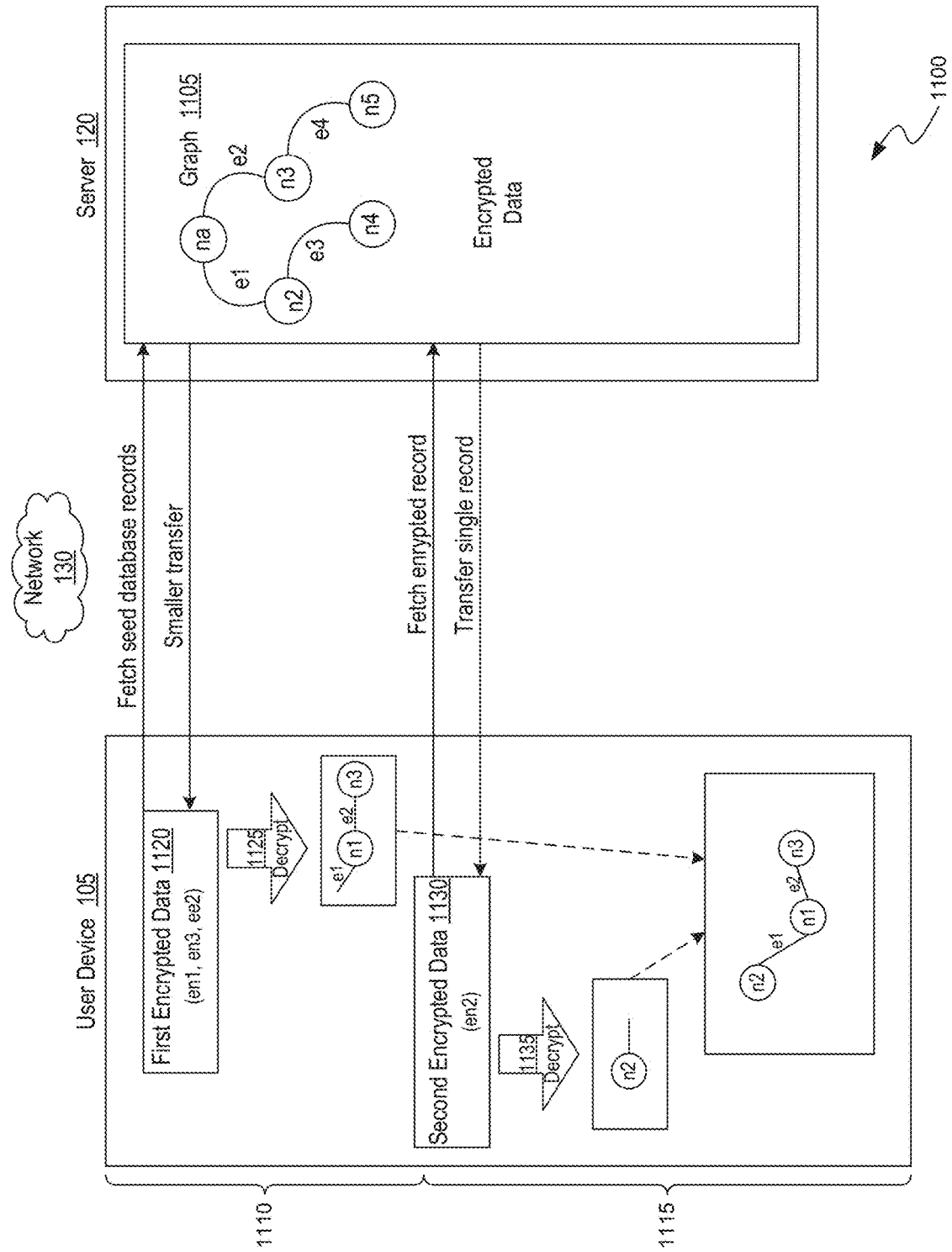
FIG. 11 is an example illustrating zero-knowledge data retrieval from the server, consistent with various embodiments.

FIG. 11 is an example 1100 illustrating zero-knowledge data retrieval from the server 120, consistent with various embodiments. In some embodiments, the example 1100 may be implemented in the environment 100 of FIG. 1. Consider that the server 120 stores the encrypted bundles of digital content corresponding to the graph representation 1105. That is, the server 120 is storing encrypted bundles en1-en5 of the digital content represented by the nodes n1-n5, respectively, and encrypted bundles ee1-ee4 of the relationships represented by the edges e1-e4, respectively.

In a first phase 1110, the data management platform 110 fetches a subset of the digital content as seed records, which are the digital content to be displayed by default in the GUI 115 or the digital content which the user may shortly request to access. In some embodiments, the seed records can be determined based on the context associated with the user 135, e.g., as described at least with reference to FIG. 7 above. In some embodiments, the encrypted bundles of the seed records are retrieved from the server 120 and stored at the user device 105 regardless of whether the user 135 requests those seed records. In the example 1100, consider that data management platform 110 determines digital content represented by nodes n1 and n3 as seed records, and therefore, retrieves the encrypted data 1120, which includes encrypted bundles, en1 and en3, of the nodes n1 and n3, and encrypted bundle, ee2, of edge e2. The data management platform 110 decrypts 1125 the encrypted data 1120 to generate the nodes n1, n3 and edge e2. When the user 135 accesses the GUI 115 to view the digital contents, the data management platform 110 displays the nodes n1, n3 and the edge e2 connecting the nodes n1 and n2 in the GUI 115. The first phase 1110 can be triggered at various instances, e.g., when the context associated with the user 135 changes.

In the second phase 1115, which can be triggered when the user 135 requests for accessing one or more digital contents, the user 135 requests for a digital content corresponding to node n2. The data management platform 110 determines if the node n2 is available at the user device 105, e.g., in the cache memory or the on-device storage. If the node n2 is available at the user device 105, the data management platform 110 presents the digital content corresponding to the node n2 in the GUI 115. On the other hand, if the node n2 is not available, the data management platform 110 determines the encrypted bundle identifier of the node n2, e.g., using the mapping stored in the key store 1015 of FIG. 10, requests the server 120 to retrieve the encrypted bundle en2. After receiving the second encrypted data 1130, which includes the encrypted bundle en2, the data management platform 110 decrypts 1135 the second encrypted data 1130 to generate the node n2. After decrypting the node n2, the data management platform 110 also retrieves the edge IDs of the edges e.g., edge e1, associated with the node n2, determines if those edges are available at the user device 105 (e.g., downloaded as part of seed records), and in the event they are not available, requests the server 120 to retrieve those edges as well. After the encrypted bundles of the edges are received, the data management platform 110 decrypts the encrypted bundles of the edges to generate the edges, e.g., edge e1, and then based on the information in the edge e1, the data management platform 110 connects the nodes n1 and n2 with the edge e1 in the GUI 115.

Figure 12:
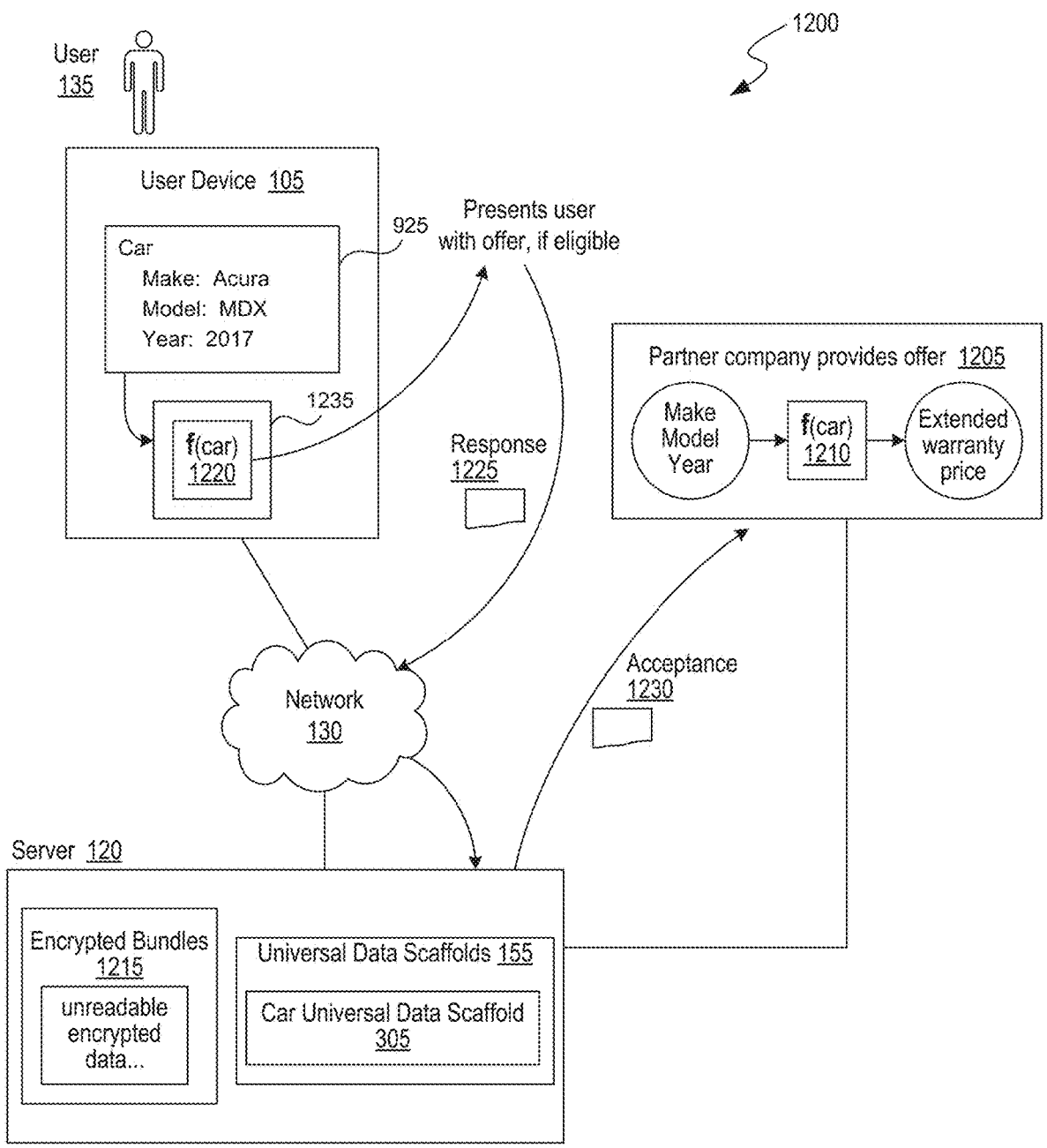
FIG. 12 is a block diagram of an example for presenting offers to users of the data management platform, consistent with various embodiments.

FIG. 12 is a block diagram of an example 1200 for presenting offers to users of the data management platform, consistent with various embodiments. In some embodiments, the example 1200 may be implemented in the environment 100 of FIG. 1. The data management platform 110 also facilitates zero-knowledge offers in which offers of goods and/or services are stored at user devices, e.g., as part of the universal data scaffolds 155, but are displayed to those users who satisfy a specified criterion, and an eligible user, if interested, may then accept, reject, or ignore the offer. Neither the server 120 nor a vendor, e.g., one of the third-party entities 145, who has provided the offer may know to which users a specified offer was displayed until a user accepts the specified offer. In some embodiments, a zero-knowledge offer is an offer that may only be known to the user to whom the offer was displayed until acceptance. An offer just resides on the user devices until the criterion for displaying the offer is satisfied, which is when the offer is presented to the user. No privacy or security of the users are compromised from the zero-knowledge offers. The server 120 stores users' data as encrypted bundles 1215, which can be similar to the encrypted bundles 930 and 935, the contents of which are not readable either by the server 120 or the vendors.

The server 120 receives offers from vendors, e.g., the third-party entities 145, such as an offer 1205 for an extended warranty for a car, to be presented to multiple users of the data management platform 110. The offer 1205 can also include a vendor-defined criterion 1210, which defines the criterion for displaying the offer 1205 to a user. For example, the vendor-defined criterion 1210 can indicate that the offer 1205 is to be presented to users having a car that is older than a specified year, e.g., 2018. In some embodiments, the server 120 redefines or reformulates the vendor-defined criterion 1210 to be compliant with the definition of universal data scaffolds 155. For example, the server 120 can incorporate the appropriate attribute of the car universal data scaffold 305, such as "carUDS.YEAR<2018," in which "carUDS" is the identifier of the car universal data scaffold and "YEAR" is the attribute of the car universal data scaffold 305 in the criterion 1210 to generate a server-defined criterion 1220. Note that the above syntax is just for illustration and various other forms of representation may be used for generating the server-defined criterion 1220. Further, note that the criterion for displaying the offer can be based on attributes of multiple digital contents, and is not restricted to attributes of just one digital content. The server 120 then generates a program code 1235 having the offer 1205 and the server-defined criterion 1220, and includes the program code 1235 as part of the car universal data scaffold 305.

When the users install the data management platform 110 on their user devices, e.g., by downloading the data management platform app to the user device, the universal data scaffolds 155 are downloaded to and stored at the user devices. So, the program code having the offers would also be stored on the user devices as part of the universal data scaffolds 155. For example, the program code 1235 having the offer 1205 will be stored as part of the car universal data scaffold 305 at the user devices. The program code 1235 is executed in the data management platform 110 at the corresponding user devices. For example, the user device 105 executes the program code 1235 in the data management platform 110. Upon execution, the program code 1235 monitors the attribute values of the first digital content 925 to determine if the first digital content 925 satisfies the server-defined criterion 1220, and in an event the attribute values satisfy the server-defined criterion 1220, the program code 1235 presents the offer 1205 to the user 135 in the GUI 115. For example, the program code 1235 determines that the attribute value of the attribute YEAR in the first digital content 925, which is "2017" is less than "2018," and therefore, satisfies the server-defined criterion 1220.

The user 135 can choose to accept, reject, or ignore the offer 1205. If the user 135 chooses to accept the offer 1205, a response 1225 indicating the acceptance is sent from the user device 105 to the server 120. The server 120 can forward the response 1225 as an acceptance 1230 of the offer 1205 to the vendor of the offer 1205. The server 120 or the vendor may not know until the user 135 has accepted the offer if the offer 1205 was displayed to the user 135, or to which the users the offer 1205 was displayed. In some embodiments, even after the user 135 accepts the offer 1205, the data management platform 110 may anonymize the response 1225, e.g. by removing some or all user identification information of the user 135, before transmitting the response 1225 to the server 120, which may be forwarded as an acceptance 1230 to the vendor. However, in some embodiments, some user identification may be necessary by the server 120 to have the offer 1205 serviced by the vendor. In such cases, the response 1225 may not be anonymized but the acceptance 1230 which is forwarded to the vendor may be anonymized. In some embodiments, some user identification may be necessary either by the server 120 or the vendor to honor the offer 1205, and in such cases, user identification information may be transmitted with the acceptance 1230 to the vendor, but after obtaining permission from the user 135 to share the user identification information with the vendor.

In some embodiments, the data management platform 110 or the server 120 may anonymize the offer 1205, e.g., by removing identification information of the vendor, before presenting the offer 1205 to the user.

In some embodiments, the server 120 can receive multiple offers for the same service or a product from multiple vendors. The server 120 can define an offer-selection criterion to select an offer from the multiple competing offers, determine the offer that satisfies the offer-selection criterion, and include the selected offer, e.g., as program code, in the corresponding universal data scaffold. In some embodiments, the server 120 can select more than offer to be included in the universal data scaffold. For example, the server 120 can include a first competing offer and a second competing offer in which the first competing offer is presented if a first criterion is satisfied and the second competing offer is presented if a second criterion is satisfied.

The offers, which are part of the universal data scaffolds 155, are typically stored at the user devices when the users install the data management platform 110 on their corresponding user devices. However, in some embodiments, the offers can also be transmitted to the users at other times. For example, when the offers are updated, such as new offers are received by the server 120, criterion of an existing offer changes, or some existing offers are not valid anymore, the server 120 updates the universal data scaffolds of which the updated offers are a part, and transmits the updates to the universal data scaffolds to the users, e.g., as part of an app update. The transmission of the app update to the user devices are triggered based on one or more conditions, e.g., based on a specified time interval such as daily basis or weekly basis; or when the user 135 opens the data management platform 110 app on the user device 105.

As described at least with reference to FIG. 8, because the digital content is stored as structured data using the universal data scaffolds, various types of intelligence can be derived by performing various analyses of the digital content, and such intelligence can be used to make relevant offers to the users. For example, if the server 120 determines that a particular user, e.g., a parent stores digital content associated with a child and various profiles of a nanny, the server 120 may send offers for background check services to the parent. When the parent opens a profile associated with the child's nanny, the data management platform 110 may present an offer to order a background check if no background check has been performed for the nanny yet.

Figure 13:
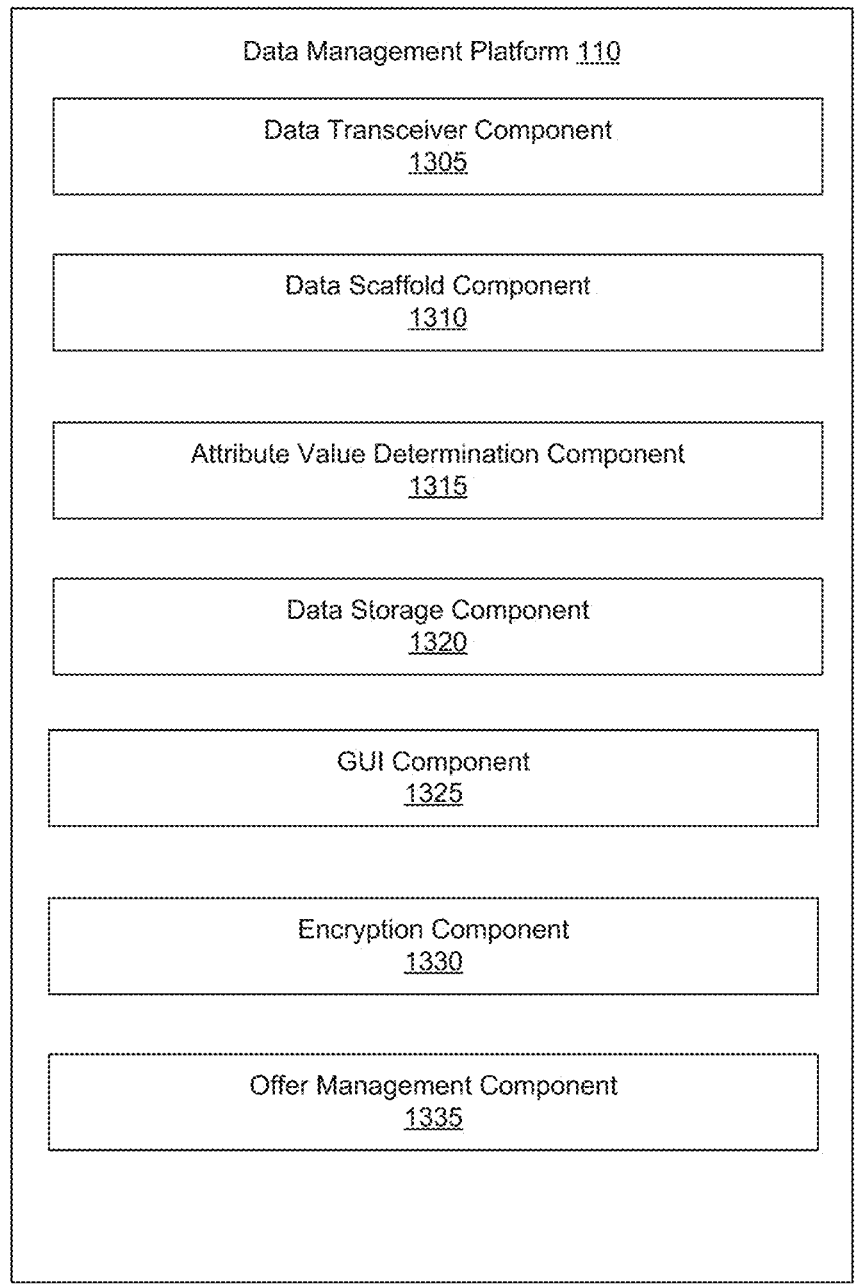
FIG. 13 is a block diagram of the data management platform of FIG. 1, consistent with various embodiments.

FIG. 13 is a block diagram of the data management platform 110 of FIG. 1, consistent with various embodiments. The data management platform 110 includes components such as a data transceiver component 1305, a data scaffold component 1310, an attribute value determination component 1315, a data storage component 1320, a GUI component 1325, an encryption component 1330, and offer management component 1335. The functionalities of the above components are described at least with reference to FIGS. 15-19 below.

Note that the data management platform 110 may include some or all of these components, as well as other components not shown in FIG. 13. For example, the data management platform 110 can include lesser number of components, e.g., functionalities of two components can be combined into one component, or can include more number of components, e.g., components that perform other functionalities. In some embodiments, the functionalities of one or more of the above components can be split into two or more components. In some embodiments, the data management platform 110 resides on the user device 105. In some embodiments, the data management platform 110 resides on the server 120. In some embodiments, the data management platform 110 can be distributed across the server 120 and the user device 105. Those skilled in the art will recognize that the components of the data management platform 110 can be distributed between the server 120 and the user device 105 in various manners.

Figure 14:
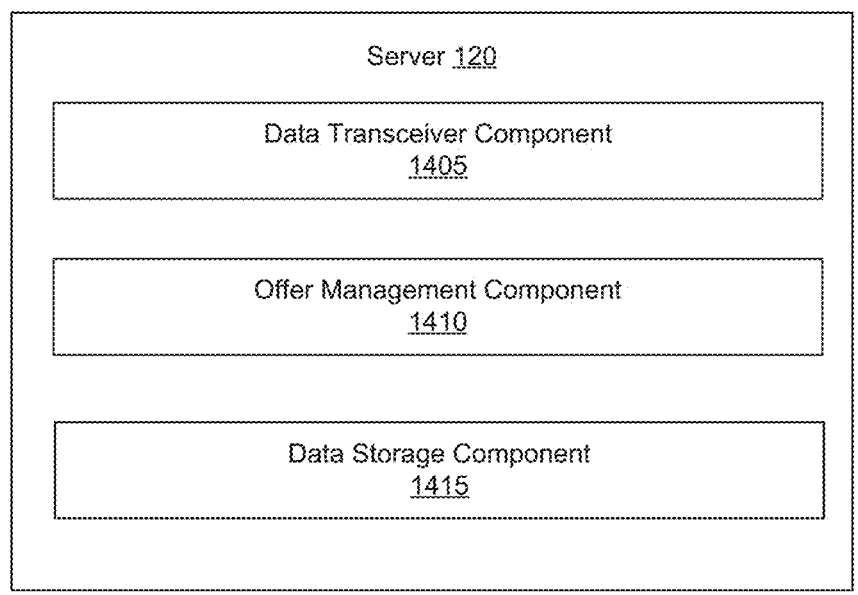
FIG. 14 is a block diagram of the server of FIG. 1, consistent with various embodiments.

FIG. 14 is a block diagram of the server 120 of FIG. 1, consistent with various embodiments. The server 120 includes components such as a data transceiver component 1405, an offer management component 1410, and a data storage component 1415. The functionalities of the above components are described at least with reference to FIGS. 15-19 below.

Note that the server 120 may include some or all of these components, as well as other components not shown in FIG. 14. For example, the server 120 can include lesser number of components, e.g., functionalities of two components can be combined into one component, or can include more number of components, e.g., components that perform other functionalities. In some embodiments, the functionalities of one or more of the above components can be split into two or more components. Further, the components can be implemented at a single server device or distributed across server devices.

Figure 15:
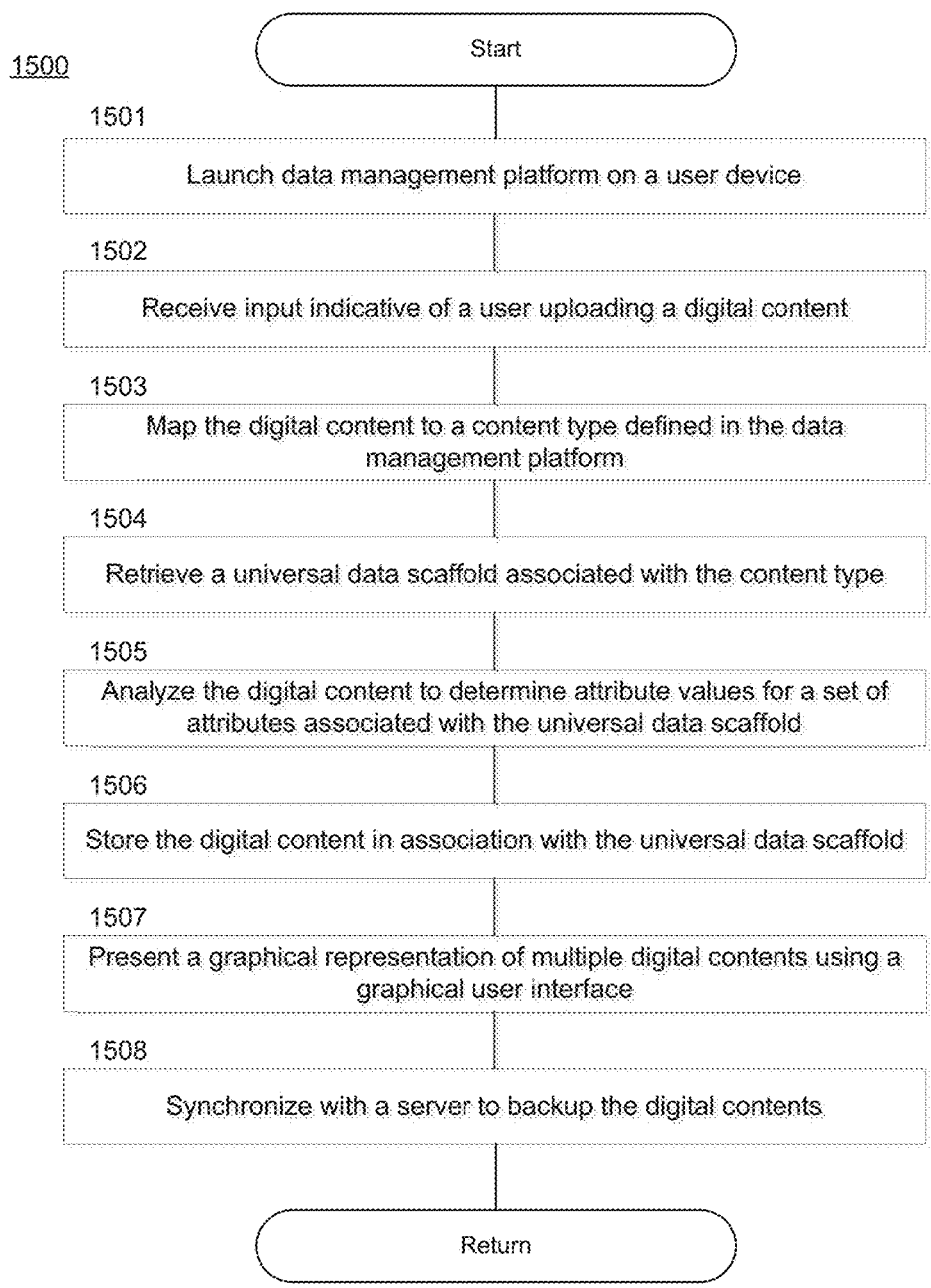
FIG. 15 is a flow diagram of a process for performing data management operations on the digital contents associated with a user, consistent with various embodiments.

FIG. 15 is a flow diagram of a process 1500 for performing data management operations on the digital contents associated with a user in a data management platform. In some embodiments, the process 1500 can be implemented in the environment 100 of FIG. 1. At block 1501, the data management platform 110 is launched on the user device 105. For example, the data management platform 110 is an app running on the user device 105. The data management platform 110 can a communication link to be established with a server 120 via network 130.

At block 1502, the data transceiver component 1305 receives a digital content, such as a picture of a car or a bill of sale of the car, uploaded by the user 135 using the GUI 115. For example, the user 135 may select the digital content from a local storage on the user device 105 or from another digital content source 140 such as a file hosting service (e.g., Dropbox®, Google Drive®, or Microsoft OneDrive®) that interfaces with the data management platform 110 (e.g., via an API).

At block 1503, the data scaffold component 1310 maps the digital content to one of the content types defined in the data management platform 110. The data scaffold component can determine the content type using any of the multiple methods described at least with reference to FIG. 5 above. For example, the data scaffold component 1310 can identify the content type based on the input fields used in the GUI 115 to enter the digital content. In another example, the data scaffold component 1310 can automatically analyze the digital content, e.g., using OCR, and determine the content type based on machine learning techniques and/or deductive inference rules. In still another example, the data scaffold component 1310 can prompt the user 135 to identify the content type from a list of content types.

At block 1504, after determining the content type, the data scaffold component 1310 retrieves a universal data scaffold corresponding to the identified content type, which defines the content type using a set of attributes and metadata (such as rules). For example, if the content type is identified as a "car," then the data scaffold component 1310 retrieves the car universal data scaffold 305 from the data management platform 110.

At block 1505, the attribute value determination component 1315 identifies the set of attributes defined in the universal data scaffold and analyzes the digital content to obtain values for the set of attributes. For example, the attribute value determination component 1315 can identify the set of attributes defined in the car universal data scaffold as make, model, year, and VIN. The attribute value determination component 1315 can analyze the digital content, e.g., using OCR, to obtain the attribute values for the above attributes, and/or prompt the user 135 to input all or some of the attribute values.

At block 1506, the data storage component 1320 stores the digital content in a structured format, e.g., along with the attribute values and the universal data scaffold of the digital content, in the user device 105. In some embodiments, the data storage component 1320 stores the digital content as a graph database in which the digital contents are represented as nodes of the graph and a relationship between the digital contents as an edge between the corresponding nodes.

At block 1507, the GUI component 1325 generates a GUI to present the digital contents to the user 135 on the user device 105. For example, the GUI component 1325 generates a graphical representation 750 that displays the digital contents. In some embodiments, the information regarding the digital content presented in the graphical representation 750 may be obtained from the graph 700. The GUI component 1325 retrieves the digital contents to be displayed in the graphical representation 750 from the node store 1005 of the user device 105, or from the server 120 in an event they are not available in the node store 1005.

The digital contents stored at the user device 105 are typically backed up to the server 120 for archiving. At block 1508, the data storage component 1320 can synchronize the user device 105 with the server 120 to back up the digital contents from the user device 105 to the server 120. The data storage component 1415 of the server 120 can store the backed up digital contents at the data storage system 125. In some embodiments, in the synchronization process, the data transceiver component 1305 transmits only those digital contents that are not yet backed up to the server and/or the digital contents that have been modified at the user device 105.

Figure 16:
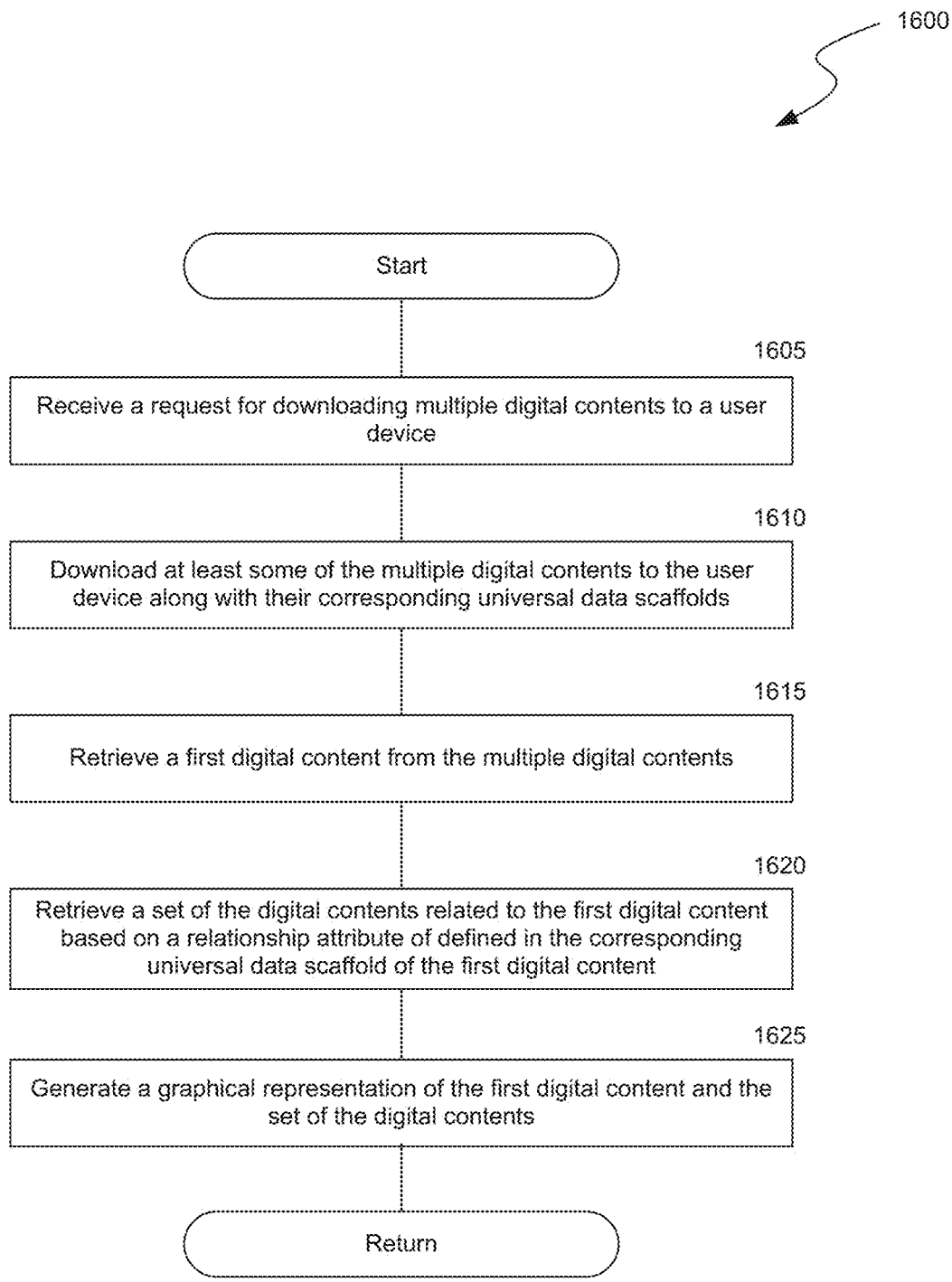
FIG. 16 is a flow diagram of a process for displaying the digital contents on the user device, consistent with various embodiments.

FIG. 16 is a flow diagram of a process 1600 for displaying the digital contents on the user device, consistent with various embodiments. In some embodiments, the process 1600 may be implemented in the environment 100 of FIG. 1. At block 1605, the data transceiver component 1305 receives a request from the user 135 for downloading digital contents associated with the user 135 from the server 120. The user 135 can issue such a request using the GUI 115.

At block 1610, the data transceiver component 1305 downloads at least some of the digital contents from the server 120 to the user device 105. In some embodiments, the number of digital contents downloaded can be determined based on a total number of digital contents stored at server 120 that are associated with the user 135 and a memory space available for storing the digital contents at the user device 105. In some embodiments, the digital contents that are downloaded can be selected by the data transceiver component 1305 based on a context associated with the user 135. The downloaded digital contents can be stored in the node store 1005. When the downloaded contents are stored in the node store 1005, some of the digital contents that are already stored in the node store 1005 may be removed from the node store 1005 to accommodate the downloaded digital contents.

At block 1615, the data storage component 1320 retrieves a first digital content from the downloaded digital contents, e.g., based on the context associated with the user 135.

At block 1620, the data storage component 1320 retrieves a set of digital contents that are related to the first digital content. For example, the data storage component 1320 can inspect the node corresponding to the first digital content to obtain the edges of the node, and then inspect each of the edges to determine the other node to which the node is connected, thereby determining the set of digital contents that is related to the first digital content.

At block 1625, the GUI component 1325 generates a graphical representation of the first digital content and the set of digital contents based on the nodes and edges determined in block 1620. For example, the graphical representation can be similar to the graphical representation 750 of FIG. 7B.

Figure 17:
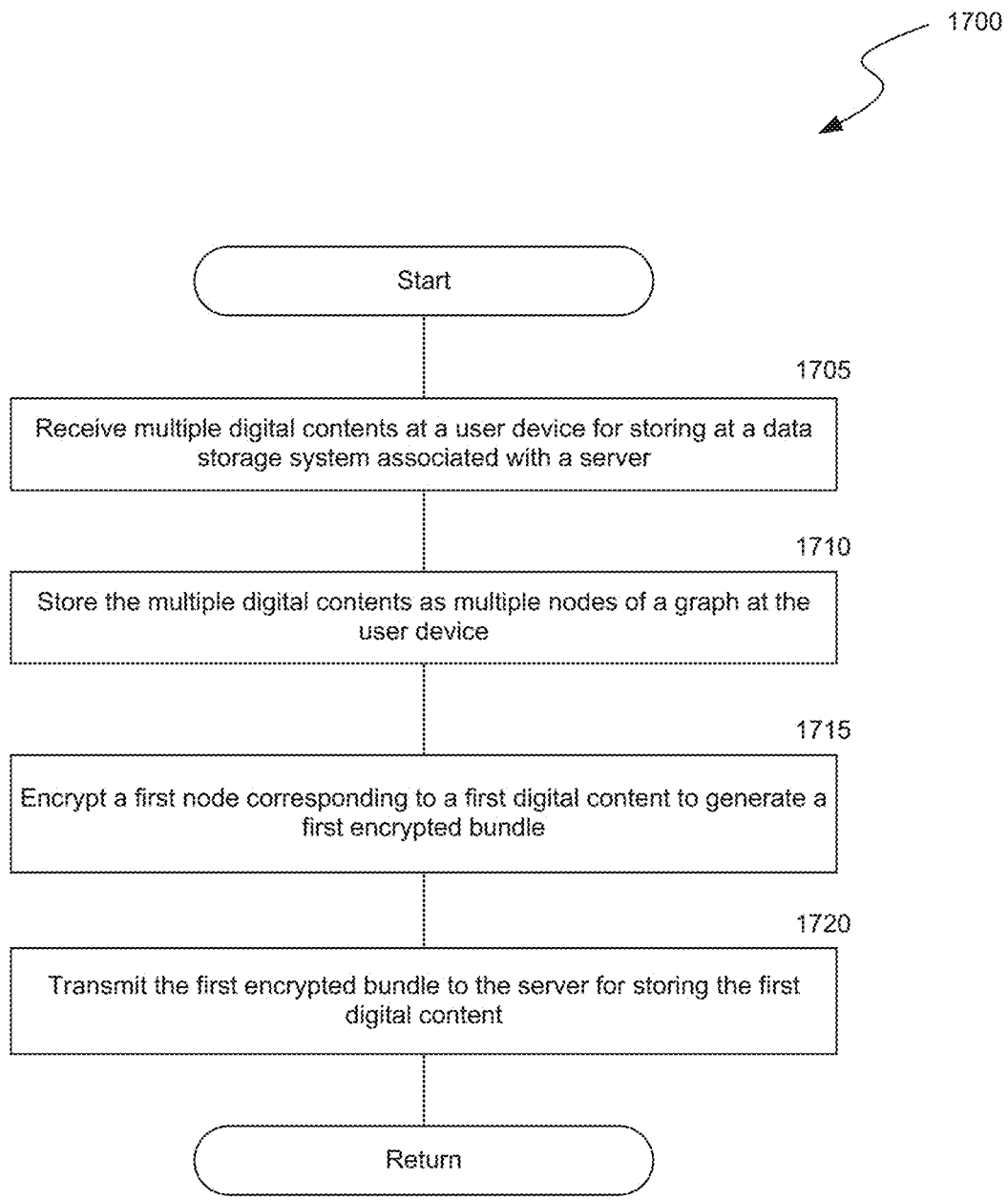
FIG. 17 is a flow diagram of a process for performing zero-knowledge encryption of the digital contents in the data management platform, consistent with various embodiments.

FIG. 17 is a flow diagram of a process 1700 for performing zero-knowledge encryption of the digital contents in the data management platform, consistent with various embodiments. In some embodiments, the process 1700 may be implemented in the environment 100 of FIG. 1. At block 1705, the data transceiver component 1305 receives multiple digital contents from the user 135. For example, the user 135 may upload the digital contents using the GUI 115.

At block 1710, the data storage component 1320 stores the digital components at the user device 105, e.g., in the node store, as a graph database in which the digital contents are represented as nodes of the graph and a relationship between the digital contents as an edge between the corresponding nodes.

At block 1715, the encryption component 1330 encrypts a first node corresponding to a first digital content to generate a first encrypted bundle of the first node. The encryption component 1330 also packages a first universal data scaffold with which the first digital content is associated in the first encrypted bundle. That is, the first encrypted bundle can include the first universal data scaffold and an encrypted version of the first digital content, including the attribute values of the attributes of the first digital content. The attributes are defined by the first universal data scaffold. The data storage component 1320 can store the first encrypted bundle in the node store 1005. The encryption component 1330 encrypts the first node using an encryption key that is typically accessible or available only at the user device 105. The encryption key can also be used for decrypting the first encrypted bundle to extract the first digital content. The encryption component 1330 can use any of multiple encryption techniques for performing the encryption.

At block 1720, the data transceiver component 1305 transmits the first encrypted bundle to the server 120 for storage at the data storage system 125. The data storage component 1415 of the server 120 receives the first encrypted bundle and stores it at the data storage system 125. In some embodiments, the data transceiver component 1305 transmits the first encrypted bundle to the server 120 when the user device is synchronized with the server 120.

Figure 18:
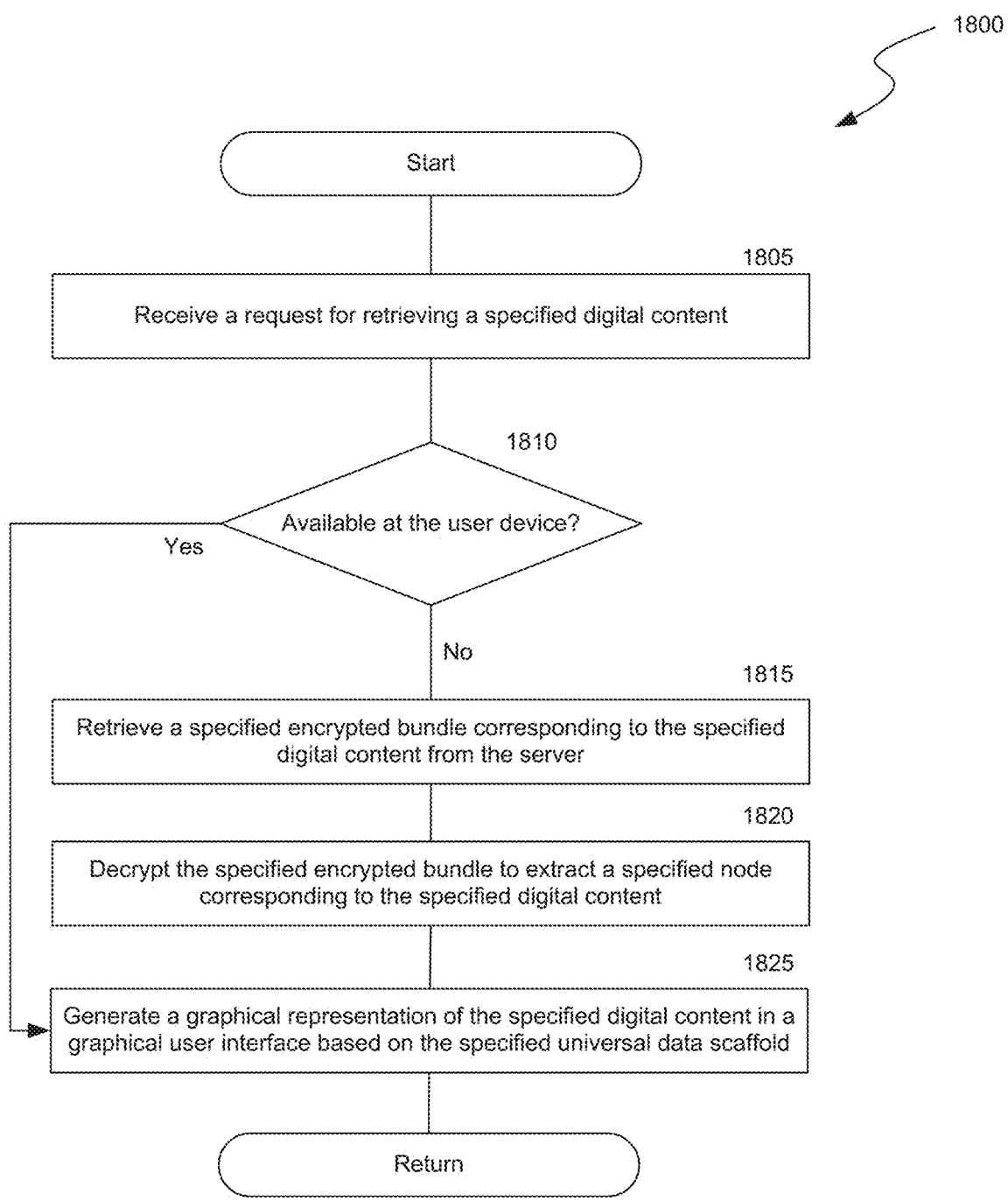
FIG. 18 is a flow diagram of a process for decrypting the digital contents in the data management platform, consistent with various embodiments.

FIG. 18 is a flow diagram of a process 1800 for decrypting the digital contents in the data management platform, consistent with various embodiments. In some embodiments, the process 1800 can be implemented in the environment 100 of FIG. 1. At block 1805, the data transceiver component 1305 receives a request for a specified digital content from the user 135.

At determination block 1810, the data storage component 1320 determines whether the specified digital content is available at the user device 105. For example, the data storage component 1320 can determine if a specified node corresponding to the specified digital content, or if a specified encrypted bundle corresponding to the specified node, is available in the node store 1005.

In an event either the specified node or the specified encrypted bundle is available at the user device 105, the process proceeds to block 1820. On the other hand, if the data storage component determines that neither the specified node nor the specified encrypted bundle is available at the user device 105, at block 1815, the data transceiver component 1305 retrieves the specified encrypted bundle from the server 120. For example, the data storage component 1415 of the server 120 can retrieve the specified encrypted bundle from the data storage system 125 and the data transceiver component 1405 at the server 120 can transmit it to the data transceiver component 1305.

At block 1820, the encryption component 1330 decrypts the specified encrypted bundle to extract (a) the specified node, which includes the specified digital content and its attribute values, and (b) a specified universal data scaffold corresponding to the specified digital content.

At block 1825, the GUI component 1325 generates a graphical representation of the specified node in the GUI 115, which corresponds to the specified digital content. The graphical representation can be similar to the graphical representation 750 of FIG. 7B. The graphical representation 750 can display the attributes and attribute values associated with the specified digital content. The attributes of the specified node are determined based on the specified universal data scaffold associated with the specified digital content.

Figure 19:
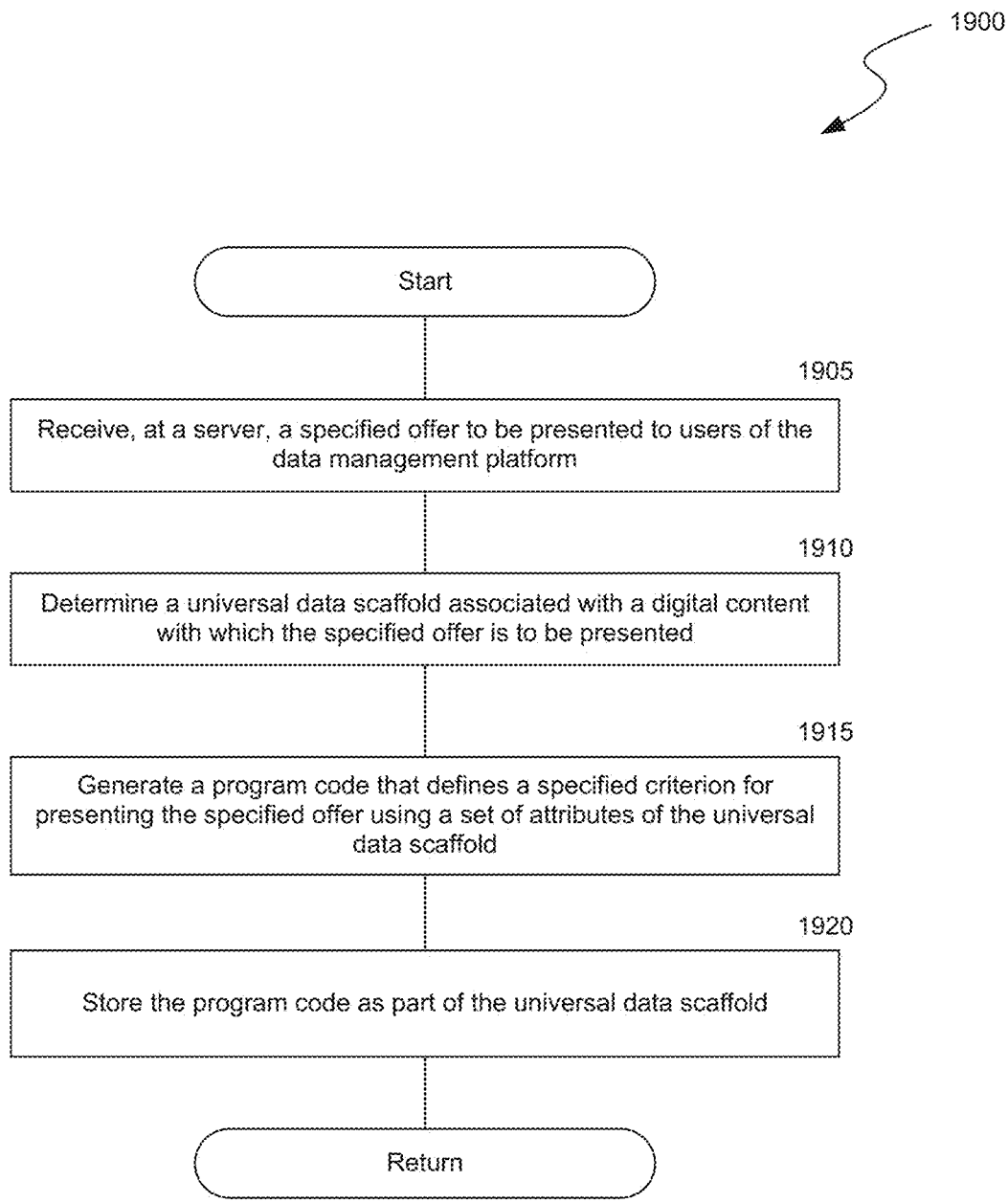
FIG. 19 is a flow diagram of a process for sending zero-knowledge offers to the users of the data management platform, consistent with various embodiments.

FIG. 19 is a flow diagram of a process 1900 for sending zero-knowledge offers to the users of the data management platform 110, consistent with various embodiments. In some embodiments, the process 1900 can be implemented in the environment 100 of FIG. 1. At block 1905, the data transceiver component 1405 at the server 120 receives a specified offer from a vendor for presenting to users of the data management platform 110. The specified offer can also include information such as a criterion for presenting the specified offer to the users. Typically, an offer is associated with or relevant to a specified content type. For example, an offer for extended warranty for a car is associated with the content type "car."

At block 1910, the offer management component 1410 determines a universal scaffold, that is, the content type, with which the specified offer is to be presented. In some embodiments, the offer management component 1410 can analyze the data associated with the specified offer to determine the content type to which the offer is relevant. The offer management component 1410 can automatically analyze the specified offer, e.g., using OCR, and determine the content type based on machine learning techniques and/or deductive inference rules, or obtain the content type from the vendor.

At block 1915, the offer management component 1410 generates a program code for presenting the specified offer to the users. The program code includes the specified offer and a server-defined criterion for presenting the specified offer to the users. The server-defined criterion is generated by redefining or reformulating the vendor-provided criterion of the specified offer using the attributes of the universal data scaffold. For example, the offer management component 1410 can reformulate a vendor-defined criterion, which states that the specified offer is to be presented to users with cars that are of year "2017" or older, by incorporating the appropriate attribute of the car universal data scaffold to generate the server-defined criterion, such as "carUDS.YEAR<=2017," in which "carUDS" is the identifier of the car universal data scaffold and "YEAR" is the attribute of the car universal data scaffold.

The program code can be an executable code that can be executed at the user devices. The program code is also configured to monitor the attribute values of the digital content for which the specified offer is to be presented.

At block 1920, the offer management component 1410 stores the program code as part of the universal data scaffold. When the users install the data management platform 110 at their corresponding user devices, the universal data scaffold is stored at the user devices. Because the universal data scaffold is same for all users of the data management platform 110, all the users will have the same specified offer stored in their corresponding user devices.

Figure 20:
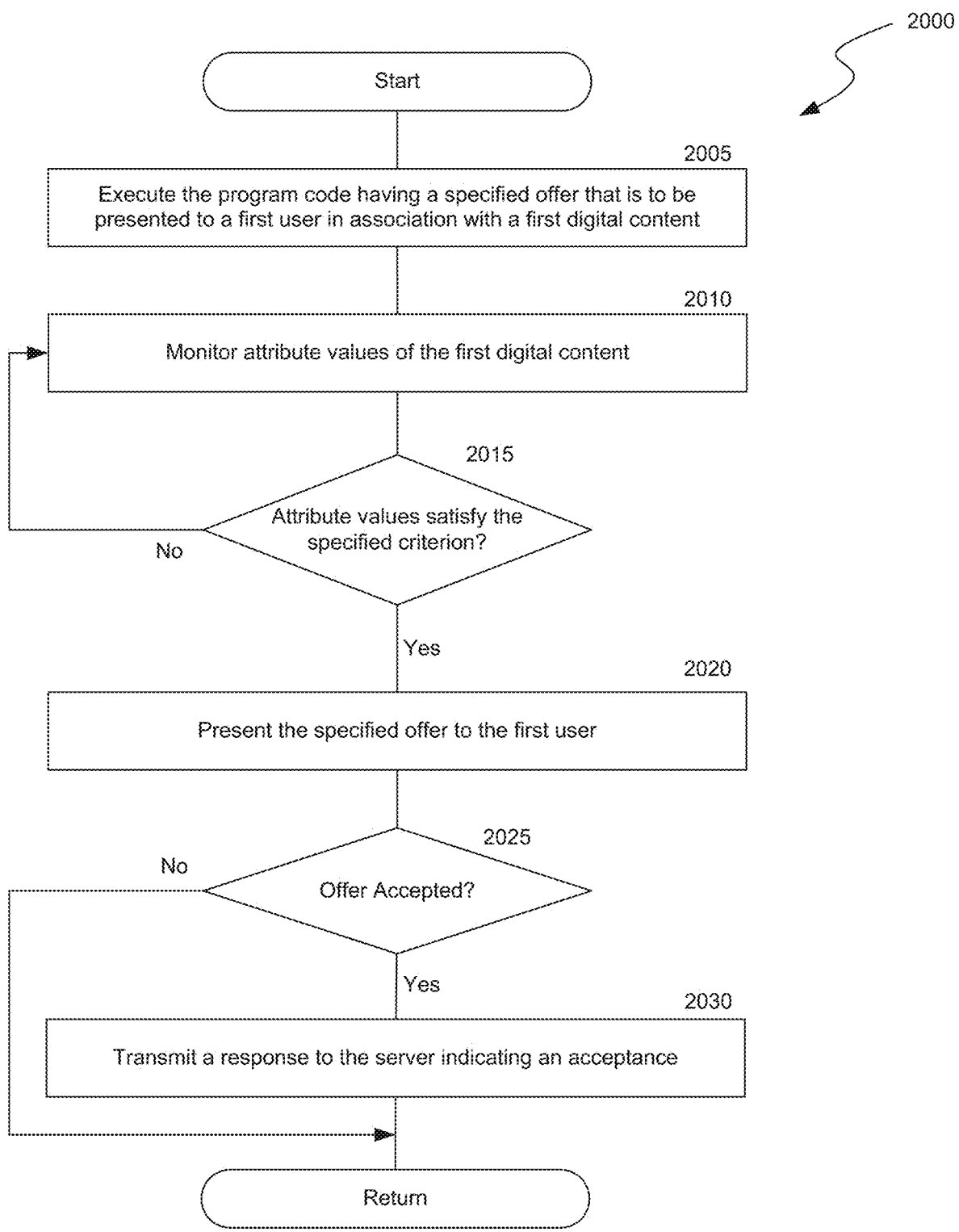
FIG. 20 is a flow diagram of a process for displaying the zero-knowledge offers to the users of the data management platform, consistent with various embodiments.

FIG. 20 is a flow diagram of a process 2000 for displaying the zero-knowledge offers to the users of the data management platform 110, consistent with various embodiments. In some embodiments, the process 2000 can be implemented in the environment 100 of FIG. 1. At block 2005, the offer management component 1335 executes a program code stored as part of a universal data scaffold at the user device 105. The program code includes a specified offer that is to be presented to the user 135 in association with a digital content at the user device 105.

At block 2010, the offer management component 1335 executes the program code to monitor attribute values of the digital content for which the specified offer is to be presented.

At determination block 2015, the offer management component 1335 determines whether the attribute values satisfy the server-defined criterion in the program code.

If the attribute values do not satisfy the server-defined criterion, the process continues to monitor the attribute values (block 2010). In an event the attribute values satisfy the server-defined criterion, at block 2020, the offer management component 1335 presents or displays the specified offer to the user 135.

At determination block 2025, the offer management component 1335 determines whether the user 135 accepted the specified offer. In an event the user accepted the specified offer, at block 2030, the data transceiver component 1305 transmits a response to the server 120 indicating an acceptance of the specified offer. In some embodiments, the response may be anonymized, e.g., by removing some or all of user identification information, prior to transmitting the response to the server 120 to preserve the privacy of the user 135.

In an event the user 135 has not accepted the specified offer, e.g., rejected or ignored, the process 2000 returns.

Figure 21:
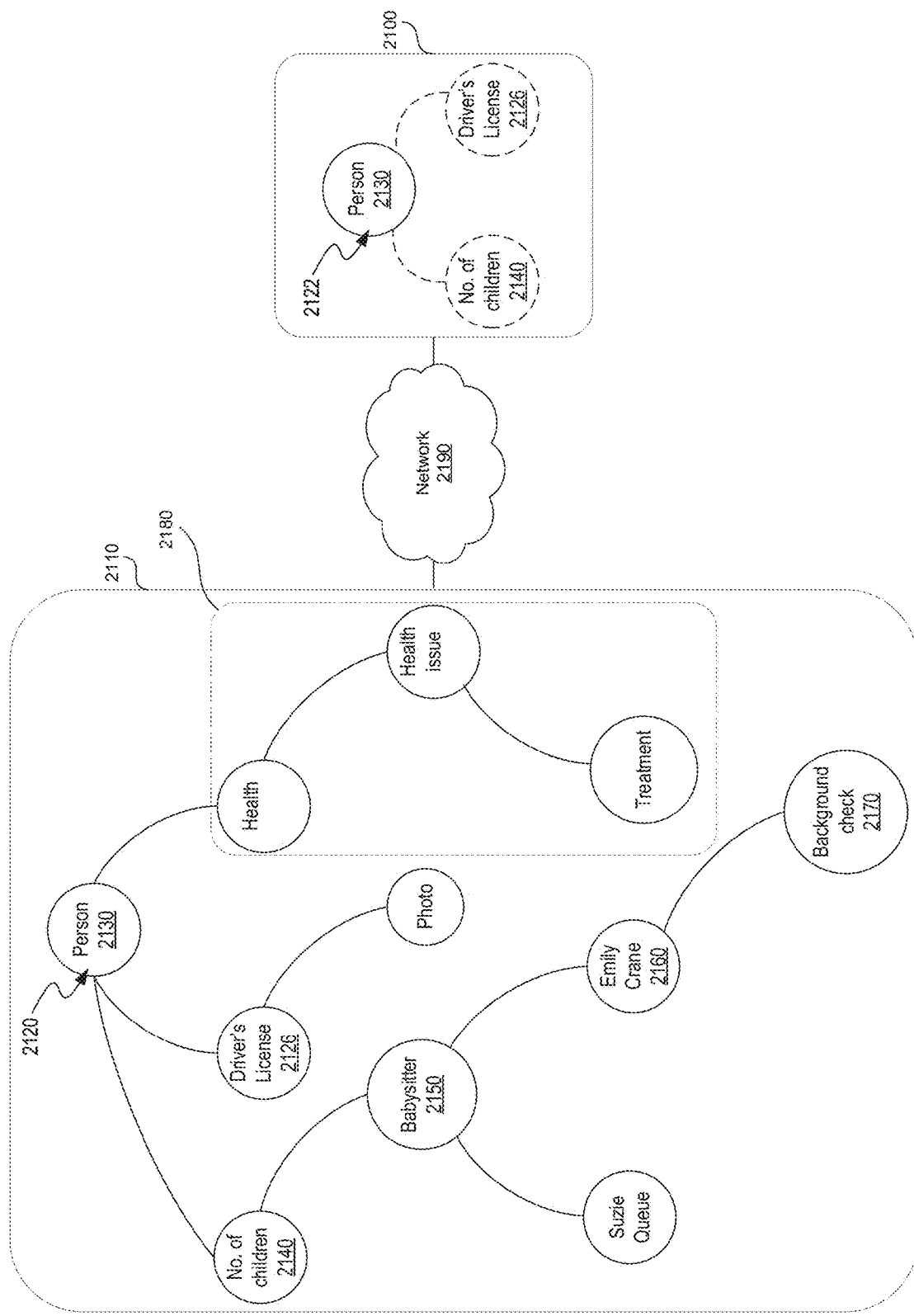
FIG. 21 shows a universal scaffolding data structure partially stored on a user device.

FIG. 21 shows a universal scaffolding data structure partially stored on a user device. Device 2100 can be a user device, such as a mobile phone, and can have more limited resources than the device 2110, which can be a server. Consequently, only a portion of the universal scaffolding data structure 2120 can be stored on the user device 2100, while the remote device 2110 can store the full universal scaffolding data structure 2120. In some cases, the full universal scaffolding data structure 2120 can be downloaded on the user device 2100.

A private database can include information such as make and model of user's car, user's address, number of children, etc. A public database can include information such as size of the house, size of the yard, phone number, etc. The private database can exist unencrypted on the user device 2100 and can contain the user's information. An encrypted version of the private database can exist on the server 2110. Because the private database is encrypted on the server 2110, the server does not have the knowledge of the user's private data, and consequently the user's privacy is protected.

The universal scaffolding data structure 2122 can be initialized upon receiving data from a user when the user is engaged in a structured workflow, such as when a user is applying for automotive insurance. For example, the user can upload an insurance form for an automotive insurance policy. The user device 2100 can receive the insurance form and convert the insurance form into the universal scaffolding data structure 2122 by extracting data from the insurance form and populating the universal scaffolding data structure 2122 with the received data. In addition, the data that is not available in the automotive insurance form but is usually associated with vehicle owners can also be initialized in the universal scaffolding data structure 2122. For example, a driver's license field may not be available in the insurance form, but the driver's license node 2126 can be initialized with an empty driver's license value, because there is a high correlation between people who apply for automotive insurance and the existence of a driver's license.

Similarly, whenever a person creates a node in the universal scaffolding data structure 2120, whether that node is the root of the whole universal scaffolding data structure 2120, such as node 2130, or is a node in the universal scaffolding data structure 2120, such as 2150, the system can create all nodes that are likely to be associated with the newly created node.

In addition, the user can opt in to a creation of a subgraph, such as subgraph 2180, without the system automatically creating the subgraph 2180. For example, the user may be a cancer survivor, and may have information related to the disease such as an effective therapy. In another example, the user can have a heart condition and may want to know if the user at risk for a heart attack. The user device 2100 can offer to perform an analysis of the user's data 2180 using algorithms that can be developed by third-party entities, such as research universities or research labs. Upon the analysis, the system can make a recommendation to the user such as the user needs to measure blood pressure twice a day and follow a particular diet. The whole subgraph 2180 or a portion of the subgraph 2180 can be stored in the user device 2100.

When storing a portion of the universal scaffolding data structure 2120 on the user device 2100, the user device 2100 can decide whether to pay a cost for storage space on the user device 2100 or for network data bandwidth or download time when a portion of the universal scaffolding data structure 2120 needs to be downloaded from the remote device 2110.

For example, the user device 2100 can store one node 2130, while the universal scaffolding data structure 2120 can be stored on the remote device 2110 in encrypted form. When the user device 2100 wants to access node 2140 that is currently not stored in the user device 2100, the user device 2100 can download the node 2140 from the remote device 2110, without the user being aware of the location of the node 2140.

The system can receive an input from the user expressing preference about how much space the user would like to devote to the universal scaffolding data structure 2122 stored on the local device 2100. The system can take that input into account and can also utilize a prioritization scheme for determining whether data stored on the user device 2100 can be evicted aggressively versus whether the data should be kept on the user device 2100 to help with performance. For example, if the network 2190 is slow, the system can keep the data on the user device 2100, while if the network 2190 is not slow and the user device 2100 has reached the storage limit, the system can evict the data from the user device 2100. The decision whether to store the data on the user device 2100 or to evict it can be performed dynamically based on the network 2190 conditions as well as the user device 2100 conditions.

In one embodiment, the user device 2100 can prefetch the data that would be necessary for all the possible navigations, or the system can anticipate a likely navigation based on the current navigation. When prefetching the data, the user device 2100 can download the nodes from the remote device 2110. For example, if the user is interacting with the data at the node 2150, the system can anticipate that the user is likely to browse nodes 2160 and 2170, and prefetch those two nodes from the remote device 2110.

In another embodiment, the system can predict information likely to be relevant to the user and can prefetch nodes from the remote device 2110 that are related to the information. For example, if the user's birthday is coming up within the next week, the system can prefetch nodes containing information about the user's favorite activities such as frequented restaurants, frequented entertainment locations, etc.

Figure 22:
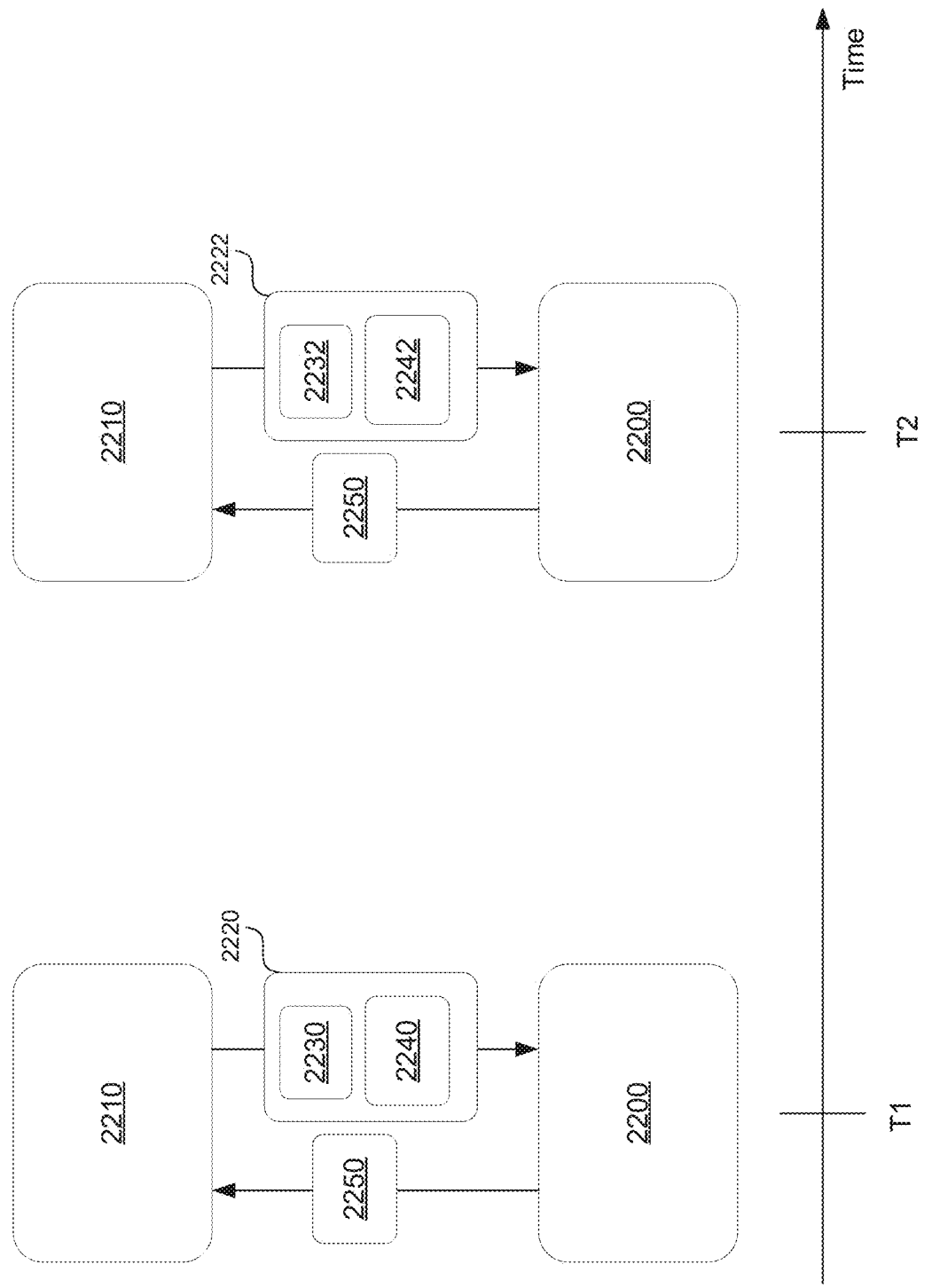
FIG. 22 shows a system to preserve a user's privacy by providing bundled answers.

FIG. 22 shows a system to preserve a user's privacy by providing bundled answers. When a user device 2200 interacts with a remote device 2210, such as a server, a cloud computer, etc., the user device 2200 can request information, such as nearby restaurants, entertainment in Chicago, etc. When the remote device 2210 provides the requested information, the provision of information can violate the user's privacy by indicating the user's location. For example, when the answer contains restaurants within a 5 mile radius, a third party can infer that the user is within the 5 mile radius, or if the information contains restaurants in Chicago, the third party can infer that the user is in Chicago.

To protect the user's privacy, the remote device 2210 can provide bundled answers 2220, which, in addition to the answer 2230 that the user requested, contain additional answers 2240 intended to mask the actual answer the user is looking for. The additional answers 2240 are consistent over time, so that if the user repeatedly asks the same question, the additional answers 2240 do not change while the true answer 2230 remains the same, thus preventing the third party from inferring that the true answer 2230 is the one that is same across multiple bundled answers 2220.

For example, if the user at time T1 asks the question 2250, and at a later time T2 asks the same question 2250, the variation between the answer 2230 and answer 2232, and the additional answer 2240 and answer 2242 should be substantially the same. For example, if the answers 2230 and 2232 are the same, the additional answers 2240 and 2242 are the same. If the answers 2230 and 2232 vary by, for example, one entry (e.g. one restaurant), the additional answers 2240 and 2242 can vary by a proportionate amount, such as one entry. That way, the third party receiving the bundled answers 2220, 2222 cannot isolate the answer 2230.

Figure 23:
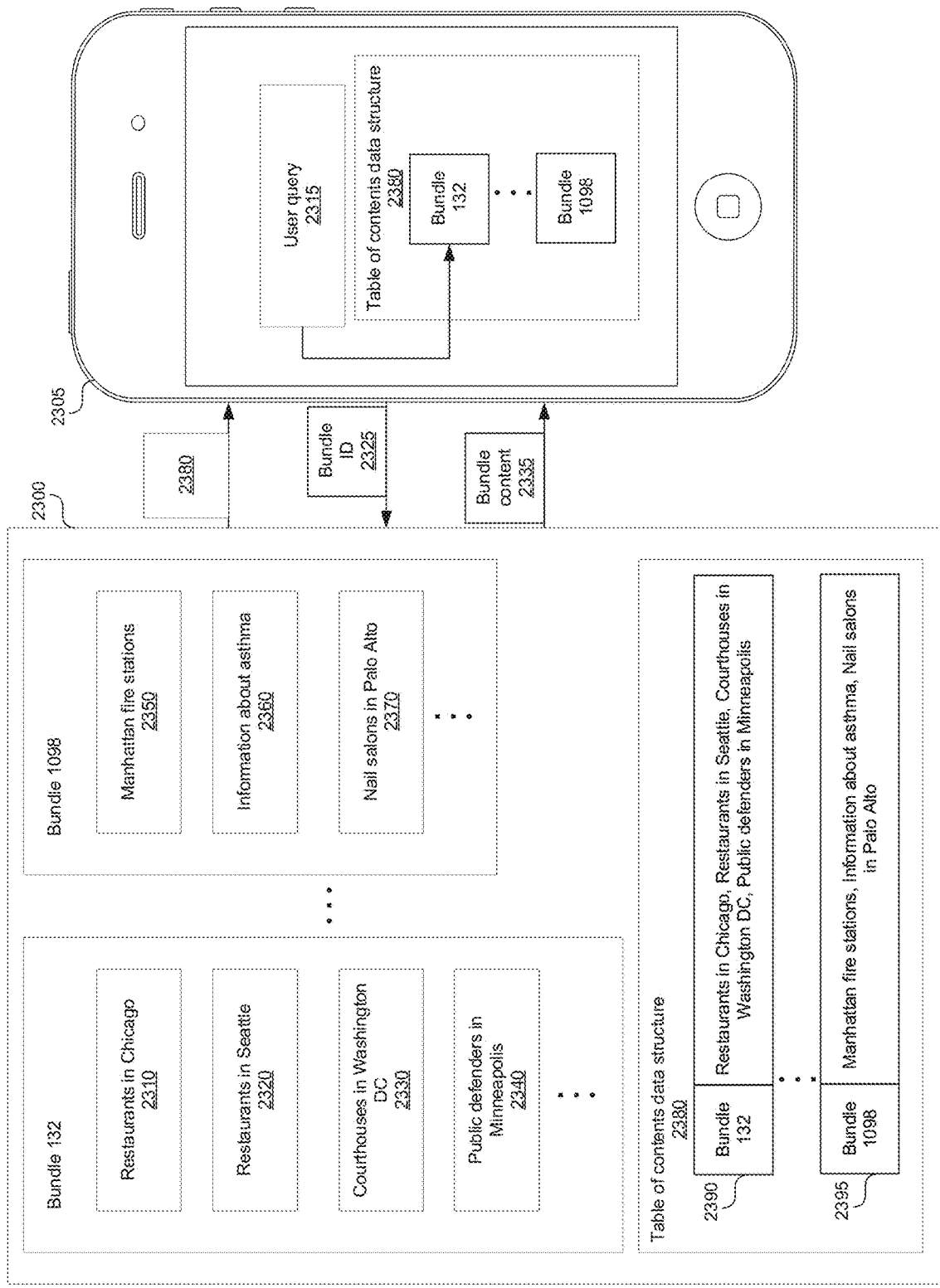
FIG. 23 shows query resolution between user device and server using bundled data.

FIG. 23 shows a query resolution between a user device and the server using bundled data. The server 2300 and the user device 2305 can communicate via a wireless or a wired network. The user device 2305 can send a query to the server 2300, and the server can send a bundle 132, 1098 containing an answer to the query. The server 2300 can include multiple bundles 132, 1098 of data containing a data structure associated with a universal data scaffold, as described in this application.

The universal data scaffold can include various types of data structures and relationships between data structures. A type of data structure can correspond to an information topic contained in the data structures, such as restaurants, medical information, vehicle information, etc. The bundles 132, 1098 of data can include information on various disparate topics stored in one or more of the data structures included in the universal data scaffold. Each bundle 132, 1098 can contain hundreds or thousands of data structures 2310-2370.

For example, bundle 132 can include data structure 2310 containing information about restaurants in Chicago, data structure 2320 containing information about restaurants in Seattle, data structure 2330 containing information about courthouses in Washington DC, data structure 2340 containing information about public defenders in Minneapolis, etc. In another example, bundle 1098 can include data structure 2350 containing information about Manhattan fire stations, data structure 2360 containing information about asthma, data structure 2370 containing information about nail salons in Palo Alto, etc.

As can be seen in bundles 132, 1098, the data structures 2310-2370 can contain information on disparate topics to hide the true information that the user device 2305 is searching for. For example, the topics contained in the bundles 132, 1098 vary, from restaurants to public defenders. The ownership of the services contained in the bundles 1032, 1098 can include government as well as private ownership. For example, restaurants can be private, while the courthouses and public defenders are government services.

In another example, data structure 2360 containing information about asthma can be bundled with information about nail salons and Manhattan fire stations, instead of being bundled with data structures containing other medical information. Consequently, a potentially malicious third-party observer receiving information about bundles 132, 1098 downloaded to the user device 2305 cannot conclude that a user of the user device 2305 has a medical condition.

To further obfuscate user information, the bundles 132, 1098 can contain data structures 2310-2370 associated with disparate geographic locations, so that the third party cannot infer the location of the user device 2305 from the bundles downloaded to the user device 2305. For example, the bundle 132 contains information about Chicago, Seattle, Washington and Minneapolis, while bundle 1098 contains information about Manhattan and Palo Alto.

The bundles 132, 1098 can contain overlapping information. For example, data structure 2310 can be contained in both bundles 132, 1098.

The server 2300 can include a table of contents data structure 2380 that creates a mapping between the bundle ID, such as 132, 1098, and information contained in the bundle. For example, data structure 2390 in the table of contents data structure 2380 includes bundle ID 132 and the topics contained in the bundle 132 such as restaurants in Chicago, restaurants in Seattle, courthouses in Washington DC, and public defenders in Minneapolis. Data structure 2395 in the table of contents data structure 2380 includes bundle ID 1098 and the topics contained in the bundle such as Manhattan fire stations, information about asthma, nail salons and Palo Alto.

The server 2300 can send the table of contents data structure 2380 to the user device 2305. When the user device 2305 receives a query 2315 from the user, the user device can determine a topic of the query, and, based on the topic of the query, the user device can search the table of contents data structure 2380 to determine the bundle ID that contains information about the topic.

Once the user device 2305 determines the bundle ID, the user device sends a query 2325 to the server 2300 containing the bundle ID. Consequently, the server does not have access to the user query 2315. Further, because the bundles 132, 1098 include information on disparate topics, the server 2300 does not have access to the topic of the query 2325 and cannot infer information about the user such as his location, his interests, his medical condition, etc. Similarly, the potentially malicious third-party observing the interaction between the server 2300 and the user device 2305 cannot gain information about the user. The communication between the server 2300 and the user device 2305 can be encrypted, further deterring an unauthorized third-party. However, even if the third party compromises the server and gains access to the server log containing information about interactions between the server 2300 and the user device 2305, the third party cannot obtain information about the user because information is not available on the server 2300.

Figure 24:
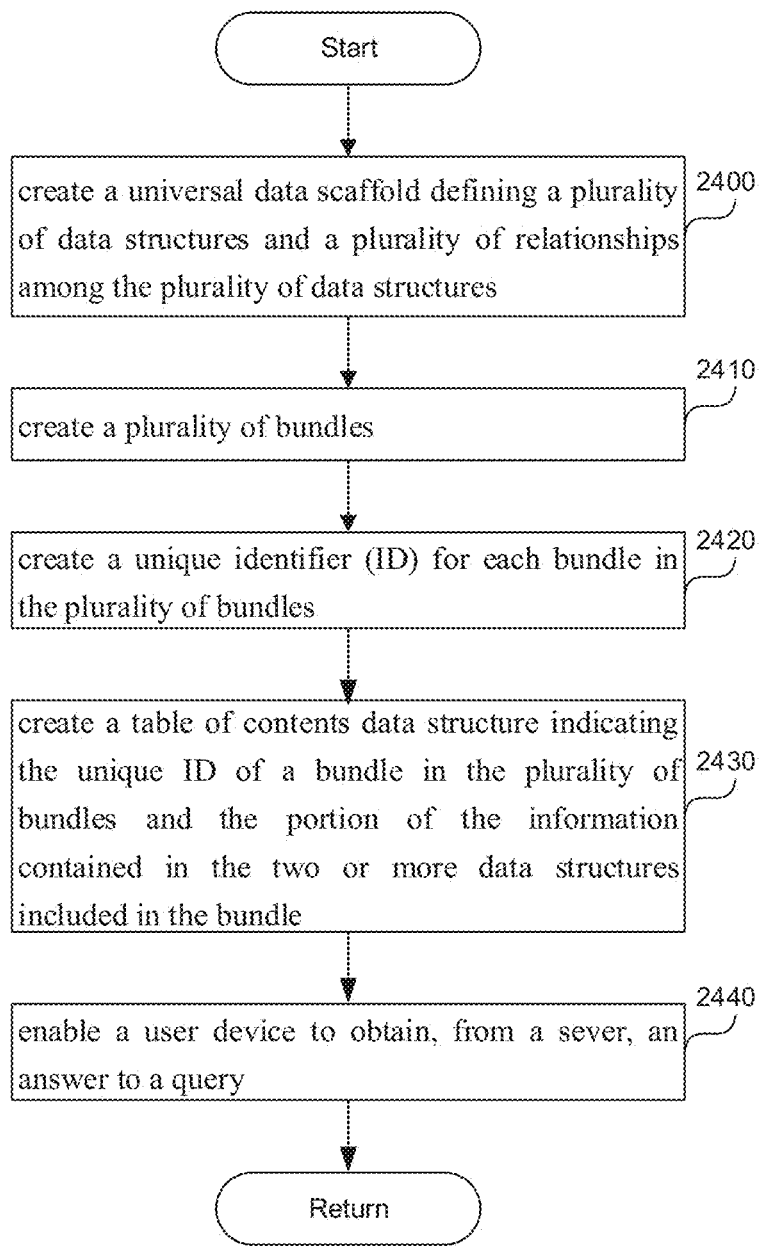
FIG. 24 is a flowchart of a method to provide an answer to a query generated by a user device by hiding the answer and the query from a server providing the answer.

FIG. 24 is a flowchart of a method to provide an answer to a query generated by a user device by hiding the answer and the query from a server providing the answer. In step 2400, a processor can create a universal data scaffold defining multiple data structures and multiple relationships among the multiple data structures. A data structure in the universal data scaffold can be a node in a graph while a relationship can be an edge in a graph, as explained herein. The universal data scaffold can represent information in a structured way, as explained herein. The data structure can include a portion of the information. For example, the information contained in the universal data scaffold can be public information contained on the Internet. A data structure, which is a part of the universal data scaffold, can contain a portion of the information, such as information about Toyota Camry cars, medical treatments for asthma, Chicago restaurants, etc. The server 2300 in FIG. 23 can distribute at least a portion of the universal data scaffold to the user device 2305 in FIG. 23.

In step 2410, the processor can create multiple bundles, such as bundles 132, 1098 in FIG. 23. Each bundle can include two or more data structures among the multiple data structures, where the data structures in the bundle can be the same type or can be of different types. A data structure type can correspond to the information topic contained in the data structures, such as restaurants, museums, vehicle information, etc. For example, data structures 2310 and 2320 in FIG. 23 have the same type corresponding to the topic of restaurants.

To create the multiple bundles, the processor can obtain the two or more data structures including a first data structure and a second data structure. A first portion of the information contained in the first data structure can be associated with a first topic, and a second portion of the information contained in the second data structure can be associated with the second topic, where the first topic and the second topic are unrelated. The processor can create a bundle using the first and the second data structure.

The first topic and the second topic can be disparate based on type, based on location, based on granularity, etc. For example, the first topic can describe a commercial service, and the second topic can describe a government service. In another example, to vary the location, the first topic and the second topic can include disparate geographic locations. More specifically, the first topic can relate to Oklahoma City, and the second topic can relate to New Orleans. Similarly, to vary the granularity, the first topic can relate to a state such as New Jersey, and the second topic can relate to a county such as Lafayette County.

In step 2420, the processor can create a unique identifier (ID) for each bundle among the multiple bundles, such as ID 132, 1098.

In step 2430, the processor can create a table of contents data structure 2380 in FIG. 23 indicating the unique ID of a bundle and the portion of the information contained in the two or more data structures included in the bundle.

In step 2440, the processor can enable the user device 2305 in FIG. 23 to obtain, from a server 2300 in FIG. 23, an answer to a query 2315 in FIG. 23, without disclosing the query and the answer to the server. The processor associated with the server 2300 can send the table of contents data structure 2380 to a user device.

The processor associated with the server can provide an answer to the query 2315 from the user device 2305 by receiving an indication of the unique ID 132, 1098 of the bundle. The processor can provide the bundle associated with the unique ID 132, 1098 to the user device 2305, without obtaining the query and the answer to the server, because the answer to the query is contained within the portion of the information contained in the bundle, and the bundle contains information on multiple disparate topics.

The processor can incorporate additional information into the universal data scaffold by, for example, obtaining trending topics through data mining. The processor can update the multiple bundles to contain the additional information and update the table of contents data structure to include the additional information and a unique ID of a bundle associated with the additional information. The processor can distribute the updated table of contents data structure to the user device, such as user device 2305.

Figure 25:
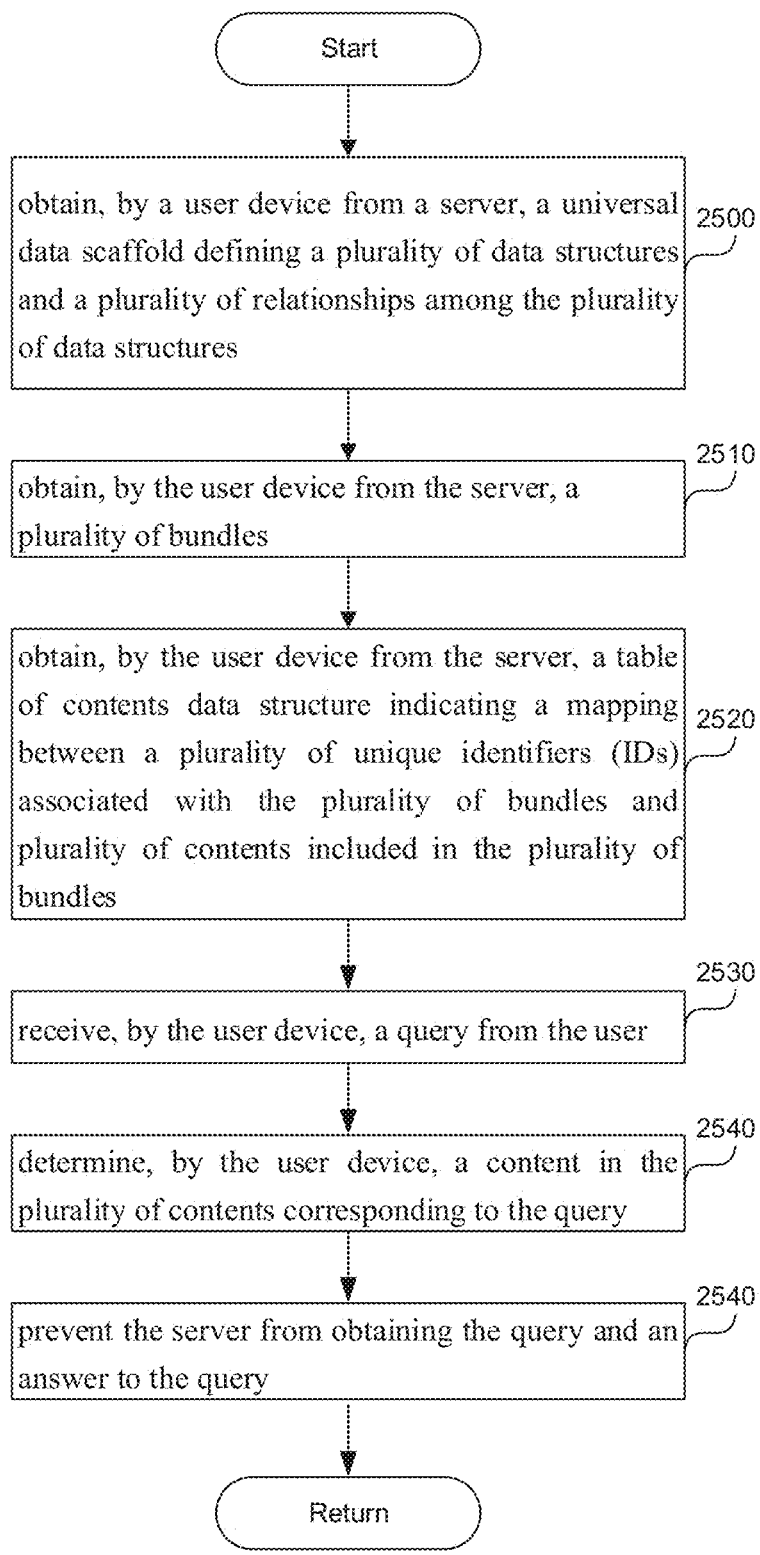
FIG. 25 is a flowchart of a method to protect user data by obtaining an answer to a query from a server, without disclosing the query and/or the answer to the server.

FIG. 25 is a flowchart of a method to protect user data by obtaining an answer to a query from a server, without disclosing the query and/or the answer to the server. In step 2500, a processor associated with a user device can obtain, from a server, a universal data scaffold defining multiple data structures and multiple relationships among the multiple data structures. A data structure can be represented by a node in a graph, and a relationship can be represented by an edge in the graph.

The universal data scaffold can represent information in a structured way. For example, the information contained in the universal data scaffold can be public information contained on the Internet. A data structure, which is a part of the universal data scaffold, can contain a portion of the information, such as information about Toyota Camry cars, medical treatments for asthma, Chicago restaurants, etc. The public information represented by the universal data scaffold can be stored encrypted or unencrypted on the server 2300 in FIG. 23.

The data structure, which is a part of the universal data scaffold, can also contain data associated with a user, such as the user's driver's license, the user's car make and model, the user's Social Security number, the user's health insurance, etc. For example, the user device can obtain data associated with the user, can structure the data associated with the user into a format compatible with the universal data scaffold, and can store the formatted data in the data structure. The data structure that contains sensitive user information can exist unencrypted only on the user device 2305 in FIG. 23. The data structure containing the sensitive user information can be encrypted and sent to the server. Consequently, the server 2300 does not have access to the decrypted data.

In step 2510, the processor associated with the user device can obtain from the server multiple bundles. Each bundle among the multiple bundles can include two or more data structures, such as a first data structure and a second data structure. The first and the second data structure can be of the same type, such as medical information, or they can be of different types that vary by topic, granularity, geographic location, etc. Information contained in the first data structure can be associated with a first topic, while information contained in the second data structure can be associated with the second topic, where the first topic and the second topic are unrelated.

In step 2520, the processor associated with the user device can obtain from the server a table of contents data structure 2380 in FIG. 23 indicating a mapping between multiple unique identifiers (IDs) 132, 1098 in FIG. 23 associated with the multiple bundles and multiple contents included in the multiple bundles. A unique ID among the multiple unique IDs corresponds to a bundle. Contents contained in the bundle can describe a topic of the information contained in the bundle.

In step 2530, the processor associated with the user device can receive a query from the user. The query can be a natural language query and can be in a textual and/or an audio format.

In step 2540, the processor can determine a content among the multiple contents corresponding to the query, and a unique ID of a bundle including the content, by, for example, finding a content among multiple contents providing an answer to the query. To determine the content corresponding to the query, the processor can find a closest match between the query and a content among multiple contents associated with the table of contents. The closest match can be closest semantic match.

For example, if the user query states "Italian restaurant nearby," the processor can perform a semantic match by determining the location of the user, such as Chicago. Based on the table of contents data structure 2380, the processor can determine that the bundle having unique ID 132 contains an answer to the query, because bundle 132 contains information about restaurants in Chicago.

The processor can provide the content among the multiple contents having the closest match with the query as well as the ID of the bundle containing the content. If the bundle containing the content has been downloaded on the user device 2305, the processor does not have to send a request for the bundle ID to the server. Further, the processor can check with the server 2300 whether an update to the bundle ID is available. If no update is available, the processor can provide the content of the bundle to the user, without downloading the bundle from the server.

In another embodiment, the server 2300 can communicate to the user device 2305 when a bundle 132, 1098 has been updated. If the user device 2305 contains bundle 132, 1098, the user device can download the updated bundle.

In step 2550, the processor associated with the user device can prevent the server from obtaining the query and an answer to the query by requesting the unique ID 132 associated with the bundle including the content, without disclosing the query and the answer to the server. The server 2300 cannot determine the information that the user is looking for, because bundle 132 contains information about Chicago restaurants, Seattle restaurants, courthouses in Washington, public defenders in Minneapolis, etc.

Once the processor of the user device obtains the bundle having the unique ID from the server, the processor can find a data structure, in the bundle, that includes the content containing the answer to the query. The processor can reduce memory consumption associated with the user device by deleting, from the user device, other data structures associated with the bundle except for the data structure including the content comprising the answer to the query.

The processor can dynamically decide, based on memory of the user device and/or bandwidth of the channel between the user device and the server, whether to store information on the device or to request the information from the server at a future time.

In one embodiment, the processor of the user device can obtain from the server a bundle including a data structure, associated with the universal data scaffold, containing information on a topic and/or a data structure acting as a placeholder for currently unavailable information. For example, the data structure acting as the placeholder can contain the class definitions for a Tesla model S, but because the user doesn't have the Tesla model S, the user information in the data structure acting as the placeholder can be missing.

The processor can determine a first amount of a first resource associated with the user device which is consumed by at least a portion of the bundle, and a second amount of a second resource associated with the user device by the portion of the bundle. The portion of the bundle can include one or more data structures and/or one or more data structures acting as a placeholder for currently unavailable information. The first resource and the second resource can be memory of the user device, processing power of the user device, upload bandwidth, or download bandwidth between the user device 2305 and the server 2300.

The processor can determine availability of the first resource associated with the user device and availability the second resource associated with the user device. The processor can also determine the likelihood that the user will access the portion of the bundle within a predetermined timeframe, such as an hour, a day or a week. In addition, the processor can take user preferences into account, as described in FIG. 21. Based on the availability of the first resource associated with the user device and the availability of the second resource associated with the user device, the processor can determine whether to delete the portion of the bundle.

For example, the user device can have plenty of available memory, but can be in a location where the communication bandwidth between the user device and the server is low. The processor can decide to not delete the portion of the bundle.

In another example, the user device can be low on memory, but the communication bandwidth between the user device and the server can be high. The processor can decide to delete the portion of the bundle.

In a third example, the user device can be low on memory, the communication bandwidth between the user device and the server can be low, but the likelihood that the user will access the portion of the bundle within the next day is low. In this case, the processor can decide to delete the portion of the bundle because the likelihood that the user will need the portion of the bundle is low.

Figure 26:
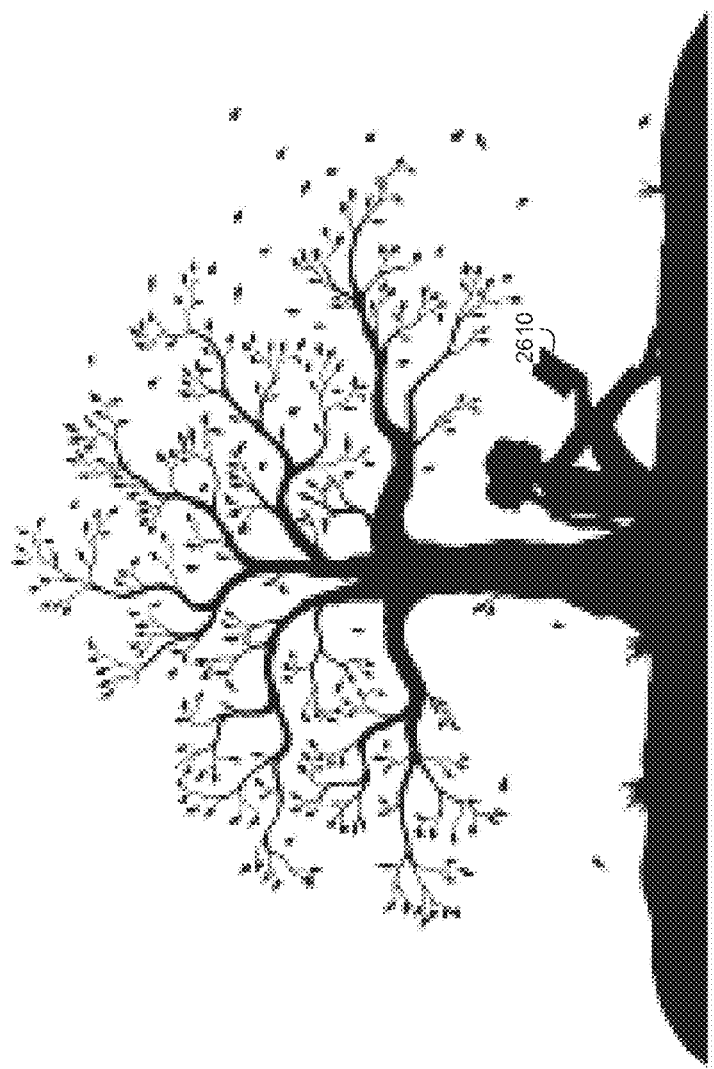
FIG. 26 shows a manner of accessing a password in a recall-memory enhancing manner.

FIG. 26 shows a manner of accessing a password in a recall-memory enhancing manner. With a multitude of passwords in today's technologically enhanced world, where each password is a string of nonsensical alphanumeric characters, the user can easily forget a particular password. However, while users frequently forget a nonsensical password, users easily remember places, favorite songs, or other emotionally relevant items. The system disclosed here enables a user to access passwords in a recall-memory enhancing manner by tying password access to memorable items such as places, songs, images, or other emotionally relevant items.

In a preferred embodiment, a password set/reset capability is available based on a specific geographic location 2600. The user has to be in the location 2600 to set the password and/or reset the password. The location 2600 could be anywhere: store, home, tree in a park, spot in a lake, etc. The geographic coordinates, such as latitude and longitude, of the location 2600 can be stored in the zero-knowledge database 700 in FIG. 7. The geographic coordinates can be encrypted on the server but decrypted on the user device 2610. When the user is within a certain radius of the geographic location 2600, such as within 30 feet, the user can access the setting and/or resetting capabilities for the password.

In another embodiment, the user's geographic location can be determined in various ways. For example, the password set/reset capability can be unlocked when the user records an image containing predefined items, such as a particular tree and the birdfeeder, or a particular grandfather clock.

In a third embodiment, the password set/reset capability is available when a particular song is playing in the background, and/or when the user records a particular picture including specified elements. For example, if the picture includes a fireplace and a red carpet, the user device 2610 can enable the password set/reset capability. Initially, the user can specify the recall-memory enhancing items such as places, songs, photos, etc. The recall memory enhancing items can be stored in the zero-knowledge database 700 in FIG. 7, and access to the recall-memory enhancing items can be further masked using bundled answers, as described in this application.

To specify the song, the user can provide the title of the song or can play the song on the user device 2610. To specify the photo, the user can take a photo at the location and can circle one or more relevant objects in the photo. In one embodiment, to specify the geographic location, the user can go to the geographic location with the user device 2610 and indicate to the user device 2610 that the particular geographic location unlocks set/reset password capabilities.

To increase security, in addition to verifying the geographic location, the processor can require another authentication factor before enabling access to the password. For example, the second authentication factor can be a biometric measurement of the user, such as a retina scan, a face scan, a fingerprint, or a voice identification.

The recall-memory enhancing items, described in this application and stored in the database 700, can be permanently stored on the user device 2610 to ensure that the user can have access to the password even when the zero-knowledge database 700 is inaccessible, such as when the user device 2610 is offline. The sharing rules associated with recall-memory enhancing items can have a default value of no sharing with any other users of the system. In one embodiment, the user can override the "no sharing" rule and can choose to share the recall-memory enhancing items with other users of the system.

Figure 27:
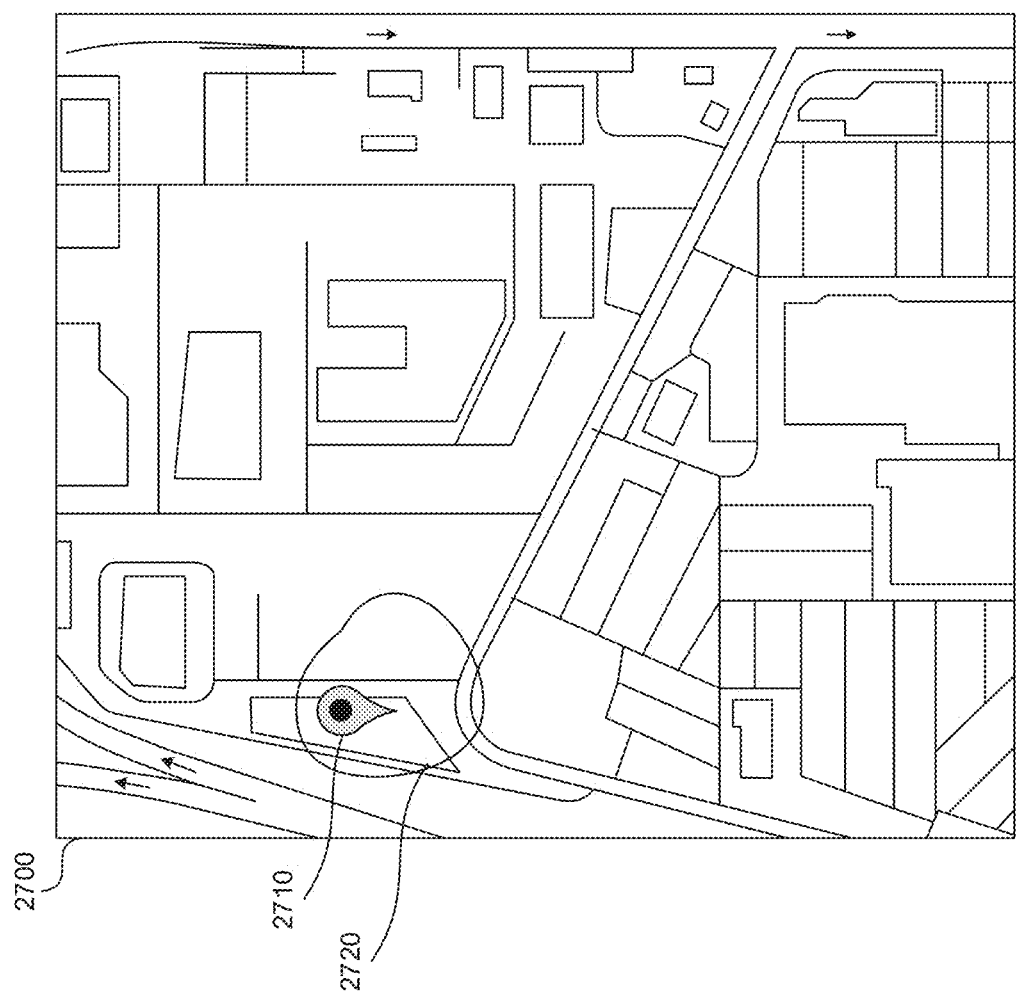
FIG. 27 shows a map specifying the geographic location to use in accessing a password modification functionality.

FIG. 27 shows a map specifying the geographic location to use in accessing a password modification functionality. In one embodiment, instead of going to the geographic location that enables accessing password notification functionality, the user can specify the geographic location by, for example using a map 2700. The user can specify the desired location 2710 by, for example, selecting a region 2720.

A hardware or software processor enabling the display of the map 2700 can determine whether the selected region 2720 is beyond the predetermined threshold, such as 100 feet, 1000 feet, 1 mile, 5 miles, 10 miles, etc. If the selected region 2720 is beyond the predetermined threshold, the processor can tell the user to select a smaller region. In addition, the zero-knowledge database 700 in FIG. 7 can include user location history. The processor can obtain the user location history, and, based on the location history, the processor can determine whether the user has ever been within the region 2720 and/or how frequently the user has been within the region 2720. If the user has never been in the region 2720, the processor can suggest to the user to select a different region, because the user is unlikely to find the region 2720 to be memorable. Similarly, if the user has only passed through the region 2720, without being stationary within the region 2720 for more than a predetermined amount of time, such as an hour, the processor can suggest to the user to select a different region.

The user can also specify a location by identifying an establishment such as a particular business or a chain of businesses. For example, the user can specify that the geographic location is a particular Starbucks shop, or any Starbucks shop.

Figure 28:
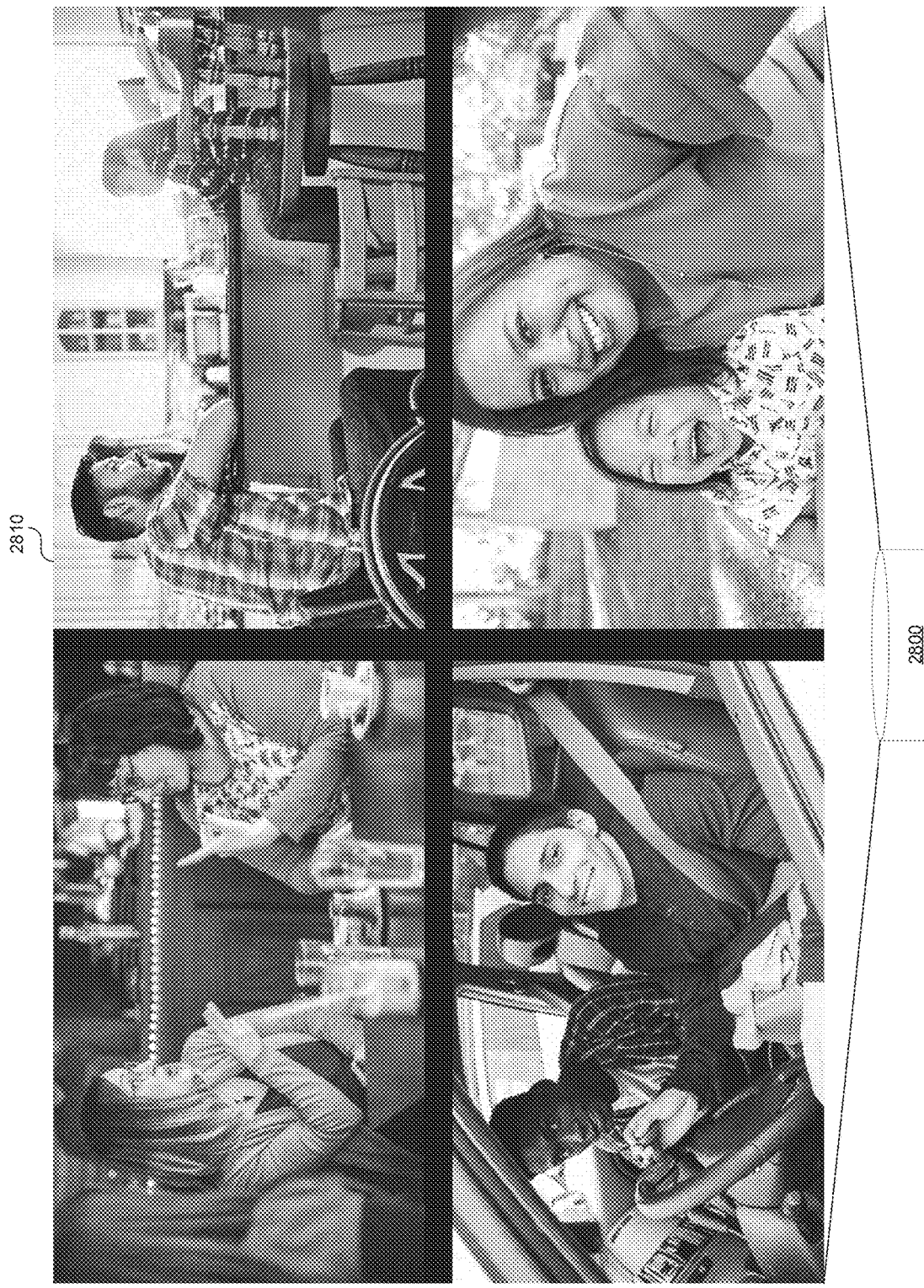
FIG. 28 shows a step in the process of authenticating a user or enabling password modification capability using a zero-knowledge database.

FIG. 28 shows a step in the process of authenticating a user or enabling password modification capability using a zero-knowledge database. The zero-knowledge database 2800 can contain vast amounts of private information about the user that can be used in authenticating the user. The private information can be known only to the user, or the combination of various data structures containing private information and stored in the zero-knowledge database 2800 can be known only to the user. That private information can be used to aid in authentication of the user in various ways. In addition, the private information can be used to enable setting/resetting the password.

A processor associated with the zero-knowledge database 2800 can select the private information used to authenticate the user. For example, the processor can automatically select memorable items of private information such as geographic locations, photos, and/or sounds to authenticate the user. The processor can also ask the user which data stored in the zero-knowledge database can be used for authentication and/or enabling password setting/resetting capability. For example, the processor can ask which category of data should be used, such as images, diary entries, songs, etc. In another example, the processor can present the user with specific questions, and the user can choose which questions can be used for authenticating and/or setting/resetting the password.

In one embodiment, the processor can forgo password authentication and rely on authenticating the user by receiving answers to questions presented to the user. In another embodiment, the processor can grant access to the password by authenticating the user through presenting questions and receiving answers contained in the zero-knowledge database 2800. In a third embodiment, the processor can enable the user to set/reset the password after the user authenticates himself by providing correct answers to the presented questions.

In one embodiment, the processor can present recall-memory enhancing items 2810 to the user. The recall-memory enhancing items 2810 can be images. The images 2810 can include various images contained in the user's universal data scaffold. The processor can ask the user to identify the location of each of the images. If the user correctly identifies the location of each of the images, the processor can authenticate the user.

The zero-knowledge database 2800 can store the user's playlist. To authenticate the user, the processor can ask the user for his favorite song. If the favorite song is contained in the user's playlist, the processor can authenticate the user.

In another embodiment, the processor can populate the recall-memory enhancing items 2810 with the dummy information not associated with the user. The processor can ask the user to identify the information that is associated with the user. If the user correctly identifies his/her information, the processor can authenticate the user.

For example, the processor can ask the user which of the presented places shown in images 2810 the user has visited. The processor can include places the user has not visited in the images. If the user selects the correct images, the processor can authenticate the user. In another example, the processor can present a list of recipes, and ask the user to identify which ones the user has made. Similarly, the processor can include recipes that are not associated with the user's universal data scaffold. If the user correctly identifies the recipes, the processor can authenticate the user.

The zero-knowledge database 2800 can store the type of data structures that can be used to authenticate the user. For example, the types of data structures that can be used to authenticate the user can include photos, geographic locations, songs, recipes, family members, user's diary, etc. In addition, the processor can ask the user to identify the types of data structures that can be used for authentication. The questions presented to the user can vary between different user logins.

Figure 29:
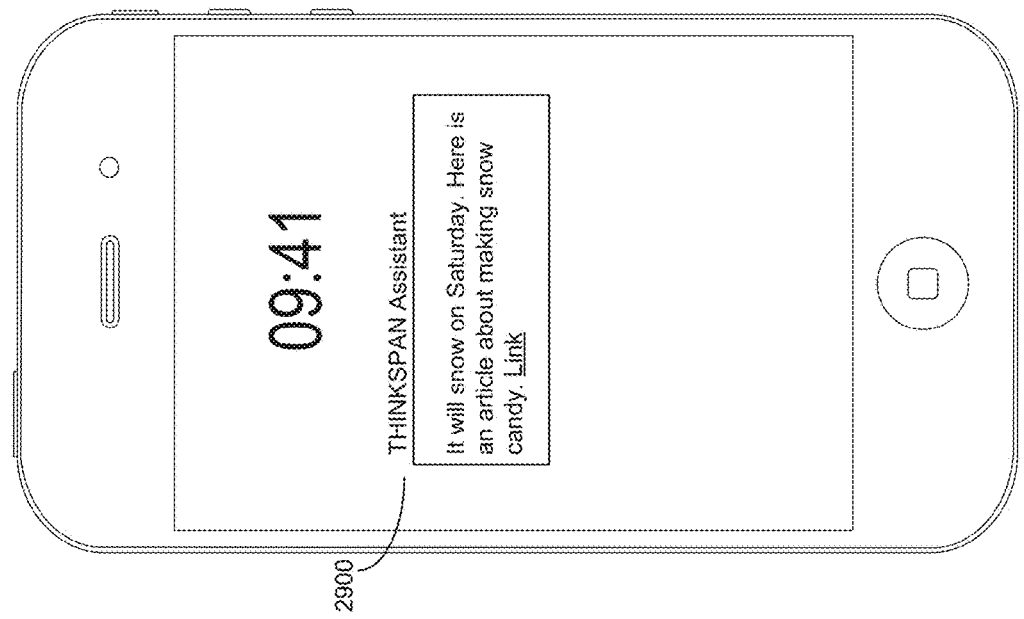
FIG. 29 shows an example implementation of a zero-knowledge personal assistant.

FIG. 29 shows an example implementation of a zero-knowledge personal assistant 2900. The personal assistant 2900, also referred to as a "virtual assistant," can perform tasks or offer suggestions using a combination of private data on that resides on the user's device and relationships between data structures defined by a universal data scaffold. The personal assistant can be implemented on a variety of devices beside the mobile device shown in FIG. 29, such as smart watches, speakers, or VR devices.

The zero-knowledge personal assistant can be implemented by a rules-based matching system that privately matches user information with content or suggestions that reside in the user's universal data scaffold. For example, the matching system can include rules that match the user's location with suggestions of local activities. In some implementations, the personal assistant 2900 is implemented as part of the data management platform 110 shown in FIGS. 1 and 13.

Users can query the personal assistant 2900 for information or to request a task be performed, such as requesting a weather report, a recipe, or setting a reminder. The personal assistant can then respond using a combination of information from the universal data scaffold, private information on the user's device, and external information, e.g., the internet. For example, if the user asks, "What should I eat for dinner?", the personal assistant can reference a food-related universal data scaffold that defines relationships between multiple data structures. For example, data structures that variously include fields such as user location, user health, time of day can all be correlated to predict what type of food a user may prefer when making the request. The personal assistant can then retrieve a list of recipes or restaurants online. For example, a user whose private structured data indicates the user has an iodine deficiency can be recommended food with higher iodine content, such as seafood. Then if the user is located near a sushi restaurant, then the personal assistant can recommend that restaurant. This can be performed by applying the user's structured data to relationships defined by the universal data scaffold, without additional specific inputs from the user (e.g., additional questions from the virtual assistant).

In addition, the personal assistant can provide unprompted suggestions such as calendar notifications, reminders, or music recommendations. For example, the personal assistant can suggest the user to get a health screening based on a combination of age and various health indicators, such as a decline in physical activity. In some embodiments, the personal assistant 2900 creates a privately curated feed that includes multiple different content or suggestions and displays that feed on the user device. The unprompted suggestions or reminders can be generated by the personal assistant 2900 based on relationships between structured data defined in the universal data scaffold, similar to responses to queries. In addition, the personal assistant 2900 can use structured user data to determine when or how unprompted suggestions or reminders are presented on a user device. For example, the universal data scaffold can include a location-based rule that presents a notification when a user's device is within a threshold distance of a point of interest. In addition, content and can be recommended based on their personal information, interests, connections, or time of day. Unprompted suggestions can be triggered in response to any changes in the user's data. For example, changes to family, income, purchases, health information can all trigger suggestions. As another example, even the progression of time, as determined by the user's device, is a change in user data that can trigger a suggestion or recommendation.

In some embodiments, the personal assistant provides unprompted suggestions as additional context to previously made queries or requests, such as updates on a previously searched news story or weather condition. For example, a user who owns a golden retriever dog may get information about that breed. As the dog ages, the personal assistant can share content about aging dogs.

Furthermore, the virtual assistant retrieves content for the user in a zero-knowledge manner, e.g., using the techniques described in FIG. 11. The privacy and security provided by these zero-knowledge techniques makes the personal assistant 2900 more suitable for handling sensitive user data compared to existing virtual assistants, which rely on collecting large amounts of user data to make predictions.

Queries and suggestions can provide a record that is used to improve future answers and suggestions. For example, a user can provide feedback on the quality of suggestions. Alternatively, implicit feedback can be provided, for example based on whether or not a suggestion is selected. The feedback is then used to modify the relationships and rules used by the personal assistant, as derived from the universal data scaffold. In this manner, the personal assistant can learn to predict common user queries and begin to suggest answers preemptively. Furthermore, this process is performed locally on the user's device, ensuring that private information is not shared with other parties. This is more secure compared to existing services that rely on collecting large amounts of user data to train models.

Figure 30:
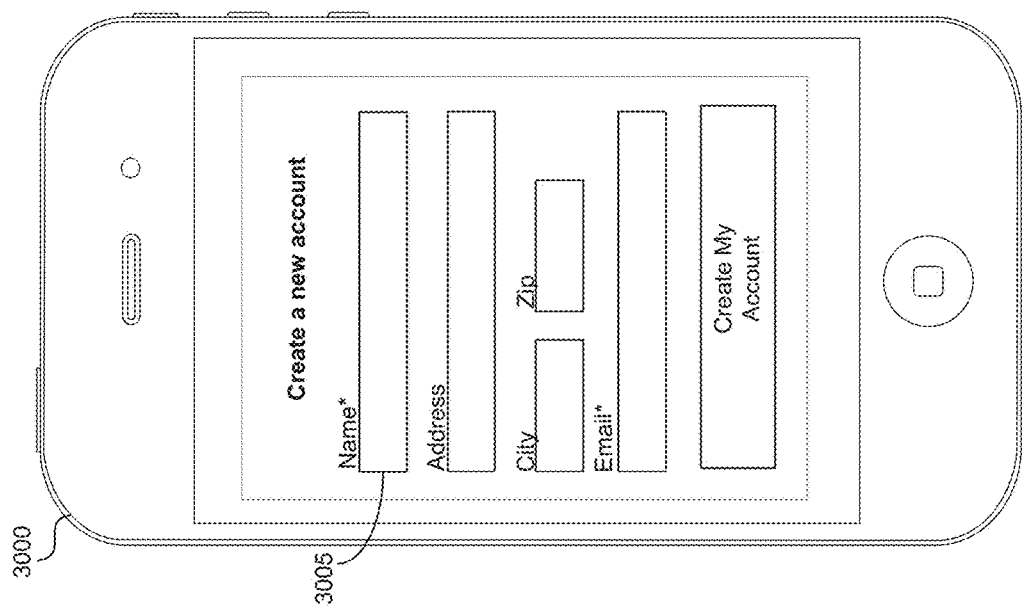
FIG. 30 shows a form including input fields that can be populated using a zero-knowledge database

FIG. 30 shows a form 3000 including input fields 3005 that can be populated using a zero-knowledge database. For example, the form 3000 can be a web form or HTML form, such as a web form for entering payment information, submitting an application, registering an account, etc. The input fields 3005 can include text fields, checkboxes, radio buttons, or other inputs.

The input fields 3005 can be automatically populated with information defined by a universal data scaffold. In some embodiments, this automatic population can be initiated by a single action on a graphic user interface, such as button displayed on a user device. This can reduce the number of inputs the user device needs to process to complete the form.

In some embodiments, the form 3000 is filled by a virtual assistant, e.g., the personal assistant 2900. For example, a user can request the personal assistant 2900 to fill the form 3000 by a voice or text command. In some implementations, the personal assistant 2900 is configured to recognize forms and associated fields according to rules defined in a universal data scaffold, such as by using OCR.

In some cases, the input fields 3005 can be tagged, similar to HTML. In these cases, a data management platform (e.g., data management platform 110) can associate the tags with definitions or metadata of a universal data scaffold and then populate the input fields 3005 with information contained in corresponding structured data on the user device. In some embodiments, the form 3000 can be provided by the data management platform or created from a template provided by the platform, and both the requester of the information and the user inputting information in the form can be users of the data management platform. In this case, because the requester and the user have access to the same universal data scaffold, the requester's form can be configured to accept user's structured data with minimal manual input.

In other cases, an input field may be untagged, or the form may use an unusual format, in which case text recognition or OCR can be performed. This can be more common if the requester providing the form is not a user of the data management platform. The data management platform can analyze the form to identify the types of information being requested. For example, a user may want to fill out a form from with a vehicle inspection service to renew his or her vehicle registration, which generally will require information such as license plate number, VIN, etc. The data management platform can analyze the form to determine that the form is related to cars and identify a corresponding universal data scaffold, such as car universal scaffold 305 shown in FIG. 3. The corresponding structured data on the user's device can then automatically be used to fill out the form.

However, if both a vehicle inspection service and a customer of the service are both users of the data management platform 110, then the form can be automatically populated without OCR because the form and user's data are both configured based on the universal data scaffold. In either case, compared to searching a conventional database, the structured data scaffolds enable the platform to more efficiently search for and identify relevant information to populate the form.

If fields are not automatically populated, then the user can enter a manual input. In some embodiments, entering a manual input in a field enables other fields to be automatically filled. For example, manually entering an address can trigger the personal assistant 2900 to automatically fill a zip code.

In some embodiments, content identified from analyzing the form can be added to the user's universal data scaffold. For example, a vehicle registration form may request the vehicle's current mileage, but the user's universal scaffold may not currently include mileage information. In this example, the user can manually input the value into the form, and an attribute "mileage" can be added to the user's universal data scaffold. This can include adding mileage information to an existing data structure or creating a new data structure with the information.

Conversely, the universal data scaffold can be used to determine information being requested on a form. For example, the form can include text, but also fields that are untagged. The data management platform can perform OCR on the form to identify text and derive meaning from the text using a universal data scaffold stored on a user's device. This improves privacy for a user compared to relying on an external database or an online search to determine meaning from a string of text. For example, the data management platform can identify the words "make" or "model" from a vehicle registration form and determine that the form is requesting the make or model of a vehicle based on an existing data scaffold structure, such as scaffold 305 in FIG. 3.

Once a form is populated, the information can be transferred to the requesting party in a zero-knowledge manner, as described in the present document. For example, the information entered in the form can be encrypted and transferred in bundles. In some embodiments, the requester can obtain information and fill out a form with one click, without input from the requestee. For example, the requestee can have a sharing rule enabled that allows certain data to be transferred to other users of the data management platform. Thus, a requester who is also a user of the data management platform can automatically obtain information to fill out a form. In some instances, the requester can request permission from a user for information, and the form can be automatically filled out if permission is granted, without needing additional input from the user.

A user who provides information to a requester through the data management platform can set rules that restrict how the information is used. For example, the user may want to provide personal information for purposes of filling out a form, but may not want that information to be sent to other parties or be used for other purposes. Such information can be associated with a rule that prevents the requester from further transferring the data. Other rules can specify a length of time before the information is deleted or before revoking access.

In addition to filling out structured forms with specified types of information associated with each field, such as form 3000, the universal data scaffold can be used with unstructured forms. For example, in addition to requesting a patient's "Name" and "Insurance ID," a psychiatrist may ask a patient to fill out a form with open-ended questions in order to generate discussion. The patient can manually fill out a response without associating the information with a specific type, such as "psychiatrist". In some embodiments, a generic tag, such as "information," is applied. The response can then be stored securely in the user's device for future reference. In some embodiments, the data management platform assists the user in filling out unstructured forms by parsing text currently entered in the form and making suggestions or recommendations based on the parsed text and associated information in the user's universal data scaffold. For instance, an online job application can include an open-ended field for the applicant to describe any relevant information not included in his or her resume. As the applicant describes a specific work experience, the description can be supplemented with details such as date or location, filled in from the data from the applicant's device according to relationships defined in the universal data scaffold.

Figure 31:
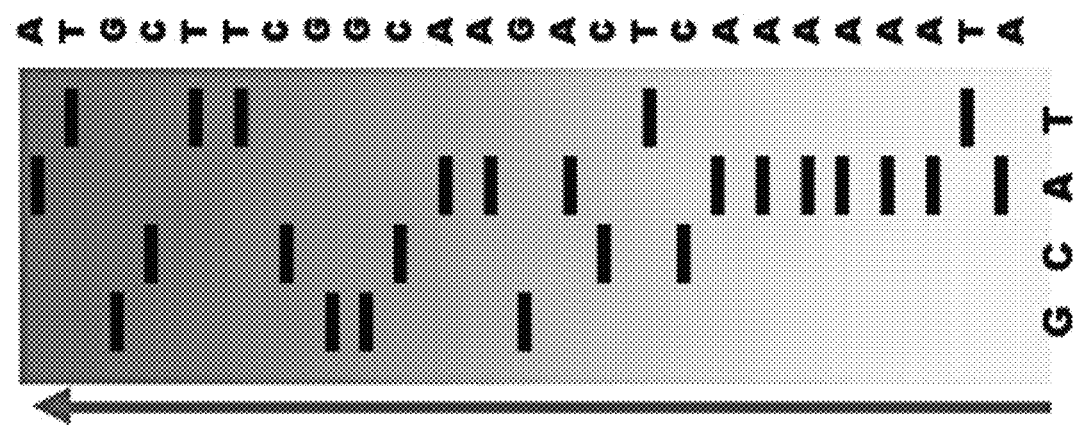
FIG. 31 shows an example of DNA that can be defined using a universal data scaffold and stored in a data management platform.

FIG. 31 shows an example of DNA information that can be stored using the data management platform and structured according to a universal data scaffold. DNA testing can be used to identify and predict potential health issues. Meanwhile, the cost of sequencing DNA has continued to decrease, enabling more people to obtain DNA tests. A large amount of information can be derived from a person's genetic information, including family history and predisposition toward various physical traits. Moreover, a person's DNA, regardless of what can be derived from it, is inherently personal. Therefore, it is crucial that genetic information can be stored and shared in a private and secure manner. In addition to genetic information, similar privacy issues apply to health information in general, including age, weight, drug use, medical history, mental health, etc.

These issues can be addressed by storing genetic information in a universal data scaffold and transferring genetic data using the zero-knowledge methods described in this document. For example, a user may wish to have their DNA analyzed by a third-party laboratory. The user can verify his or her identity using the zero-knowledge methods described above, after which the third-party lab can transfer the results to the user through the data management platform, for example using the methods described elsewhere in this document. Transferring DNA testing results through the data management platform can increase privacy of the sensitive data and prevent a malicious third-party from accessing the information.

DNA sequencing data can be stored privately in a user's device. Meanwhile, algorithms or other analytical tools can be stored in the universal data scaffold. As a result, a user does not need to rely on transmitting genetic data elsewhere for analysis, but can instead use the algorithms provided by the data management platform. For example, a user may want to analyze his or her DNA sequence to determine a likelihood of having high blood pressure. In this case, a suitable algorithm that analyzes a DNA sequence to determine probability of having high blood pressure can be stored in the universal data scaffold, so the user can privately determine results of the analysis. In addition, the universal data scaffold can associate a user's DNA with a wide range of algorithms and tools that generate a variety of predictions and recommendations. For example, these algorithms and tools can analyze a user's DNA to predict risk of diabetes, predict susceptibility to diseases such as COVID-19, generate a recommended diet, or determine ancestry. The universal data scaffold can acquire and store new analytical algorithms as they are developed. The new algorithms can be applied to the DNA sequencing data stored in the universal data scaffold to provide a continually updating DNA analysis for the user. Storing analytical tools in the universal data scaffold reduces latency and bandwidth use by reducing the need to transmit DNA data to separate servers for analysis.

In some embodiments, it can be preferable to transfer genetic data to a third party, such as for analysis. For example, greater computing power may be needed than is available on a user's device, or certain proprietary analytical methods may be unavailable in the universal data scaffold, e.g., due to lack of permission. Therefore, methods of transmitting the DNA data anonymously are sometimes needed. In some embodiments, a user can send a sample (e.g., a saliva sample) for sequencing to a third party, who then transmits the raw sequence data anonymously to another party for data analysis. In some implementations, the raw sequence data can be transmitted through the data management platform such that the analyzing party does not associate the sequence with the user.

Although such methods provide improved privacy compared to existing DNA analysis services, DNA by its nature inherently contains information about the user. Thus, when genetic data needs to be transferred for analysis, the anonymization of genetic data can be further be improved by homomorphic encryption. Homomorphic encryption enables operations to be performed directly on the encrypted data without first decrypting it. After computations are performed on the encrypted data, the results can then be decrypted by the user using his or her private key. The decrypted results are identical to the results produced if the same computations were performed on decrypted data. However, using homomorphic encryption ensures that any analysis of DNA data remains encrypted until it is decrypted by the user. A variety of homomorphic encryption methods can be used, such as encryption can be based on the Ring Learning With Errors (RLWE) problem. In some embodiments, homomorphic encryption can be implemented using existing libraries, such as Microsoft® SEAL, PALISADE, etc. In some embodiments, the homomorphically encrypted data can be transmitted between multiple third-parties for analysis, all without needing to decrypt the data until the user receives the results.

In some embodiments, a doctor can use the data management platform to aid in diagnosis. For example, DNA analysis can indicate whether a patient is prone to certain diseases. A patient can privately share encrypted DNA or DNA analysis results with the doctor through the data management platform, without sharing genetic information with third-party services. In some implementations, this information can shared while automatically filling out medical forms prior to an appointment.

A virtual assistant, such as the personal assistant 2900, can use health information to make recommendations, display reminders, converse with the user, and perform other health-related tasks. For example, the virtual assistant can recommend health screening exams based on a user's personal information. In another example, the virtual assistant can recommend healthy recipes based on time of day. As previously described, health data is privately stored on the user device, and relationships and rules defined by the universal data scaffold are used to analyze the health data, also on the user device. As a result, sensitive health information remains secure, including age, weight, drug use, medical history, dental records, etc.

In some embodiments, the personal assistant 2900 can track a user's mental health. For example, the personal assistant 2900 can periodically request a status update regarding status or mood. The user's response can include words or a numerical sentiment score (e.g., from 1 to 10). In some embodiments, the personal assistant 2900 can perform natural language processing of response text and perform sentiment analysis, for example using a sentiment analysis model included in the universal data scaffold, to determine the user's emotion or mental state. The sentiment can be tracked over time.

Based on the sentiment tracking, the personal assistant 2900 can then recommend content, send reminders, or converse with the user. For example, a user may give responses that indicate low happiness over a given time period. The rules defined by the universal data scaffold can associate low happiness and time with depression. In response, the personal assistant 2900 can recommend feel-good news stories, offer encouraging reminders, or converse with the user (e.g., using a chat interface with an AI chatbot function.) In some embodiments, the personal assistant 2900 combines the sentiment data with the genetic data described above. For example, a user's DNA can indicate a genetic predisposition to depression, alcoholism, etc., which can affect the recommendations made by the personal assistant 2900. Thus, combining sentiment data with genetic data can improve the relevance of the personal assistant 2900's recommendations.

Figure 32:
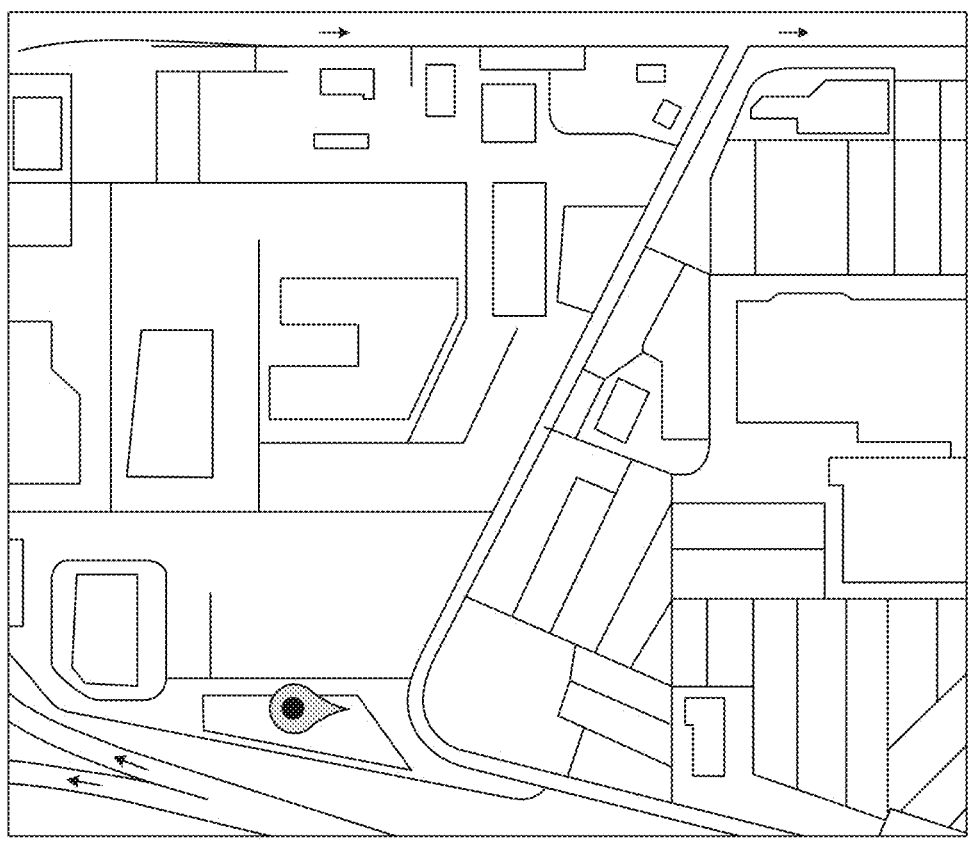
FIG. 32 shows an example of location-sharing using a zero-knowledge database.

FIG. 32 shows an example of location-sharing using a zero-knowledge database. Although existing systems allow users to voluntarily share location information with other users, there are situations where explicit permission is less feasible. For example, parents may want to monitor their children's after-school locations in real time, while their children may not want to share this information. Thus, in some embodiments, the data management platform can enable secure sharing of location between users based on a type of relationship between the users, without explicit permission from at least one of the parties. The data management platform can first derive the type of relationship between two parties based on content associated with each user's universal data scaffold, and then either allow or disallow location sharing accordingly. For example, the users can store family information in the platform such that the relationship is directly determined. In another example, the relationship can be determined less directly, for example by analyzing images or communications between the two users. In addition, sharing can be automatically enabled in this manner for other types of content, not only location information.

Figure 33:
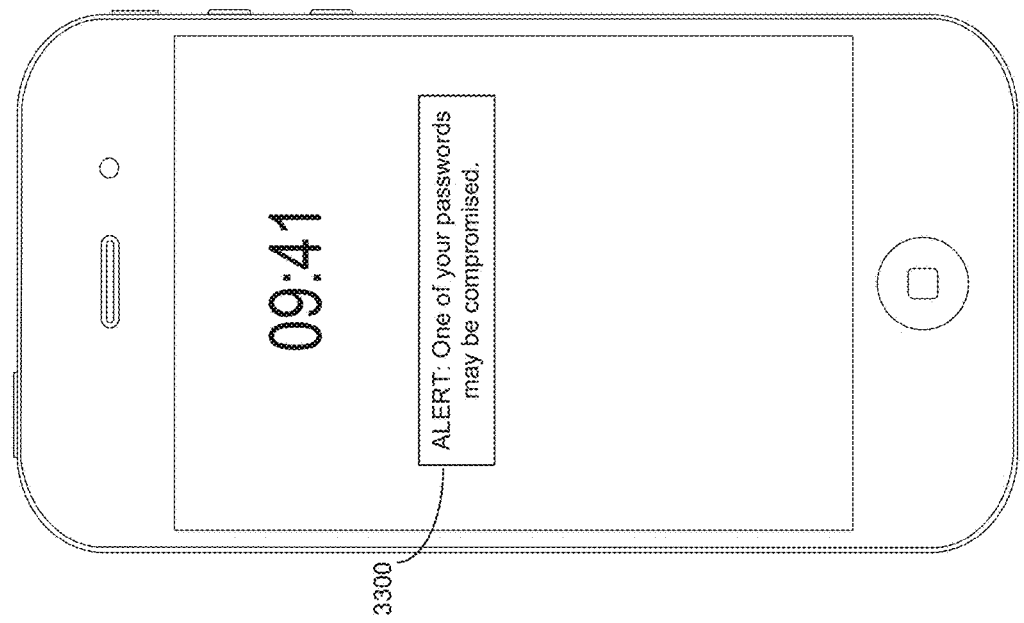
FIG. 33 shows an example of a notification.

FIG. 33 shows an example of a security notification 3300. The security notification 3300 can be displayed by the personal assistant 2900 of FIG. 29. The universal data scaffold structure can be used to provide an improved process for enabling automatic notifications of compromised information. For example, if a spouse's account is compromised, and the spouse shares passwords with their partner through the data management platform, the partner can be securely alerted of which shared passwords were compromised. Because the platform uses a zero-knowledge manner of transmitting information, these alerts can be transmitted without identifying which accounts were hacked. In comparison, current systems, such as those used by financial institutions, can alert a customer if an account has been breached or there is suspicious activity associated with the account. However, these systems generally transmit account information to the customer, e.g., the last 4 digits of the account, which can expose these accounts to malicious actors.

Figure 34:
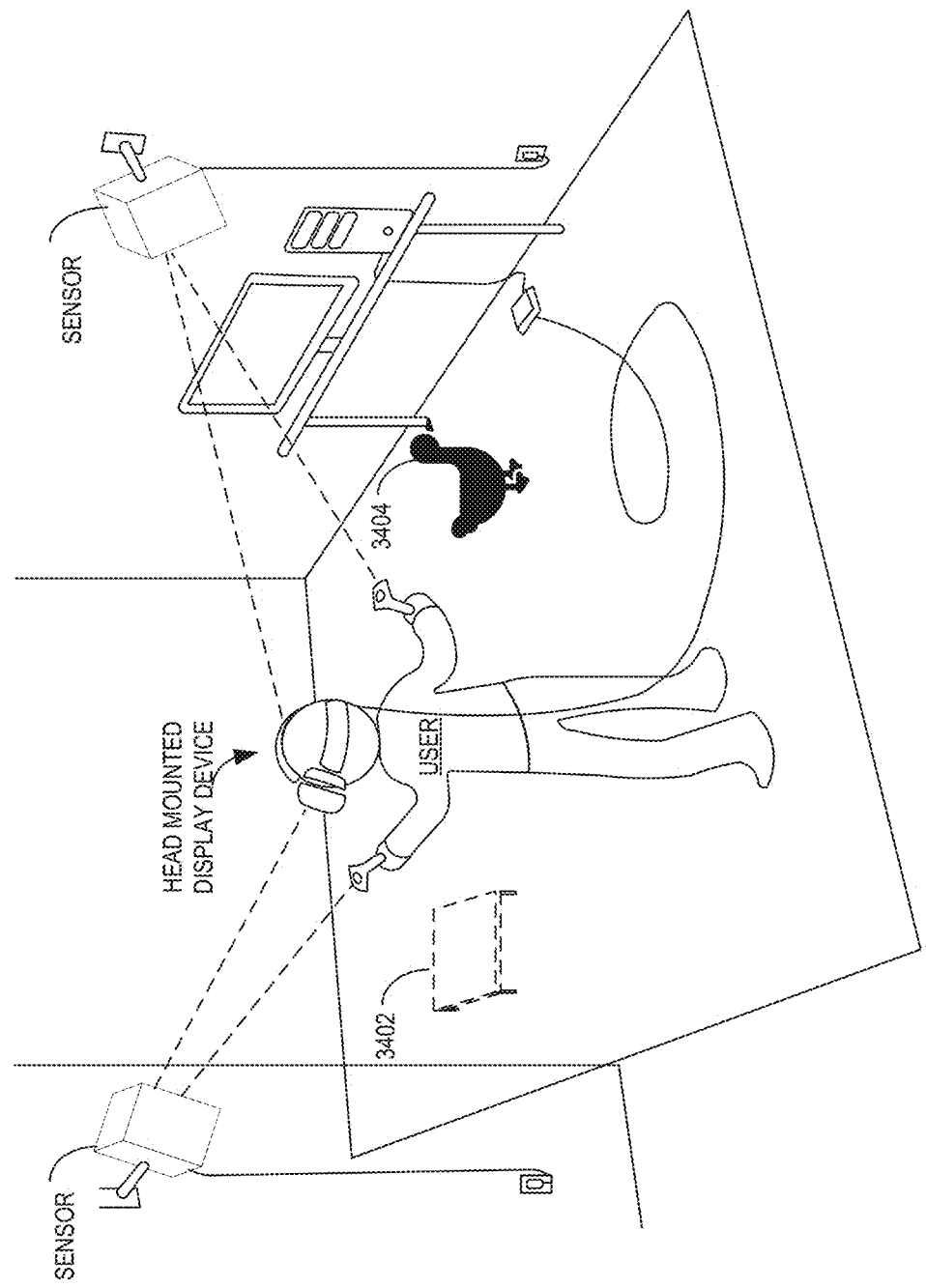
FIG. 34 shows a user operating a virtual reality device that can display representations of content defined using a universal data scaffold.

FIG. 34 shows a user operating a virtual reality (VR) device that can display representations of content defined using a universal data scaffold. In addition to accessing digital content though a user interface on a device such as a phone, as shown in FIG. 7C, a user can view, modify, or create digital content in the VR space. For example, a VR device can include a head-mounted display, speakers, controllers, etc. Digital content stored in the data management platform can further be accessed through any suitable hardware in various forms. For example, digital content can be viewed as augmented reality (AR) content or streamed as audio-only.

The VR space can use the universal data scaffold associated with specific digital content to show various attributes associated with the digital content and/or any related digital contents. Thus, some digital content can be selected by the user, while other content can be automatically selected by the data management platform based on associations derived from the universal data scaffolding. For example, a user may store overseas vacation photos on the data management platform, which can be displayed in the VR space. These photos can then be automatically supplemented by passport information, audio recorded during the trip, etc. Using another vehicle example, a user's vehicle can be viewed in VR in a virtual garage and supplemented with additional attributes, such as accurate license plate information and details specific to the specific year's make and model.

In some embodiments, the private VR space can be a part of a larger metaverse. As described above, users of the data management platform can share content with each other according to various sharing rules. Shared content from other users can then be accessed by entering other user's VR spaces. Furthermore, a community space can include representations of shared content from multiple users.

A VR space can be selectively shared so that some aspects of the space remain private while other aspects are shared. The sharing of objects within the VR space can be guided by sharing rules stored within the universal data scaffold. The sharing rules can be associated with the VR space, the owner of the VR space, or visitors to the VR space. Furthermore actions, dialogue, or other interactions within a user's private VR space can be governed by the universal data scaffold. For example, some conversations can be private between users even if other users are within hearing distance in the VR space. In another example, different users may hear different dialogue or see different objects within the same VR space. The universal data scaffold enables broad connections of information represented in the VR space, while privacy is maintained by delivering the information in a zero-knowledge manner.

For example, table 3402 in FIG. 34 is private to the user, so that the table 3402 is not visible to other users who enter the VR space. Meanwhile, other objects, such as the duck 3404, are visible to all users. In general, a VR space or the objects within the space can be governed by a set of rules that define access restrictions for different users in the space. In some embodiments, certain user avatars are invisible to other users, allowing these invisible users to "eavesdrop" on the VR space. For example, selectively enabling which avatars are visible in the VR environment can reduce distractions during meetings or negotiations for the visible parties while invisible users listen and observe.

A user in the metaverse can be associated with portable identity information. For example, this portable identity information can include real world information, such as name, birthday, etc. The portable identity can also include metaverse-specific information, such as an avatar ID and avatar appearance. Other types of metaverse-specific information include data derived from user equipment, such as eye-tracking data from sensors in head mounted displays or movement information from controllers. This information can be stored in the data management platform using the universal data scaffolding structure described above, so that the information is secure for the user. A user can then share or transfer portable identity information as needed to access services in the metaverse, for example to enter a venue that is restricted by age. This can be similar to providing information through a web form, as described in relation to FIG. 30 above, except implemented in a VR environment.

Figure 35:
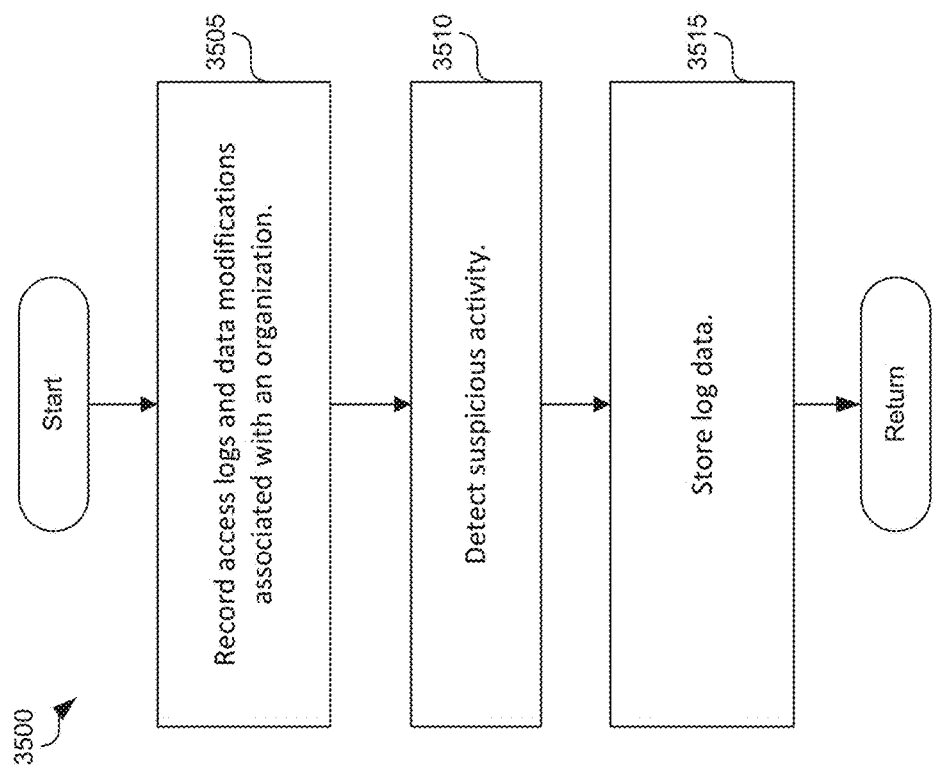
FIG. 35 is a flow diagram illustrating a method of implementing a logging system using a universal data scaffold.

FIG. 35 is a flow diagram of a method 3500 of implementing a logging system using a universal data scaffold. Organizations that handle customer or user data often aim to meet certain compliance standards, such as the American Institute of CPAs' System and Organization Control 2 (SOC2) or the Payment Card Industry Data Security Standard (PCI DSS). Many of these standards include requirements for logging of access and modification to sensitive data in order to provide opportunities to identify and respond to behavior that is indicative of a security breach. The universal data scaffold can be used to implement a highly detailed and customizable enterprise logging system as follows.

At 3505, access logs and data modifications associated with an organization are recorded. The data can include user identifiers, timestamps, the state of the data prior to modification, a list of actions or changes taken, etc. In some embodiments, a system administrator of the organization can select which data to include in the access logs. Optionally, the logging system can be integrated with an external monitoring tool. At 3510, suspicious activity is detected, and an alert is sent to the system administrator. At 3515, log data is stored. Organizations that rely on third-party logging management potentially risk exposing sensitive information, while privately storing log data ensures that log data remain secure within the organization.

Figure 36:
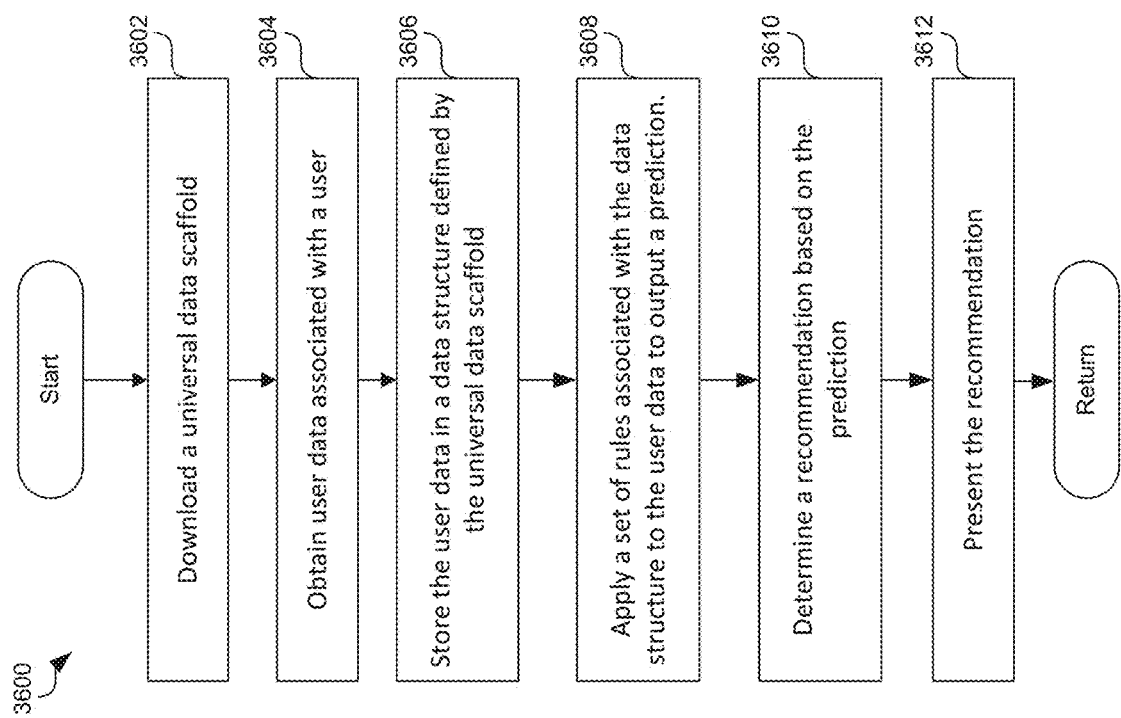
FIG. 36 is a flow diagram illustrating a method of implementing a zero-knowledge personal assistant.

FIG. 36 is a flow diagram illustrating a method 3600 of implementing a zero-knowledge personal assistant. At 3602, a user device downloads a universal data scaffold. For example, the universal data scaffold can be similar to those depicted in FIGS. 1-3. At 3604, the user device obtains user data associated with a user of the user device. At 3606, the user device stores the user data in a data structure defined by the universal data scaffold from step 3602, where the data structure is configured to represent the user's information. For example the data structure can be similar to the data structures shown in FIGS. 7A, 8, and 21. The data structure defines a relationship between a plurality of attributes included in the data structure. Furthermore, the data structure is associated with a set of rules that, when applied to values of the plurality of attributes as inputs, outputs a prediction associated with the user data.

At 3608, the user device applies the set of rules associated with the data structure to the user data. In some embodiments, 3608 is performed in response to a request by the user, e.g., to a virtual assistant executing on the user device. In some embodiments, the rules are applied without prompting from the user. At 3610, a virtual assistant (e.g., virtual assistant 2900), based on applying the set of rules to the user data, determines a recommendation based on the prediction associated with the user data. At 3612, the virtual assistant presents the recommendation determined at 3610 on the user device.

In some embodiments, the clauses below can be used to implement a zero-knowledge virtual assistant:

Clause 1. A computer-implemented method of implementing a virtual assistant on a user device, the method comprising: downloading, by the user device, a universal data scaffold; obtaining, by the user device, user data associated with a user of the user device; storing, by the user device, the user data in a data structure defined by the universal data scaffold, the data structure configured to represent the user's information, wherein the data structure defines a relationship between a plurality of attributes included in the data structure, and wherein the data structure is associated with a set of rules that, when applied to values of the plurality of attributes as inputs, outputs a prediction associated with the user data; applying the set of rules associated with the data structure to the user data; and based on applying the set of rules to the user data, determining a recommendation based on the prediction associated with the user data; and presenting, by the virtual assistant, the recommendation on the user device.

Clause 2. The computer-implemented method of clause 1, wherein the user data includes health information and location information, and wherein the recommendation is determined based on the health information and the location information.

Clause 3. The computer-implemented method of clause 1 or 2, wherein the recommendation is presented on the user device without receiving a request for information from the user.

Clause 4. The computer-implemented method of any of clauses 1-3, wherein the data structure includes a hierarchical graph including a plurality of nodes, the plurality of nodes representing the plurality of attributes.

Clause 5. The computer-implemented method of any of clauses 1-4, wherein the set of rules is a first set of rules, and wherein the data structure is associated with a second set of rules that defines, based on the plurality of attributes, a usage restriction of the user data.

Clause 6. The computer-implemented method of any of clauses 1-5, further comprising: performing zero-knowledge encryption on at least a portion of the user data; transmitting, over a network to a third-party server, a request for information associated with the recommendation, the request including the portion of the user data; and in response to transmitting the request, receiving, from the third-party server, the information associated with the recommendation, wherein presenting the recommendation includes presenting the information received from the third-party server.

Clause 7. The computer-implemented method of any of clauses 1-6, further comprising: displaying, on the user device, a form including a plurality of fields; mapping the user data to the plurality of attributes included in the data structure; mapping the plurality of attributes to the plurality of fields; and automatically entering, by the virtual assistant, the user data into the plurality of fields.

Clause 8. The computer-implemented method of clause 7, further comprising: receiving, by the user device from the user, an input including an entry into a field of the plurality of fields; and updating, based on the set of rules, the user data entered in the plurality of fields.

Clause 9. The computer-implemented method of any of clauses 1-8, wherein the user data includes genetic data, and wherein downloading the universal data scaffold includes downloading a genetic analysis algorithm, the method further comprising: analyzing, by the user device, the genetic data using the genetic analysis algorithm to derive a health trait of the user, wherein the recommendation is based on the derived health trait.

Clause 10. The computer-implemented method of any of clauses 1-9, further comprising: receiving, by the user device, a message via user-input; and detecting, by the virtual assistant, an emotion or mental state associated with the message by applying a sentiment analysis model to the message, wherein the recommendation includes a mental health recommendation based on the emotion or mental state.

Clause 11. The computer-implemented method of any of clauses 1-10, wherein the user device is a VR device, wherein applying the set of rules causes an appearance of a VR object in a VR space to differ among users in the VR space.

Clause 12. The computer-implemented method of any of clauses 1-11, wherein the user device is a VR device, wherein applying the set of rules causes a first VR object to be visible to both a first user and a second user, and wherein applying the set of rules causes a second VR object to be visible to the first user and invisible to the second user.

Clause 13. The computer-implemented method of any of clauses 1-12, wherein the recommendation includes a security notification.

Clause 14. A computer-implemented method of implementing a virtual assistant on a user device, the method comprising: downloading, by the user device, a universal data scaffold, the universal data scaffold including a genetic analysis algorithm; obtaining, by the user device, genetic data associated with a user of the user device; storing, by the user device, the user data in a data structure defined by the universal data scaffold, the data structure configured to represent the user data, wherein the data structure defines a relationship between a plurality of attributes included in the data structure, and wherein the data structure is associated with a set of rules that, when applied to values of the plurality of attributes as inputs, outputs a prediction associated with the user data; applying, by the user device, the set of rules associated with the data structure to the genetic data, including: analyzing, by the user device, the genetic data using the genetic analysis algorithm to predict a health trait of the user; based on applying the set of rules to the genetic data, determining a recommendation based on the predicted health trait; and presenting, by the virtual assistant, the recommendation on the user device.

Clause 15. A computer-implemented method comprising: downloading a universal data scaffold to a computing device; receiving, by a virtual assistant executing on the computing device, a message via user-input to the computing device; detecting, by the virtual assistant, an emotion or mental state of the user by applying a sentiment analysis model to the message; storing user data indicative of the emotion or the mental state in a data structure defined by the universal data scaffold, the data structure configured to represent the user data, wherein the data structure defines a relationship between a plurality of attributes included in the data structure, and wherein the data structure is associated with a set of rules that, when applied to values of the plurality of attributes as inputs, outputs a prediction associated with the user data; applying the set of rules associated with the data structure to the user data; based on applying the set of rules to the user data, determining a recommendation based on the prediction associated with the user data; and presenting, by a virtual assistant executing in the computing device, the recommendation to the user.

Clause 16. A computer-readable storage medium, excluding transitory signals and carrying instructions, which, when executed by at least one data processor of a system, cause the system to perform any of the methods of clauses 1-15.

Clause 17. A computing device including a processor and a memory storing instructions, which, when executed by the processor, cause the computing device to perform any of the methods of clauses 1-15.

Computer

Figure 37:
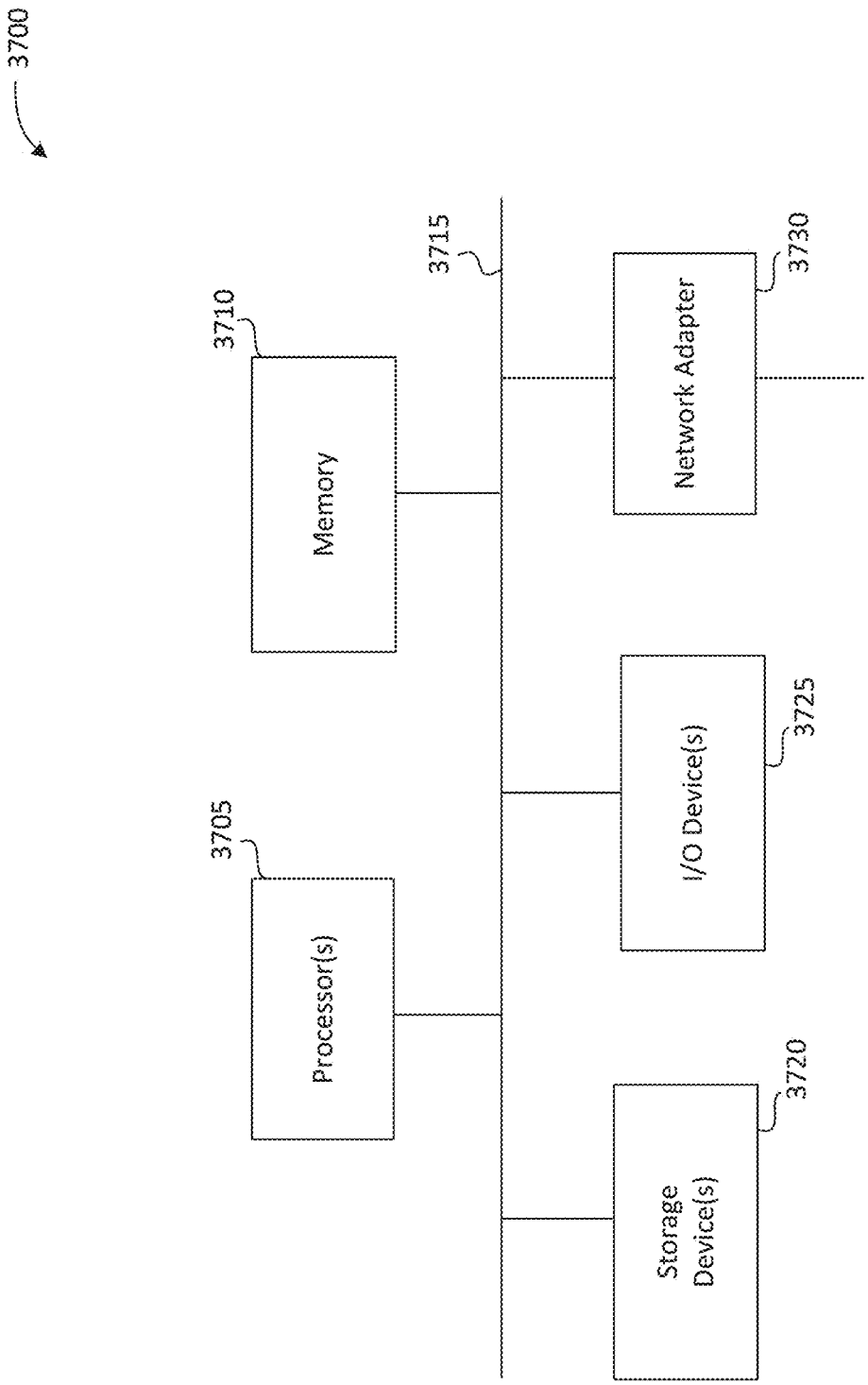
FIG. 37 is a block diagram of a computer system as may be used to implement features of some embodiments of the disclosed technology.

FIG. 37 is a block diagram of a computer system as may be used to implement features of some embodiments of the disclosed technology. The computing system 3700 may be used to implement any of the entities, components or services depicted in the foregoing figures (and any other components described in this specification). The computing system 3700 may include one or more central processing units ("processors") 3705, memory 3710, input/output devices 3725 (e.g., keyboard and pointing devices, display devices), storage devices 3720 (e.g., disk drives), and network adapters 3730 (e.g., network interfaces) that are connected to an interconnect 3715. The interconnect 3715 is illustrated as an abstraction that represents any one or more separate physical buses, point to point connections, or both connected by appropriate bridges, adapters, or controllers. The interconnect 3715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The computing system 3700 can be associated with the user device 2305 in FIG. 23 and/or associated with the server 2300 in FIG. 23. The computing system 3700 can execute instructions as described in this application, for example, FIGS. 24-28. The network adapter 3730 can facilitate communication between the user device 2305 and the server 2300.

The memory 3710 and storage devices 3720 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 3710 can be implemented as software and/or firmware to program the processor(s) 3705 to carry out actions described above. In some embodiments, such software or firmware may be initially provided to the computing system 3700 by downloading it from a remote system through the computing system 3700 (e.g., via network adapter 3730).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

The invention claimed is:

1. A computer-implemented method of implementing a virtual assistant on a user device, the method comprising:
    downloading, by the user device, a universal data scaffold;
    obtaining, by the user device, user data associated with a user of the user device;
    storing, by the user device, the user data in a data structure defined by the universal data scaffold, the data structure configured to represent the user data,
        wherein the data structure defines a relationship between a plurality of attributes included in the data structure, and wherein the data structure is associated with a set of rules that, when applied to values of the plurality of attributes as inputs, outputs a prediction associated with the user data;

applying, by the user device, the set of rules associated with the data structure to the user data;

determining a recommendation based on the prediction associated with the user data; and presenting, by the virtual assistant, the recommendation on the user device by:
displaying, on the user device, a form including a plurality of fields;
mapping the user data to the plurality of attributes included in the data structure;
mapping the plurality of attributes to the plurality of fields; and
automatically entering, by the virtual assistant, the user data into the plurality of fields.

2. The computer-implemented method of claim 1, wherein the user data further includes location information, and wherein the recommendation is determined based on the location information.

3. The computer-implemented method of claim 1, wherein the recommendation is presented on the user device without receiving a request for information from the user.

4. The computer-implemented method of claim 1, wherein the data structure includes a hierarchical graph including a plurality of nodes, the plurality of nodes representing the plurality of attributes.

5. The computer-implemented method of claim 1, wherein the set of rules is a first set of rules, and wherein the data structure is associated with a second set of rules that defines, based on the plurality of attributes, a usage restriction of the user data.

6. The computer-implemented method of claim 1, further comprising:
performing zero-knowledge encryption on at least a portion of the user data;
transmitting, over a network to a third-party server, a request for information associated with the recommendation, the request including the portion of the user data; and
in response to transmitting the request, receiving, from the third-party server, the information associated with the recommendation,
wherein presenting the recommendation includes presenting the information received from the third-party server.

7. The computer-implemented method of claim 1, further comprising:
receiving, by the user device from the user, an input including an entry into a field of the plurality of fields; and
updating, based on the set of rules, the user data entered in the plurality of fields.

8. The computer-implemented method of claim 1, further comprising:
receiving, by the user device, a message via user-input; and
detecting, by the virtual assistant, an emotion or mental state associated with the message by applying a sentiment analysis model to the message,
wherein the recommendation includes a mental health recommendation based on the emotion or the mental state.

9. A computer-readable storage medium, excluding transitory signals and carrying instructions, which, when executed by at least one data processor of a system, cause the system to:
download a universal data scaffold;
obtain user data associated with a user of the system;
store the user data in a data structure defined by the universal data scaffold, the data structure configured to represent the user data,
wherein the data structure defines a relationship between a plurality of attributes included in the data structure, and
wherein the data structure is associated with a set of rules that, when applied to values of the plurality of attributes as inputs, outputs a prediction associated with the user data;
apply the set of rules associated with the data structure to the user data;
based on applying the set of rules to the user data, determine a recommendation based on the prediction associated with the user data; and
present, by a virtual assistant executing in the system, the recommendation to the user by:
displaying a form including a plurality of fields;
map the user data to the plurality of attributes included in the data structure;
map the plurality of attributes to the plurality of fields; and
automatically enter, by the virtual assistant, the user data into the plurality of fields.

10. The computer-readable storage medium of claim 9, wherein the user data includes health information and location information, and wherein the recommendation is determined based on the health information and the location information.

11. The computer-readable storage medium of claim 9, wherein the recommendation is presented without receiving a request for information from the user.

12. The computer-readable storage medium of claim 9, wherein the data structure includes a hierarchical graph including a plurality of nodes, the plurality of nodes representing the plurality of attributes.

13. The computer-readable storage medium of claim 9, wherein the set of rules is a first set of rules, and wherein the data structure is associated with a second set of rules that defines, based on the plurality of attributes, a usage restriction of the user data.

14. The computer-readable storage medium of claim 9, the system further caused to:
perform zero-knowledge encryption on at least a portion of the user data;
transmit, over a network to a third-party server, a request for information associated with the recommendation, the request including the encrypted portion of the user data; and
in response to transmitting the request, receive, from the third-party server, the information associated with the recommendation,
wherein presenting the recommendation includes presenting the information received from the third-party server.

15. The computer-readable storage medium of claim 9, wherein the user data includes genetic data, and wherein downloading the universal data scaffold includes downloading a genetic analysis algorithm, the system further caused to:

analyze the genetic data using the genetic analysis algorithm to derive a health trait of the user,
wherein the recommendation is based on the derived health trait.

16. The computer-readable storage medium of claim 9, the system further caused to:
receive a message via user-input; and
detect, by the virtual assistant, an emotion or mental state associated with the message by applying a sentiment analysis model to the message,
wherein the recommendation includes a mental health recommendation based on the emotion or the mental state.

17. A system comprising a hardware processor and a non-transitory computer-readable storage medium storing instructions that, when executed by the hardware processor, cause the hardware processor to perform steps comprising:
downloading a universal data scaffold;
obtaining user data associated with a user of the system;
storing the user data in a data structure defined by the universal data scaffold, the data structure configured to represent the user data,
wherein the data structure defines a relationship between a plurality of attributes included in the data structure, and
wherein the data structure is associated with a set of rules that, when applied to values of the plurality of attributes as inputs, outputs a prediction associated with the user data;
applying the set of rules associated with the data structure to the user data;
based on applying the set of rules to the user data, determining a recommendation based on the prediction associated with the user data; and
presenting, by a virtual assistant executing in the system, the recommendation to the user by:
displaying a form including a plurality of fields;
map the user data to the plurality of attributes included in the data structure;
map the plurality of attributes to the plurality of fields; and
automatically enter, by the virtual assistant, the user data into the plurality of fields.

18. The system of claim 17, wherein the instructions cause the hardware processor to perform further steps comprising:
obtaining genetic information indicative of a genetic predisposition toward a mental health condition,
wherein the recommendation is determined based on the genetic information.

* * * * *